(12) United States Patent
Ström

(10) Patent No.: US 10,880,558 B2
(45) Date of Patent: Dec. 29, 2020

(54) EFFICIENT LUT IMPLEMENTATION OF LUMA ADJUSTMENT

(71) Applicant: Telefonaktiebolaget LM Ericsson (publ), Stockholm (SE)

(72) Inventor: Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 57 days.

(21) Appl. No.: 16/339,657

(22) PCT Filed: Oct. 3, 2017

(86) PCT No.: PCT/SE2017/050965
§ 371 (c)(1),
(2) Date: Apr. 4, 2019

(87) PCT Pub. No.: WO2018/067056
PCT Pub. Date: Apr. 12, 2018

(65) Prior Publication Data
US 2019/0238866 A1    Aug. 1, 2019

Related U.S. Application Data

(60) Provisional application No. 62/404,315, filed on Oct. 5, 2016.

(51) Int. Cl.
*H04N 19/186* (2014.01)
*H04N 19/86* (2014.01)
(Continued)

(52) U.S. Cl.
CPC ............. *H04N 19/186* (2014.11); *G09G 5/06* (2013.01); *H04N 19/182* (2014.11);
(Continued)

(58) Field of Classification Search
CPC ...... H04N 19/182; H04N 19/59; H04N 19/86; G09G 5/06
See application file for complete search history.

(56) References Cited

U.S. PATENT DOCUMENTS

| | | | |
|---|---|---|---|
| 6,421,142 B1 * | 7/2002 | Lin ...................... | H04N 1/6058 358/1.9 |
| 2008/0204375 A1 * | 8/2008 | Shin ...................... | G09G 3/2003 345/76 |

(Continued)

FOREIGN PATENT DOCUMENTS

| | | |
|---|---|---|
| WO | 2016/055178 A1 | 4/2016 |
| WO | 2016/130066 A1 | 8/2016 |
| WO | 2016/145243 A1 | 9/2016 |

OTHER PUBLICATIONS

International Search Report and Written Opinion dated Jan. 25, 2018 issued in International Application No. PCT/SE2017/050965. (12 pages).

(Continued)

*Primary Examiner* — Edward Park
(74) *Attorney, Agent, or Firm* — Rothwell, Figg, Ernst & Manbeck, P.C.

(57) ABSTRACT

A pixel having an original RGB color is processed by determining which color component of the pixel that will be clipped for a luma value resulting in a luminance value that is closest to an original luminance value obtained based on the original RGB color. A LUT is selected based on which color component of 5 the pixel that will be clipped. At least one LUT index is obtained based on LUT-specific maximum and minimum values for the selected LUT and the original luminance value. A luma value is determined for the pixel based on a LUT entry fetched from the selected LUT using the at least one LUT index. The invention thereby achieves (Continued)

a feasible LUT implementation of luma adjustment that can be used to improve luminance values of pixels.

20 Claims, 9 Drawing Sheets

(51) Int. Cl.
    *H04N 19/59* (2014.01)
    *H04N 19/182* (2014.01)
    *G09G 5/06* (2006.01)

(52) U.S. Cl.
    CPC ............ *H04N 19/59* (2014.11); *H04N 19/86* (2014.11); *G09G 2320/0626* (2013.01)

(56) References Cited

U.S. PATENT DOCUMENTS

| | | | |
|---|---|---|---|
| 2014/0002481 A1* | 1/2014 | Broughton | G09G 5/02 345/591 |
| 2019/0238866 A1* | 8/2019 | Strom | H04N 19/86 |

OTHER PUBLICATIONS

Ström, J., "AHG on HDR and WCG: Multi-LUT Luma Adjustment Implementation", Ericsson, Joint Collaborative Team on Video Coding (JCT-VC) of ITU-T SG 16 WP 3 and ISO/IEC JTC 1/SC 29/WG 11, Document: JCTVC-Y0030, (Oct. 2016). (8 pages).
Rosewarne, C. et al., "CE1-related: LUT-based luma sample adjustment", Canon Information Systems Research Australia, Joint Collaborative Team on Video Coding (JCT-VC) of ITU-T SG 16 WP 3 and ISO/IEC JTC 1/SC 29/WG 11, Document: JCTVC-W0056, (Feb. 2016). (5 pages).
Pu, F. et al., "AHG13: on Luma Adjustment", Dolby Laboratories, Inc., Joint Collaborative Team on Video Coding (JCT-VC) of ITU-T SG 16 WP 3 and ISO/IEC JTC 1/SC 29/WG 11, Document: JCTNC-X0043, (Jun. 2016). (10 pages).
Norkin, A., "Closed form HDR 4:2:0 chroma subsampling (HDR CE1 and AHG5 related)", Netflix Inc., Joint Collaborative Team on Video Coding (JCT-VC) of ITU-T SG 16 WP 3 and ISO/IEC JTC 1/SC 29/WG 11, Document: JCTVC-W0107_r1, (Feb. 2016). (9 pages).
Ström, J. et al., "Branches: Modified Linearization of Luma Adjustment", Ericsson, Joint Collaborative Team on Video Coding (JCT-VC) of ITU-T SG 16 WP 3 and ISO/IEC JTC 1/SC 29/WG 11, Document: JCTVC-X0036, (May/Jun. 2016). (10 pages).
Tourapis, A., "HDR Tools: Software Status", Apple, Inc., Joint Collaborative Team on Video Coding (JCT-VC) of ITU-T SG 16 WP 3 and ISO/IEC JTC 1/SC 29/WG 11, Document: JCTVC-X0053, (May/Jun. 2016). (4 pages).
Rosewarne, C., "AHG13: Further results for LUT-based luma sample adjustment", Canon Information Systems Research Australia, Joint Collaborative Team on Video Coding (JCT-VC) of ITU-T SG 16 WP 3 and ISO/IEC JTC 1/SC 29/WG 11, Document: JCTVC-X0054, (May/Jun. 2016). (6 pages).
Stessen, J. et al., "Chromaticity Based Color Signals for Wide Color Gamut and High Dynamic Range", Philips, International Organisation for Standardisation—ISO/IEC JTC1/SC29/WG11—Coding of Moving Pictures and Audio, MPEG2014/M35065, (Oct. 2014). (18 pages).
Stessen, J. et al., "Chromaticity Based Color Signals for WCG and HDR", Philips, M35065, (Oct. 2014). (37 pages).
Francois, E. et al., "About using a BT.2020 container for BT.709 content", Technicolor, International Organisation for Standardisation—ISO/IEC JTC1/SC29/WG11—Coding of Moving Pictures and Audio, MPEG2013/M35255, (Oct. 2014). (1 page).
Francois, E. et al., "About using a BT.2020 container for BT.709 content", Technicolor, M35255, (Oct. 2014). (14 pages).
Ström, J., "Investigation of HDR Color Subsampling", Ericsson, International Organisation for Standardisation—ISO/IEC JTC1/SC29/WG11—Coding of Moving Pictures and Audio, MPEG2014/M35841, (Feb. 2015). (8 pages).
Luthra, A. et al., "Call for Evidence (CfE) for HDR and WCG Video Coding", Requirements, International Organisation for Standardisation—ISO/IEC JTC1/SC29/WG11—Coding of Moving Pictures and Audio, MPEG2014/N15083, (Feb. 2015). (46 pages).
Ström, J. et al., "Ericsson's response to CfE for HDR and WCG", Ericsson, International Organisation for Standardisation—ISO/IEC JTC1/SC29/WG11—Coding of Moving Pictures and Audio, MPEG2014/M36184, (Feb. 2015). (11 pages).
Ström, J. et al., "Luma Adjustment for High Dynamic Range Video", Ericsson Research, 2016 Data Compression Conference, (2016). (10 pages).
SMPTE Standard, "High Dynamic Range Electro-Optical Transfer Function of Mastering Reference Displays", SMPTE ST 2084:2014, (Aug. 2014). (11 pages).
Extended European Search Report dated Mar. 30, 2020 issued in European Patent Application No. 17858814.1 (10 pages).
Ström et al., "Branches: Modified Linearization of Luma Adjustment"; Joint Collaborative Team on Video Coding (JCT-VC) of ITU-T SG 16 WP 3 and ISO/IEC JTC 1/SC 29/WG 11 24th Meeting: Geneva, CH, May 26-Jun. 1, 2016; Document: JCTVC-X0036. (10 pages).
Ström, "AHG on HDR and W : Multi-LUT LUMA Adjustment Implementation"; Joint Collaborative Team on Video Coding (JCT-VC) of ITU-T SG 16 WP 3 and ISO/IEC JTC 1/SC 29/WG 11 25th Meeting: Chengdu, CN, Oct. 14-21, 2016; Document: JCTVC-Y0030. (8 pages).

* cited by examiner

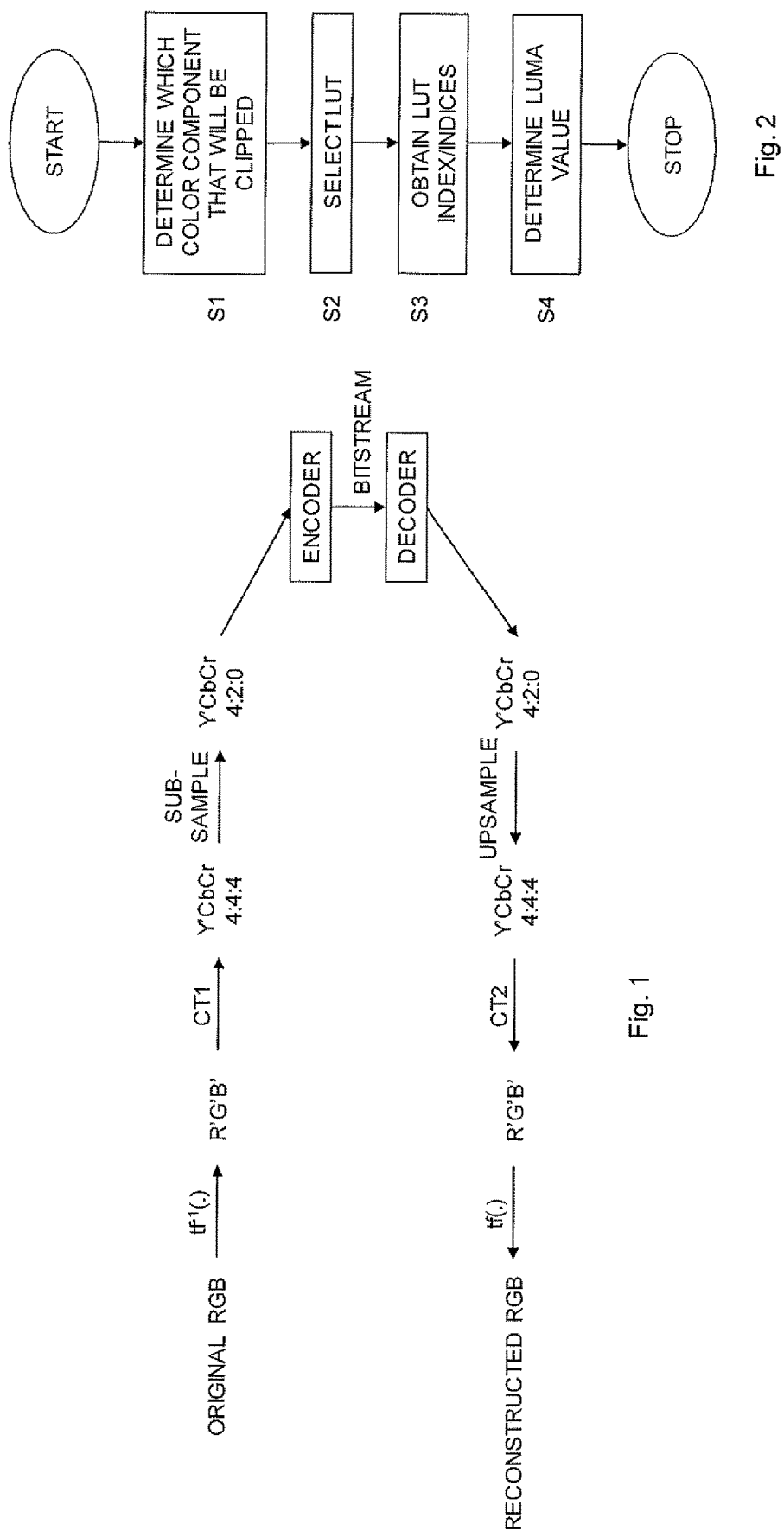

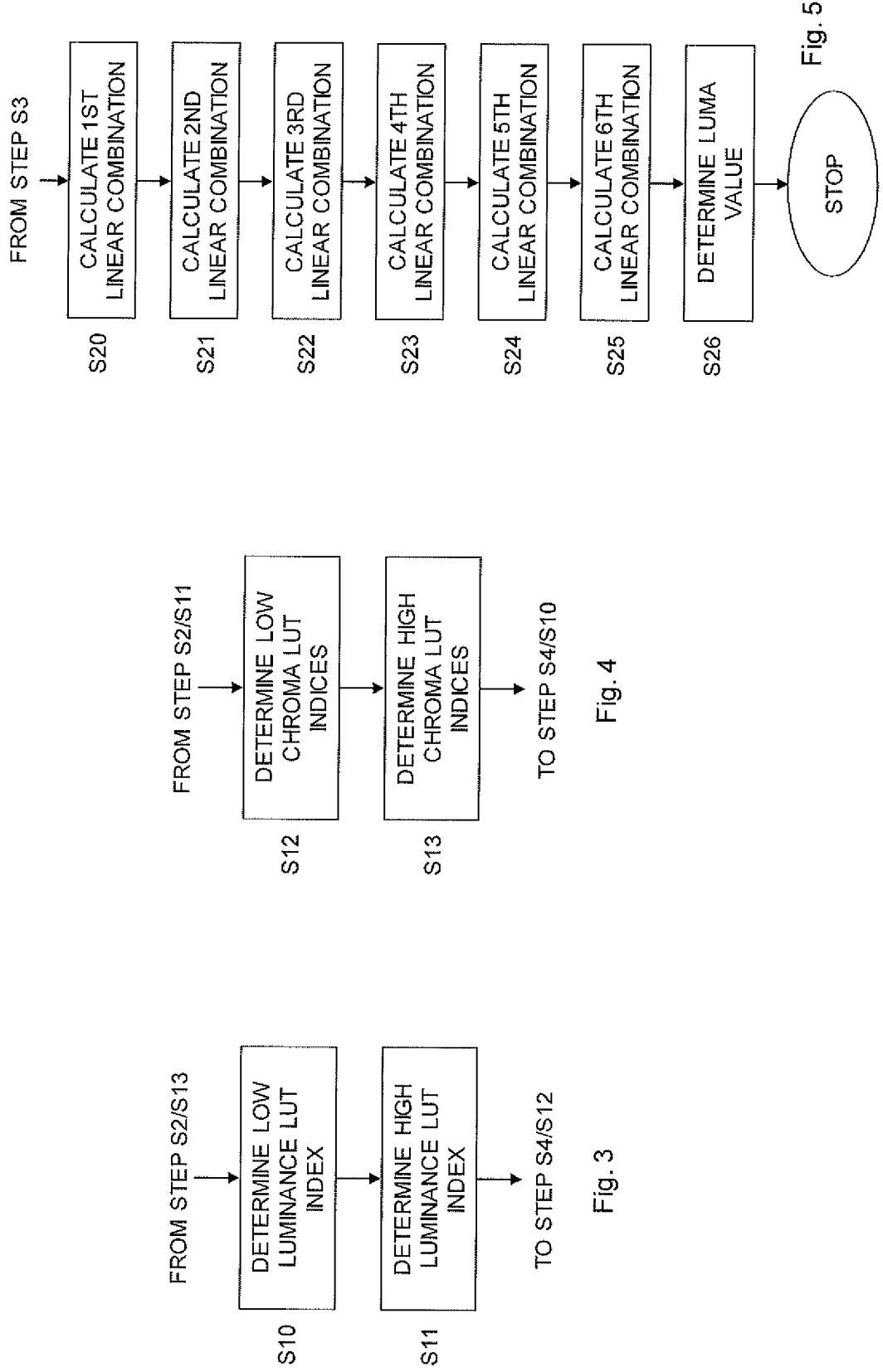

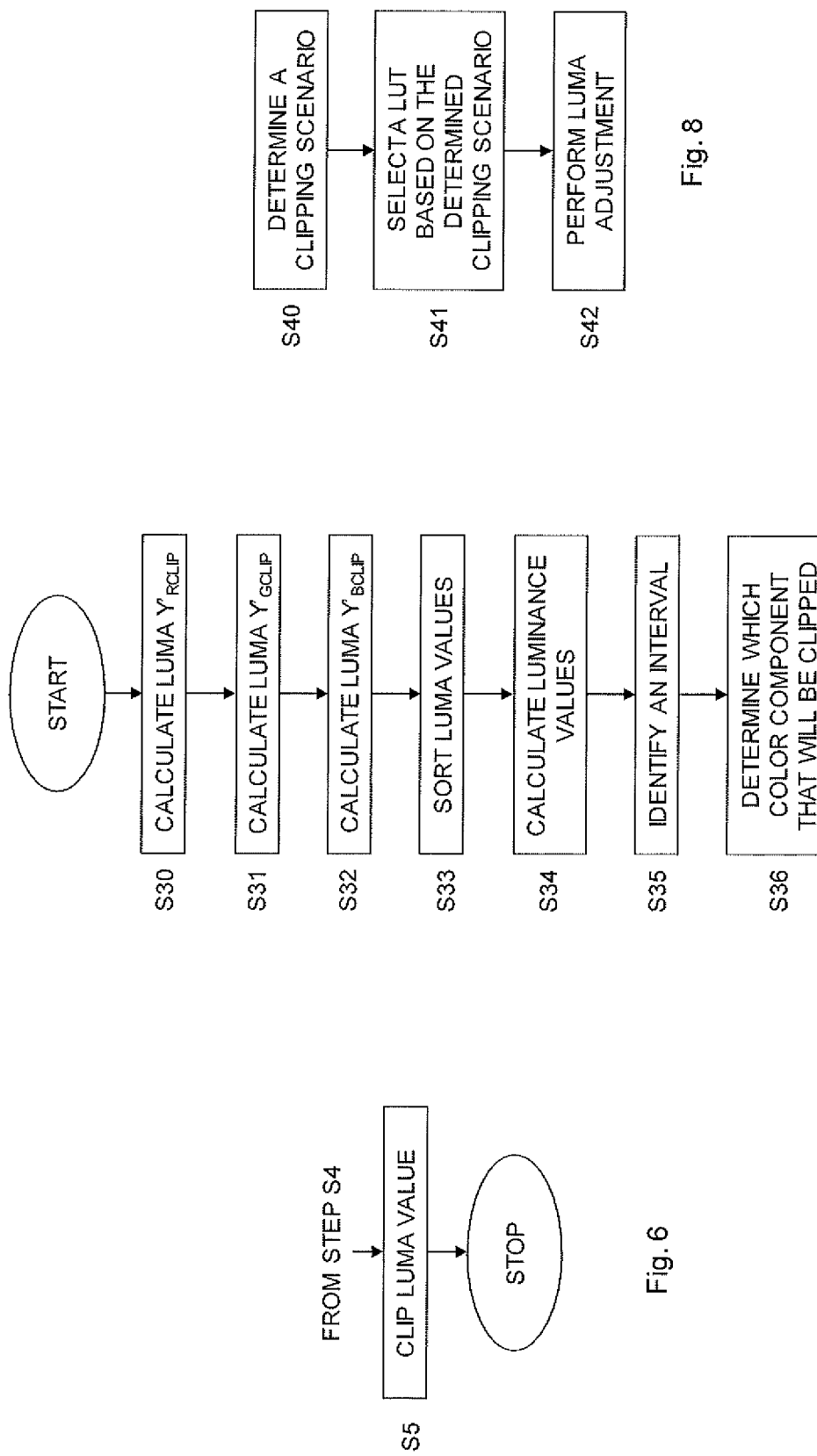

US 10,880,558 B2

EFFICIENT LUT IMPLEMENTATION OF LUMA ADJUSTMENT

CROSS REFERENCE TO RELATED APPLICATION(S)

This application is a 35 U.S.C. § 371 National Stage of International Patent Application No. PCT/SE2017/050965, filed Oct. 3, 2017, designating the United States and claiming priority to U.S. provisional application No. 62/404,315, filed on Oct. 5, 2016. The above identified applications are incorporated by reference.

TECHNICAL FIELD

The present embodiments generally relate to processing of pixels in a picture, and in particular to such processing that improves luminance values of pixels.

BACKGROUND

Within the art of video coding, a non-linear transfer function converts linear samples to non-linear samples with the purpose of mimicking human vision. In coding of, for instance, high dynamic range (HDR) video, it can be advantageous to use a highly non-linear transfer function. A highly non-linear transfer function makes it possible to distribute many codewords to dark regions, and fewer codewords to bright regions, where the relative difference in brightness is anyway small.

An example of traditional processing of video, including HDR video, is shown in FIG. 1. In this traditional processing, an inverse of a transfer function $tf^{-1}(\cdot)$, such as the opto-electrical transfer function (OETF), which is typically the inverse of the electro-optical transfer function (EOTF), is applied to the red, green and blue color components of the original linear light signal (RGB) to form a non-linear R'G'B' color. A first color transform or color transformation (CT1) is applied to this non-linear R'G'B' color to get a Y'CbCr 4:4:4 color comprising a luma component Y' and two chroma components Cb, Cr. The chroma components Cb, Cr are subsampled, for instance to quarter resolution resulting in Y'CbCr 4:2:0 or half resolution resulting in Y'CbCr 4:2:2. This Y'CbCr 4:2:0 or 4:2:2 color is then input to an encoder to get an encoded representation of the video sequence, typically denoted bitstream in the art. The bitstream is then decoded by a decoder to get a reconstructed Y'CbCr 4:2:0 or 4:2:2 color. An inverse of the above described processing takes place to upsample the chroma components Cb, Cr to full resolution, giving Y'CbCr 4:4:4. A reconstructed R'G'B' color is obtained by applying a second color transform (CT2) onto the reconstructed Y'CbCr 4:4:4 color. This reconstructed R'G'B' color is input to a transfer function $tf(\cdot)$, such as the EOTF, to get a reconstructed linear RGB color.

A combination of a highly non-linear transfer function, 4:2:0 subsampling and non-constant luminance gives rise to severe artifacts in saturated colors as previously disclosed [1], where changes between two colors of similar luminance can result in a reconstructed image with very different luminances.

Luma Y' is the weighted sum of gamma-compressed R'G'B' components of a color video, i.e., $Y'=w_R \times R'+w_G \times G'+w_B \times B'$ and where R', G', B' are the gamma-compressed R'G'B' components, $R'=tf^{-1}(R)$, $G'=tf^{-1}(G)$ and $B'=tf^{-1}(B)$. In clear contrast, luminance Y is formed as a weighted sum of linear RGB components, not gamma-compressed ones, i.e., $Y=w_R \times R+w_G \times G+w_B \times B$.

One solution to this problem is denoted luma adjustment [2]. The idea is to upsample the Cb and Cr values, and construct a luma value Y' that will give the correct luminance Yo, obtained based on the original RGB color, in every pixel, using Y'=luma_adjustment(Yo, Cb, Cr).

There are many ways of implementing luma adjustment. One way [2] involves interval halving, i.e., binary search. One issue with this solution is that it may take up to ten iterations to arrive at the correct value. This is not a problem for off-line encoding, but for real-time applications, such as a hardware implementation in a camera, one must often dimension the system for the worst case of ten iterations, which can become very costly.

Another way involves linearizing the function Y'=luma_adjustment(Yo, Cb, Cr), which makes it possible to invert it [2, 3]. However, a linearization will always result in an error, and it has been shown that these errors can be quite big [4]. By investigating whether a color component will clip against their maximum value, some of these errors can be avoided as is described in [4]. However, the errors from the linearization itself still remains.

Yet another way is to use a look-up table (LUT) [2]. An example is to use a 10-bit quantized version of $tf^{-1}(Yo)$, where Yo is the desired luminance, i.e., the luminance Yo=wR*R+wG*G+wB*B of the original RGB color of the pixel, as well as 10-bit quantized versions of Cb and Cr. Here $tf^{-1}(\cdot)$ is the inverse of the transfer function $tf(\cdot)$ used, for instance the SMPTE ST 2084 [7]. However, such a LUT would need to be around 1024×1024×1024 values large. If two bytes are used per 10-bit Y' value this becomes 2 GB of data. While this is not an enormous amount of data per se, it is very big for a LUT that may be accessed randomly every clock cycle. For that to be feasible today, a LUT of a couple of hundred kilobytes is more realistic for inclusion on, e.g., a camera chip, and definitely less than a gigabyte.

Therefore there have been attempts to create a smaller LUT [5]. A divide-and-conquer technique is attempted in [5] by dividing a 3D LUT into eight octants, and further dividing each octant into eight smaller octants if the error is too large. When an octant is no longer subdivided, seven parameters are stored, which are used to generate a second order polynomial in $tf^{-1}(Yo)$, Cb and Cr. A decoder must first navigate the octant structure, find the polynomial parameters and then use them to approximate Y'. Also in this LUT implementation, the error can be quite big. Furthermore, the navigation in the octant structure can take some clock cycles, increasing latency.

There is therefore a need for a feasible LUT-based implementation of luma adjustment that can be used to improve luminance values of pixels.

SUMMARY

It is a general objective to provide a feasible LUT-based implementation of luma adjustment that can be used to improve luminance values of pixels.

This and other objectives are met by embodiments as disclosed herein.

An aspect of the embodiments relates to a method for processing a pixel of an original red, green and blue (RGB) color in a picture. The method comprises determining which color component of the pixel that will be clipped for a luma value resulting in a luminance value that is closest to an original luminance value obtained based on the original RGB color. The method also comprises selecting a LUT based on which color component of the pixel that will be clipped. The method further comprises obtaining at least one LUT index based on LUT-specific maximum and minimum values for the selected LUT and the original luminance value. The method also comprises determining a luma value for the pixel based on a LUT entry fetched from the selected LUT using the at least one LUT index.

Another aspect of the embodiments relates to a pixel processing device configured to determine which color component of a pixel of an RGB color in a picture that will be clipped for a luma value resulting in a luminance value that is closest to an original luminance value obtained based on the original RGB color. The pixel processing device is also configured to select a LUT based on which color component of the pixel that will be clipped for the luma value resulting in a luminance value that is closest to the original luminance value. The pixel processing device is further configured to obtain at least one LUT index based on LUT-specific maximum and minimum values for the selected LUT and the original luminance value. The pixel processing device is additionally configured to determine a luma value for the pixel based on a LUT entry fetched from the selected LUT using the at least one LUT index.

A further aspect of the embodiments relates to a pixel processing device comprising a scenario determiner for determining which color component of a pixel of an RGB color in a picture that will be clipped for a luma value resulting in a luminance value that is closest to an original luminance value obtained based on the original RGB color. The pixel processing device also comprises a selector for selecting a LUT based on which color component of the pixel that will be clipped for the luma value resulting in a luminance value that is closest to the original luminance value. The pixel processing device further comprises an index obtainer for obtaining at least one LUT index based on LUT-specific maximum and minimum values for the selected LUT and the original luminance value. The pixel processing device also comprises a luma adjuster for determining determine a luma value for the pixel based on a LUT entry fetched from the selected LUT using the at least one LUT index.

Yet another aspect of the embodiments relates to a computer program comprising instructions, which when executed by at least one processor, cause the at least one processor to determine which color component of a pixel of an original RGB color in a picture that will be clipped for a luma value resulting in a luminance value that is closest to an original luminance value obtained based on the original RGB color. The at least one processor is also caused to select a LUT based on which color component of the pixel that will be clipped for the luma value resulting in a luminance value that is closest to the original luminance value. The at least one processor is further caused to obtain at least one LUT index based on LUT-specific maximum and minimum values for the selected LUT and the original luminance value. The at least one processor is also caused to determine a luma value for the pixel based on a LUT entry fetched from the selected LUT using the at least one LUT index.

A related aspect defines a carrier comprising the computer program. The carrier is one of an electronic signal, an optical signal, an electromagnetic signal, a magnetic signal, an electric signal, a radio signal, a microwave signal, or a computer-readable storage medium.

The present embodiments provide an efficient LUT-based implementation of luma adjustment that can be used to improve luminance values of pictures. The LUT-based implementation uses multiple LUTs, each of which is adapted and used for a particular clipping scenario, i.e., color saturation type. The total size of these LUTs can be kept low and the LUT-based implementation is thereby ideal for hardware implementation.

BRIEF DESCRIPTION OF THE DRAWINGS

The embodiments, together with further objects and advantages thereof, may best be understood by making reference to the following description taken together with the accompanying drawings, in which:

FIG. 1 schematically illustrates traditional processing of pixels in connection with encoding and decoding of video sequences;

FIG. 2 is a flow chart illustrating a method for processing a pixel in a picture according to an embodiment;

FIG. 3 is a flow chart illustrating obtaining LUT indices in FIG. 2 according to an embodiment;

FIG. 4 is a flow chart illustrating obtaining LUT indices in FIG. 2 according to another embodiment;

FIG. 5 is a flow chart illustrating determining a luma value in FIG. 2 according to an embodiment;

FIG. 6 is a flow chart illustrating an additional, optional step of the method shown in FIG. 2 according to an embodiment;

FIG. 7 is a flow chart illustrating determining which color component that will be clipped in FIG. 2 according to an embodiment;

FIG. 8 is a flow chart illustrating a method for processing a pixel in a picture according to another embodiment;

DETAILED DESCRIPTION

Figure 10:
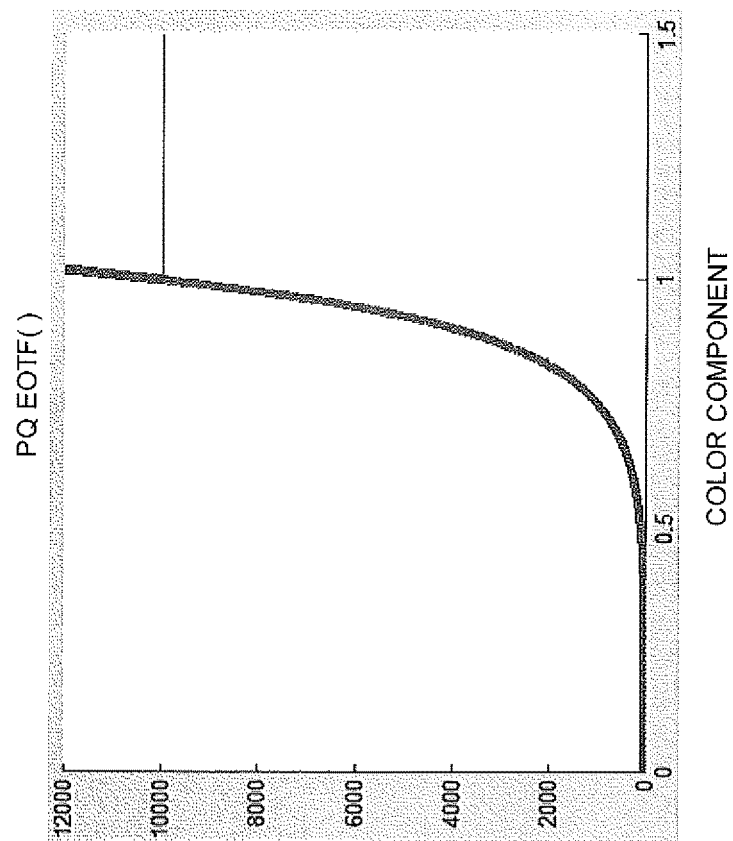
FIG. 10 is a diagram showing a linearly extended function instead of a typical transfer function that clips.

Throughout the drawings, the same reference numbers are used for similar or corresponding elements.

The present embodiments generally relate to processing of pixels in a picture, and in particular to such processing that improves luminance values of pixels.

The present embodiments provide a feasible look-up table (LUT) based implementation of luma adjustment [2] that can be used to improve luminance values of pixels in pictures, such as of a video sequence and in particular of a HDR video sequence. The present embodiments not only provide a feasible implementation providing LUTs of a size enabling random access every clock cycle and thereby being suitable for real-time applications and/or hardware implementation, such as an implementation in, for instance, a camera chip. The present embodiments achieve such feasible LUT-based implementations that in addition produce small average error and small worst case error.

FIG. 2 is a flow chart illustrating a method for processing a pixel of an original red, green and blue (RGB) color in a picture. The method comprises determining, in step S1, which color component of the pixel that will be clipped for a luma value resulting in a luminance value that is closest to an original luminance value obtained based on the original RGB color. A following step S2 then comprises selecting a LUT based on which color component of the pixel that will be clipped for the luma value resulting in a luminance value that is closest to the original luminance value.

At least one LUT index is obtained in step S3 based on LUT-specific maximum and minimum values for the selected LUT and the original luminance value. A luma value is then determined in step S4 for the pixel based on a LUT entry fetched from the selected LUT using the at least one LUT index.

The method thereby comprises determining a clipping scenario in step S1, i.e., determining which color component of the pixel that will be clipped for the luma value resulting in a luminance value that is closest to the original luminance value of the pixel. Herein, the expressions "color component that will be clipped" and "color channel that will be clipped" are used interchangeably. Clipping of a color component or of a color channel of the pixel implies that the value of the color component exceeds a maximum value for the color component or the color channel or is below a minimum value for the color component or the color channel. Accordingly, a clipping function or operation needs to be applied to the color component or the color channel to force its value to be within the allowed range defined by maximum and minimum values. Such a clipping function is often implemented as clip(x, min, max), which returns min if x<min, max if x>max and x otherwise. In this illustrative implementation, 'min' corresponds to the minimum value for the color component or the color channel and 'max' corresponds to the maximum value for the color component or the color channel.

Thus, determining which color component that will be clipped in step S1 may, alternatively, be expressed as determining which color component of the pixel that will be smaller than a minimum value or larger than a maximum value for a luma value resulting in a luminance value that is closest to an original luminance value obtained based on the original RGB color.

In a particular embodiment, the minimum value is equal to 0 and the maximum value is equal to 1, i.e., the allowed range for the color components of the pixel is [0, 1].

A color component or a color channel exceeding its maximum value or falling below its minimum value is sometimes denoted as color saturation. Accordingly, determining which color component that will be clipped in step S1 may, alternatively, be expressed as determining which color component of the pixel that will be saturated for a luma value resulting in a luminance value that is closest to an original luminance value obtained based on the original RGB color.

The luma value resulting in a luminance value that is closest to the original luminance value of the pixel is denoted ideal luma value or optimum luma value herein. This ideal or optimum luma value is the luma value Y' that will give the correct luminance, i.e., the original luminance Yo of the pixel, using luma adjustment [2], i.e., Y'=luma_adjustment(Yo, Cb, Cr).

The next step S2 of the method in FIG. 2 comprises selecting a LUT based on the clipping scenario, i.e., based on which color component of the pixel that will be clipped as determined in step S1. Thus, there are multiple LUTs available, preferably at least one LUT per clipping scenario. For instance, the pixel has three color components and each color component can be clipped against the minimum value, e.g., 0, or the maximum value, e.g. 1. Thus, for the case of one color component is clipping there are preferably at least six LUTs available. As is further described herein, LUTs are preferably also available for the cases when two color components will be clipped and the case when no color component will be clipped. The case when all color components will be clipped can be handled without any LUT, i.e., the luma value could then be calculated without the need for any LUT implementation.

The embodiments thereby select which of the available LUTs to use for the current pixel based on the determination in step S1. The following step S3 comprises obtaining at least one LUT index for the selected LUT. The at least one LUT index is obtained in step S3 based on LUT-specific maximum and minimum values and based on the original luminance value.

Thus, at least some of the available LUTs have different maximum and minimum values, i.e., the maximum and minimum values are specific for a particular LUT and different LUTs therefore may have different combinations of such maximum and minimum values. This means that given the LUT selected in step S2, the maximum value Max and the minimum value Min associated with and thereby specific to the selected LUT are obtained and used together with the original luminance value Yo of the pixel to obtain the at least one LUT index, i.e., LUTindex=function(Max, Min, Yo).

As is further described herein, the LUTs are preferably three-dimensional (3D) LUTs, i.e., having three dimensions or bases. In such a case, at least one respective LUT index is preferably obtained for each such LUT dimension or base. The LUT-specific maximum and minimum values are then preferably also dimension or base specific. In such a case, step S3 in FIG. 2 may comprise obtaining i) a first LUT index based on LUT-specific maximum and minimum values for the selected LUT and for a first LUT dimension and based on the original luminance value, ii) a second LUT index based on LUT-specific maximum and minimum values for the selected LUT and for a second LUT dimension and based on the original luminance value, and iii) a third LUT index based on LUT-specific maximum and minimum values for the selected LUT and for a third LUT dimension and based on the original luminance value. The three LUT indices are preferably a luminance LUT index and two chroma LUT indices, such as luminance LUT index, Cb LUT index and Cr LUT index. As is further described herein, multiple, i.e., at least two, LUT indices may be determined in some embodiments for the selected LUT and for each LUT dimension, e.g., two luminance LUT indices, two Cb LUT indices and two Cr LUT indices.

Finally, the at least one LUT index obtained in step S3 is used to retrieve or fetch a LUT entry from the LUT selected in step S2 and this LUT entry is used to determine the luma value for the pixel in step S4.

In a particular embodiment applicable to 3D LUTs, the LUT entry is fetched from the selected LUT using the above-mentioned three LUT indices, e.g., LUT(luminance LUT index, Cb LUT index, Cr LUT index).

It is noted that some regions of combinations of original luminance value Yo, chroma value Cb, Cr will never be used by a particular LUT, since they will result in a different clipping than the current LUT is used for. As an example, assume we know that every combination of Yo Cb, and Cr where Cr>a and Yo>b will be clipping the red color component. This means that it is not necessary to tabulate this region in any LUT for which red is not clipped. In an embodiment, this is exploited by having, for every tabulated luminance value, such as tfi(Yo), a maximum and minimum value of Cb and Cr. Outside this range we only use the closest value in the LUT. This way we can have a much higher precision for the same number of LUT entries, or a much lower number of LUT entries for the same precision. Thus, by having LUT-specific maximum and minimum values a more efficient LUT-based implementation is achievable according to the embodiments.

It is also noted that for some values of the original luminance Yo of the pixel, we know that a particular color component will not clip. It is therefore unnecessary store the result for these original luminance Yo values in the LUT used when that color component clips. As an example, if we have determined already that the red color component clips against its maximum value (10000), we know that the luminance must be at least Yo=$w_R$*10000=2627 when $w_R$=2.627. This means that the LUT chosen when R clips against its maximum value does not need to start at zero but can rather start at a value determined based on 2627, such as tf_inv(2627)=0.8571, wherein tf_inv($\cdot$) denotes $tf^{-1}(\cdot)$, i.e., the inverse of the transfer function.

Thus, by having LUT-specific maximum and minimum values a more efficient LUT-based implementation is achievable according to the embodiments.

Furthermore, using different sizes for the different LUT dimensions means that it is possible to take advantage of the fact that many of the LUTs do not need a lot of resolution in some dimensions. As an example, the LUT when the red color component will be clipped to the maximum value is 32 units long in the luminance (tf_inv(Yo)) and Cb dimensions but only 4 units long in the Cr dimension.

In an embodiment, step S3 of FIG. 2 comprises obtaining a luminance LUT index tfiYoInt based on a quotient (tfiYo−tfiYoMin)/(tfiYoMax−tfiYoMin). In this quotient tfiYo represents an inverse transfer function of the original luminance value, i.e., $tf^{-1}$(Yo), tfiYoMax represents an inverse transfer function of the maximum value, i.e., $tf^{-1}$(YoMax), and tfiYoMin represents an inverse transfer function of the minimum value, i.e., $tf^{-1}$(YoMin). In this embodiment, YoMax and YoMin represent the maximum and minimum values for the luminance dimension.

This embodiment thereby defines the luminance index tfiYoInt=function((tfiYo−tfiYoMin)/(tfiYoMax−tfiYoMin)) for some function($\cdot$).

In an embodiment, the luminance LUT index tfiYoInt is obtained in step S3 based on the above mentioned quotient and a parameter LUTsizeYo representing a size of the selected LUT in a luminance dimension, i.e., in the luminance direction or base of the selected LUT.

This embodiment thereby defines the luminance index tfiYoInt=function((tfiYo−tfiYoMin)/(tfiYoMax−tfiYoMin), LUTsizeYo).

In an embodiment, the luminance LUT index is obtained in step S3 based on (LUTsizeYo−1)×f((tfiYo−tfiYoMin)/(tfiYoMax−tfiYoMin)), wherein f($\cdot$) is a function.

In a particular embodiment, the function f(x)=x, i.e., the luminance LUT index is obtained based on (LUTsizeYo−1)×(tfiYo−tfiYoMin)/(tfiYoMax−tfiYoMin).

In some cases, it may be advantageous to strengthen the resolution for luminance values close the minimum. This can be be performed by using a power function, i.e. f(x)=$x^p$, wherein p is a constant. In an embodiment, the constant p=1/$\gamma$ and $\gamma$ is a gamma parameter. It is advantageous to use a gamma parameter that is larger than 1.0, such as $\gamma$=1.7. In this embodiment, the luminance LUT index is obtained based on (LUTsizeYo−1)×((tfiYo−tfiYoMin)/(tfiYoMax−tfiYoMin))$^{1/\gamma}$, such as (LUTsizeYo−1)×((tfiYo−tfiYoMin)/(tfiYoMax−tfiYoMin))$^{1/1.7}$.

Other functions than a power function could be used to strengthen the resolution for values close to the minimum luminance value, such as an exponential function (ae$^{bx}$) or the transfer function tf($\cdot$).

FIG. 3 is a flow chart illustrating an embodiment of step S3 shown in FIG. 2. The method continues from step S2 in FIG. 2 (or from step S13 in FIG. 4 to be further described herein). In this embodiment, step S3 further comprises determining, in step S10, a low luminance LUT index tfiYoLoInt as the maximum of 0 and tfiYoInt. Furthermore, step S11 comprises determining a high luminance LUT index tfiYoHiInt as the minimum of (LUTsizeYo−1) and (tfiYoLoInt+1).

Hence, in this embodiment the low luminance LUT index tfiYoLoInt=max(0, tfiYoInt) and the high luminance LUT index tfiYoHiInt=min((LUTsizeYo−1), (tfiYoLoInt−1)). Thus, in a particular embodiment two luminance LUT indices are determined for the selected LUT. The usage of two luminance LUT indices instead of a single luminance LUT index enables interpolation. Generally, when using LUTs it might be best not to only take the closest value. Instead interpolation can be used by determining the closest lower and closest higher luminance LUT index and use these luminance LUT indices in order to fetch or retrieve more than one luma value from the selected LUT.

In the above described embodiments, one or more luminance LUT indices are obtained in step S3. In alternative embodiments, or embodiments that can be combined with obtaining luminance LUT index or indices, chroma LUT indices are obtained in step S3.

Thus, in an embodiment step S3 of FIG. 2 comprises obtaining, for each chroma component of a Cb chroma component and a Cr chroma component, a chroma LUT index CInt based on a quotient (C−CMin)/(CMax−Cmin). In this embodiment, C represents a chroma value of the pixel, CMax represents the maximum value that depends on the original luminance value and CMin represents the minimum value that depends on the original luminance value. In this and the following embodiments, 'C' is used to collective denote a chroma component and thereby represents 'Cb' or 'Cr'. Thus, this embodiment of step S3 comprises obtaining i) a Cb LUT index CbInt based on a quotient (Cb−CbMin)/(CbMax−Cbmin) and ii) a Cr LUT index CrInt based on a quotient (Cr−CrMin)/(CrMax−CrMin).

As mentioned above, the minimum and maximum values CMin, CMax preferably depend on the original luminance value, i.e., CMin[Yo], CMax[Yo] or CMin[tfiYoInt], CMin[tfiYoInt], wherein tfiYoInt is the previously described luminance LUT index.

Generally, all possible chroma Cb, Cr values [−0.5, 0.5] are not not always applicable, which is further disclosed herein. For instance, if the red color component will be clipped and a Cr component larger than 0 would imply that the luma value will be smaller than 0, which is not allowed, then it is not necessary to include any entries in this LUT where Cr>0. The dependency of the minimum and maximum values CMin, CMax on the original luminance value, and more preferably on the luminance LUT index, which in turn is preferably dependent on the original luminance value, increases the precision in chroma.

In an embodiment, step S3 comprises obtaining, for each chroma component of the Cb chroma component and the Cr chroma component, the chroma LUT index based on the quotient and a parameter LUTsizeC representing a size of the selected LUT table in a chroma dimension. Hence, in this embodiment the chroma LUT index is not only determined based on function((C−CMin)/(CMax−Cmin)) but rather on function((C−CMin)/(CMax−Cmin), LUTsizeC).

In a particular embodiment, step S3 comprises obtaining, for each chroma component of the Cb chroma component and the Cr chroma component, the chroma LUT based on (LUTsizeC−1)×(C−CMin)/(CMax−Cmin).

FIG. 4 is a flow chart illustrating an embodiment of step S3 shown in FIG. 2. The method continues from step S2 in FIG. 2 (or from step S11 in FIG. 3 previously described herein). In this embodiment, step S3 further comprises determining, in step S12, a low chroma LUT index CLoInt as the maximum of 0 and CInt. Furthermore, step S13 comprises determining a high chroma LUT index CHiInt as the minimum of (LUTsizeC−1) and (CLoInt+1).

Hence, in this embodiment the low chroma LUT index CLoInt=max(0, CInt) and the high chroma LUT index CHiInt=min((LUTsizeC−1), (CLoInt−1)).

Thus, in a particular embodiment two chroma LUT indices are determined for the selected LUT per chroma component. The usage of two chroma LUT indices instead of a single chroma LUT index per chroma component enables interpolation. Generally, when using LUTs it might be best not to only take the closest value. Instead interpolation can be used by determining the closest lower and closest higher chroma LUT index and use these chroma LUT indices in order to fetch or retrieve more than one luma value from the selected LUT.

Step S4 of FIG. 2 thereby comprises, in an embodiment, determining the luma value based on interpolation between LUT entries fetched from the selected LUT using the obtained luminance LUT indices (tfiYoLoInt, tfiYoHiInt) and the obtained chroma LUT indices (CbLoInt, CbHiInt, CrLoInt, CrHiIn).

Thus, in an embodiment step S3 comprises obtaining multiple LUT indices based on the LUT-specific maximum and minimum values for the selected LUT and the original luminance value. In this embodiment, step S4 comprises determining the luma value as a linear combination of multiple LUT entries fetched from the selected LUT using the multiple LUT indices.

A particular embodiment involves using trilinear interpolation of LUT entries to determine the luma value. Such a particular embodiment is illustrated in FIG. 5.

The method continues from step S3 in FIG. 2. A next step S20 comprises calculating a first linear combination of a first LUT entry fetched from the selected LUT using the low luminance LUT index, a low Cb chroma LUT index and a low Cr chroma LUT index and a second LUT entry fetched from the selected LUT using the low luminance LUT index, a high chroma Cb LUT index and the low chroma Cr LUT index. Step S21 correspondingly comprises calculating a second linear combination of the first LUT entry fetched from the selected LUT using the low luminance LUT index, the low Cb chroma LUT index and the low Cr chroma LUT index and a third LUT entry fetched from the selected LUT using the low luminance LUT index, the low chroma Cb LUT index and a high chroma Cr LUT index. A third linear combination is then calculated in step S22 of the first linear combination and the second linear combination.

This embodiment also comprises calculating, in step S23, a fourth linear combination of a fourth LUT entry fetched from the selected LUT using the high luminance LUT index, the low Cb chroma LUT index and the low Cr chroma LUT index and a fifth LUT entry fetched from the selected LUT using the high luminance LUT index, the high chroma Cb LUT index and the low chroma Cr LUT index. Step S24 correspondingly comprises calculating a fifth linear combination of the fourth LUT entry fetched from the selected LUT using the high luminance LUT index, the low Cb chroma LUT index and the low Cr chroma LUT index and a sixth LUT entry fetched from the selected LUT using the high luminance LUT index, the low chroma Cb LUT index and the high chroma Cr LUT index. A sixth linear combination is then calculated in step S25 of the fourth linear combination and the fifth linear combination.

Steps S20, S21, S23 and S24 described above can be performed in serially in any order or at least partly in parallel.

Finally, step S26 comprises determining the luma value based on a linear combination of the third linear combination and the sixth linear combination.

Thus, the embodiment illustrated in FIG. 5 and described above uses trilinear interpolation to determine the luma value. The trilinear interpolation is thereby done over LUT entries fetched using respective high and low luminance and chroma LUT indices.

The calculations in steps S20 to S22 could thereby be defined as $1^{st}$ linear combination=linearBlend1(LUT(tfiYoLoInt, CbLoInt, CrLoInt), LUT(tfiYoLoInt, CbHiInt, CrLoInt)), $2^{nd}$ linear combination=linearBlend2(LUT(tfiYoLoInt, CbLoInt, CrLoInt), LUT(tfiYoLoInt, CbLoInt, CrHiInt)), and $3^{rd}$ linear combination=linearBlend3(1st linear combination, $2^{nd}$ linear combination). Correspondingly, steps S23 to S25 could be defined as $4^{th}$ linear combination=linearBlend4(LUT(tfiYoHiInt, CbLoInt, CrLoInt), LUT(tfiYoHiInt, CbHiInt, CrLoInt)), $5^{th}$ linear combination=linearBlend5(LUT(tfiYoHiInt, CbLoInt, CrLoInt), LUT(tfiYoHiInt, CbLoInt, CrHiInt)), and $6^{th}$ linear combination=linearBlend6($4^{th}$ linear combination, $5^{th}$ linear combination). Finally, step S26 comprises Y'=linearBlend6($3^{rd}$ linear combination, $6^{th}$ linear combination), wherein linearBlendX(a, b), X=1 . . . 6 represents a same or different linear combinations of a and b.

In an embodiment, the linear combinations mentioned above are calculated as average values. Thus, linearBlendX(a, b)=(a+b)/2 for all X=1 . . . 6.

In other embodiments, the linear combinations mentioned above are calculated as weighted linear combinations, such as linearBlendX(a, b)=$(1-\alpha_X)_X$a+$\alpha_X$×b, wherein $\alpha_X$ is a weight or blend factor, also denoted interpolation parameter herein, X=1 . . . 6.

For instance, the embodiment starts with the luminance LUT indices (tfiYoLoInt, tfiYoHiInt) and the chroma LUT indices (CbLoInt, CbHiInt, CrLoInt, CrHiIn). Next the chroma Cr values identified by the chroma Cr LUT indices are recovered:

double CrLo=clamp(k[tfiYoLoInt]*(1.0*CrLoInt)+m[tfiYoLoInt],−0.5,0.5);

double CrHi=clamp(k[tfiYoLoInt]*(1.0*CrHiInt)+m[tfiYoLoInt],−0.5,0.5);

where m[ ] and k[ ] are lookup-tables which store
m[x]=CrMin[x]
k[x]=(CrMax[x]−CrMin[x])/lutSizeCrMinus1;
We can now find the interpolation parameter CrAlpha:

```
if(CrHi == CrLo)
    CrAlpha = 0.0;
else
    CrAlpha = (Cr-CrLo)/(CrHi-CrLo);
```

The same thing is done for the chroma Cb component:

double $CbLo$=clamp($q[tfiYoLo\text{Int}]*(1.0*CbLo\text{Int})+h[tfiYoLo\text{Int}]$,−0.5,0.5);

double $CbHi$=clamp($q[tfiYoLo\text{Int}]*(1.0*CbHi\text{Int})+h[tfiYoLo\text{Int}]$,−0.5,0.5);

where h[ ] and g[ ] are lookup-tables which store $h[x]=Cb\text{Min}[x]$ $q[x]=(Cb\text{Max}[x]-Cb\text{Min}[x])/\text{lutSize}Cb\text{Minus1}$;

We can now find the interpolation parameter CbAlpha:

```
if(CbHi == CbLo)
    CbAlpha = 0.0;
else
    CbAlpha = (Cb-CbLo)/(CbHi-CbLo);
```

Given these two interpolation parameters, it is now possible to interpolate a luma value for when tifYo=tfiYoLo:

bot=linearBlend(LUT
 [$Cb$LoInt*LUTsizeCr*LUTsizeYo+
 $Cr$LoInt*LUTsizeYo+tfiYoLoInt],LUT
 [$Cb$HiInt*LUTsize$Cr$*LUTsizeYo+
 $Cr$LoInt*LUTsizeYo+tfiYoLoInt],$Cb$Alpha);

top=linearBlend(LUT
 [$Cb$LoInt*LUTsize$Cr$*LUTsizeYo+
 $Cr$HiInt*LUTsizeYo+tfiYoLoInt],LUT
 [$Cb$HiInt*LUTsize$Cr$*LUTsizeYo+
 $Cr$HiInt*LUTsizeYo+tfiYoLoInt],$Cb$Alpha);

bilin1=linearBlend(bot,top,$Cr$Alpha);

Here LUTsizeCr is the size of the LUT in the Cr dimension, LUTsizeCb is the size of the LUT in the Cb dimension, and LUTsizeYo is the size of the LUT in the tfiYo dimension.

Also, the function linearBlend just does a linear blend between the two values according to double linearBlend (double low, double high, double alpha)

```
{
    return ((1-alpha)*low + alpha*high);
}
```

We have now obtained a bilinearly blended luma value for the case when tfiYo=tfiYoLo. We then repeat the Cr and Cb calculations but this time for tfiYoHiInt. As seen above, bilin1 is the value obtained for tfiYoLoInt. Let bilin2 be the value obtained for tfiYoHiInt:

bot=linearBlend(LUT
 [$Cb$LoInt*LUTsize$Cr$*LUTsizeYo+
 $Cr$LoInt*LUTsizeYo+tfiYoHiInt],LUT
 [$Cb$HiInt*LUTsize$Cr$*LUTsizeYo+
 $Cr$LoInt*LUTsizeYo+tfiYoHiInt],$Cb$Alpha);

top=linearBlend(LUT
 [$Cb$LoInt*LUTsize$Cr$*LUTsizeYo+
 $Cr$HiInt*LUTsizeYo+tfiYoHiInt],LUT
 [$Cb$HiInt*LUTsize$Cr$*LUTsizeYo+
 $Cr$HiInt*LUTsizeYo+tfiYoHiInt],$Cb$Alpha);

bilin2=linearBlend(bot,top,$Cr$Alpha);

We then get the trilinearly interpolated value as double trilin=linearBlend(bilin1,bilin2,$tfiYo$Alpha);

where tfiYoAlpha is obtained as

```
if(tfiYoHi==tfiYoLo)
    tfiYoAlpha = 0.0;
else
    tfiYoAlpha = (tfiYo - tfiYoLo)/(tfiYoHi-tfiYoLo);
```

In FIG. 5, the luma value is determined based on linear combinations of multiple LUT entries. The interpolation embodiment has been illustrated in terms of sequential calculations of linear combinations in steps S20 to S25, which are then used in the final step S26 to determine the luma value. Instead of calculating these linear combinations serially, it is of course possible to determine the luma value directly in a single step, or in fewer than seven steps.

For instance, suppose that we want to find the value of the unknown function f at the point (x, y). It is assumed that we know the value of f at the four points $Q_{11}=(x_1, y_1)$, $Q_{12}=(x_1, y_2)$, $Q_{21}=(x_2, y_1)$, and $Q_{22}=(x_2, y_2)$. We first do linear interpolation in the x-direction. This yields $$f(x, y_1) \approx \frac{x_2 - x}{x_2 - x_1} f(Q_{11}) + \frac{x - x_1}{x_2 - x_1} f(Q_{21})$$

$$f(x, y_2) \approx \frac{x_2 - x}{x_2 - x_1} f(Q_{12}) + \frac{x - x_1}{x_2 - x_1} f(Q_{22})$$

We proceed by interpolating in the y direction to obtain the desired estimate:

$$f(x, y) \approx \frac{y_2 - y}{y_2 - y_1} f(x, y_1) + \frac{y - y_1}{y_2 - y_1} f(x, y_2)$$

However, instead of performing the linear interpolation first in the x direction and then in the y direction, the value of the unknown function f at the point (x, y) can instead be obtained in a single calculation step:

$$f(x, y) \approx$$
$$\frac{1}{(x_2 - x_1)(y_2 - y_1)} (f(Q_{11})(x_2 - x)(y_2 - y) + f(Q_{21})(x - x_1)(y_2 - y) +$$
$$f(Q_{12})(x_2 - x)(y - y_1) + f(Q_2)(x - x_1)(y - y_1))$$

The two approaches are mathematically equivalent and give the same result f(x, y).

Thus, the embodiment illustrated in FIG. 5 may be performed in 7 seven steps as shown in the figure, but could alternatively be performed in fewer steps by combining two or more of the linear combinations or interpolations, thereby resulting in 6, 5, 4, 3, 2 or even a single step.

The two approaches are mathematically equivalent and give the same result f(x, y).

Thus, the embodiment illustrated in FIG. 5 may be performed in 7 seven steps as shown in the figure, but could alternatively be performed in fewer steps by combining two or more of the linear combinations or interpolations, thereby resulting in 6, 5, 4, 3, 2 or even a single step.

As mentioned above, instead of just using the nearest value in the LUT using a single luminance LUT index, a single chroma Cb LUT index and a single chroma Cr LUT index, an embodiment fetches the eight closest luma values from the LUT and performs trilinear interpolation. Such an approach contributes to a smoother function and a much closer fit to the real function.

In the above described embodiments the luma value is determined based on linear combinations of LUT entries fetched from the selected LUT. In alternative embodiments, other combinations of LUT entries than linear combinations may instead be used to combine multiple LUT entries into a luma value.

In an embodiment, step S26 of FIG. 5 comprises determining the luma value based on clipping the linear combination to be within an allowed range. In this embodiment, the allowed range is determined based on which color component that will be clipped for the luma value resulting in a luminance value that is closest to the original luminance value.

Thus, in a particular embodiment the luma value obtained from the linear combination, preferably the above mentioned trilinear interpolation, is first clipped to be within an allowed range rather than being used directly as luma value for the current pixel. The allowed range is preferably also dependent on which color component that will be clipped as determined in step S1 of FIG. 2.

As an example, if we have already established that the best luma value Y' produces an R' that will be Clipped against 0, i.e., is smaller than zero, step S26 should not return a luma value for which R'>0. Since R'=Y'+a13×Cr, the maximally allowed value for Y' should be −a13×Cr. As an example, if Cr=−0.3, this means −a13×Cr=−1.4746×(−0.3)=0.4424 should be the largest allowed Y' to be returned. Any value larger than this will not make R' clip against 0.

Thus, the allowed range is preferably 0.0≤Y'≤−a13×Cr if the red color component will be clipped against 0, 1−a13×Cr≤Y'≤1.0 if the red color component will be clipped against 1, 0.0≤Y'≤a22×Cb+a23×Cr if the green color component will be clipped against 0, 1+a22×Cb+a23×Cr≤Y'≤1.0 if the green color component will be clipped against 1, 0.0 Y'−a32×Cb if the blue color component will be clipped against 0, and 1−a32×Cb≤Y'≤1.0 if the blue color component will be clipped against 1.

This preferred clipping of the luma value means that it is possible to allow very large values of the luma component Y', which may help the function Y=$w_R$tf(R')+$w_G$tf(G')+$w_B$tf(B') to be smooth and easy to approximate with a small LUT. Thus, by clipping the luma value to be within the allowed range, there is no danger of returning a too big value.

The above described embodiment of clipping the luma value may also be used to other embodiments of determining the luma value, i.e., not necessarily to the embodiments of linear interpolations or combinations of multiple LUT entries. This is shown in FIG. 6. In this embodiment, the method continues from step S4 in FIG. 2. A next step S5 comprises clipping the luma value to be within an allowed range defined based on which color component of the pixel that will be clipped for the luma value resulting in a luminance value that is closest to the original luminance value.

Thus, the preferred clipping as disclosed herein may be applied to any embodiment regardless of how the luma value is determined.

FIG. 7 is a flow chart illustrating an embodiment of step S1 in FIG. 2. In this embodiment, determining which color component of the pixel that will be clipped comprises calculating, in steps S30-S32, a luma value $Y'_{RClip}$ where a red color component will be clipped, a luma value $Y'_{GClip}$ where a green color component will be clipped and a luma value $Y'_{BClip}$ where a blue color component will be clipped. These three luma values calculated in steps S30-S32 are sorted in step S33 in ascending order to obtain sorted luma values $Y'_a$, $Y'_b$, $Y'_c$. Respective luminance values $Y_a$, $Y_b$, $Y_c$ are calculated, in step S34, for the sorted luma values $Y'_a$, $Y'_b$, $Y'_c$. A next step S35 comprises identifying an interval defined by the luminance values $Y_a$, $Y_b$, $Y_c$ to which the original luminance value belongs. Finally, step S36 comprises determining which color component of the pixel that will be clipped based on a comparison of a luma value representative of the identified interval and luma values where the red, green and blue color components will be clipped.

The luminance for a pixel is calculated as $Y=w_R tf(R')+w_G tf(G')+w_B tf(B')$, where R', G' and B' are obtained as $R'=Y'+a13*Cr$ $G'=Y'-a22*Cb-a23*Cr$ $B'=Y'+a32*Cb$.

In steps S30-S32, we are interested when R', G', and B' will be clipped, i.e., when R'<0 or R'>1, G'<0 or G'>1, B'<0 or B'>1. This can only happen when r+a13*Cr≤0 or Y'+a13*Cr≥1 for the red color component, and using similar expressions from the equation above for the other two color component. We therefore create helper variables $Rt=a13*Cr$ $Gt=-a22*Cb-a23*Cr$ $Bt=a32*Cb$, which means that the luminance for a pixel can instead be calculated using $Y=w_R tf(Y'+Rt)+w_G tf(Y'+Gt)+w_B tf(Y'+Bt)$.

Thus, in an embodiment steps S30-S32 in FIG. 7 comprises first calculating the helper variables Rt, Gt, and Bt. Then the luma values $Y'_{RClip}$, $Y'_{GClip}$, $Y'_{BClip}$ are calculated. For instance, $Y'_{RClip}$ is −Rt if the red color component clips against 0, and 1−Rt if the red color component clips against 1. Note that it cannot clip both 0 and 1 for legal values of Y'.

Step S35 of FIG. 7 identifies an interval defined by the luminance values calculated in step S34, i.e., $Y_a$, $Y_b$, $Y_c$. For instance, if $Y_a$<Yo<$Y_b$. In such a case, the corresponding luma interval will be [$Y'_a$, $Y'_b$]. The available corresponding luma intervals are [0, $Y'_a$], [$Y'_a$, $Y'_b$], [$Y'_b$, $Y'_c$] and [$Y'_c$, 1]. In step S36, a luma value representative of the interval is determined. This can, for instance, be the mid-point of the interval, such as Y'mid=($Y'_a$+$Y'_b$)/2. This luma value, e.g., mid-point of the interval, is then tested against −Rt and 1−Rt for the red color component and likewise for the green and blue color components in order to determine which color component of the pixel that will be clipped. For instance if Y'mid<–Rt the red color component will be clipped against zero or if Y'mid>1–Rt the red color component will be clipped against one.

In an embodiment, instead of storing the actual luma value Y' in the LUT, values from a similar function that is guaranteed to follow the clipping rules are instead stored. As an example, inside the process creating the LUT for the case when the red color component clips to zero but the green and blue color components do not clip, we do not try to match the luminance using the function $$Yo = w_R tf(Y' + a_{13}Cr) + w_G tf(Y' - a_{22}Cb - a_{23}Cr) + w_B tf(Y' + a_{32}Cb) \quad (1),$$

instead we use $$Yo = w_G tf(Y' - a_{22}Cb - a_{23}Cr) + w_B tf(Y' + a_{32}Cb) \quad (2).$$

For values that actually do clip red against zero this does not matter, but for values that do not clip red against zero it does make a difference. And due to interpolation, LUT entries for combinations of Cb, Cr and Yo that do not clip will also be used. By forcing the function to always have a zero output from red in this case, it is possible to avoid discontinuities in the function that would upset the interpolation. This avoids interpolating across the discontinuity. The result is improved accuracy of the interpolated value, which can be traded for a smaller table for the same performance. A further refinement is to replace Equation (2) above with $$Yo = w_G tf^*(Y' - a_{22}Cb - a_{23}Cr) + w_B tf^*(Y' + a_{32}Cb) \quad (2.1),$$

where $tf^*(x)$ is a function that is equal to $tf(x)$ for values of $x<1.0$, but for values of $x>1.0$, instead of saturating to the maximum value $t_m=10000$, the function continues with the same slope as right before the point $x=1.0$, see FIG. 10 where the thin line represents $tf(x)$ and the thick line represents $tf^*(x)$. This will greatly help interpolation, which will not be upset by the discontinuity at $x=1.0$. Accordingly, no interpolation across a discontinuity will take place.

In order to be able to use Equation (2.1) or Equation (2) instead of Equation (1), it is preferred that the interpolated value obtained from the LUT is clamped against its allowed values before being used. For instance, if the red color component is known to clip against 1, i.e., we know that R'>1, this means that Y'+a13*Cr>1, which in turn means that Y' must be larger than 1–a13*Cr. Hence it does not make sense to allow a value lower than 1–a13*Cr as the resulting luma value Y'. While this may look like a detail, it has huge implications. Removing the clamping but still using Equation (2.1), for instance, increases the worst case error by a factor of 6. However, if we do use the clamping, and combine it with a LUT created using a function like that in Equation (2.1), the resulting interpolated and clamped value from the LUT will be much closer to the true value. Hence, clamping to allowed values after interpolation is an important step that gives non-obvious increases in performance when combined with a LUT creation using non-discontiuous functions, such as the one in Equation (2.1).

In an embodiment, by allowing negative values for luma Y' in the LUTs it is possible to get better accuracy for values that have tfiYo close to zero. When no color channel clips, there is only one allowed value for tfiYo=0 and that is when Cb=0 and Cr=0. Hence, this particular value almost never occurs. However, there are several allowed combinations of tfiYo, Cb and Cr for values of tfiYo between the two lowest quantization levels for tfiYo. As an example, if we have tfiYo quantized to 32 steps, there are several values of tfiYo that would be quantized to between step 0 and 1. All of these will use level zero for interpolation. What we can do instead is to set the values at level zero so that they are optimized for values in between 0 and 1, at the virtual level of 0.5. This will lower the worst case error considerably. In order to do that we must allow negative values of Y', and therefore the function later making use of the LUT must be able to clamp the values so that they are bigger than zero. A similar approach may be taken near the highest quantization level of, say 31.

In general, by allowing some Y' values in the LUTs to be negative and others to be larger than 1.0, it is possible to again avoid discontinuities that would otherwise upset the interpolation. Allowing such out-of-bounds values therefore increases the precision.

An advantage of the embodiments is that the current invention describes a LUT-based solution that is both small, around 200 kBytes, but also gives a low worst-case error and a very good average error. It can be implemented in a known number of clock cycles which is ideal for hardware implementations and other real time systems.

FIG. 8 is a flow chart illustrating a method for processing a pixel in a picture. The method may be performed by an encoder. The method comprises the steps of determining, in step S40, a clipping scenario, i.e., determining which color component(s) that will be clipped. The method also comprises selecting, in step S41, a LUT based on the determination in step S40. The values of the LUT are calculated based on a maximum and a minimum value of Cb and Cr for a tfiYo or max/min Cb index, and max/min Cr index for each tfiYoInt. The method further comprises performing, in step S42, luma adjustment by using the selected LUT.

According to an embodiment, a method according to the aspect above, performs luma adjustment by using the selected LUT. The method comprises obtaining an index tfiYoLoInt for tfiYo using tfiYoMin and tfiYoMax. The method also comprises obtaining an index CbLoInt for Cb using tfiYoLoInt and a first table and obtaining an index CrLoInt for Cr using tfiYoLoInt and a second table. The method further comprises fetching the entry tfiYoLoInt, CbLoInt, CrLoInt from the LUT, interpolateing the fetched value, and clamping the interpolated fetched value to its allowed range.

In the following, various embodiments and implementation aspects of the present invention are described and exemplified.

The description of various embodiments and implementation aspects starts with describing how the LUTs are used once they are created. In essence, the goal is to determine a luma Y' component as a function of the luminance Yo, i.e., the original luminance of a pixel, and chroma Cb, Cr, such as Y'=getLumaFromLUT(Yo, Cb, Cr). The description then continues with discussing how the values stored in the LUTs can be determined.

Note that a useful implementation in an encoder does not need to create the LUTs. It can read the LUT values from a memory, such as a read-only memory (ROM), or as part of the source code, or from disk, etc. This section can therefore be read as a guide to how to use a LUT that has already been created and handed to you.

The first step of determining a luma value Y' using the LUT is to find out which components will clip for the ideal Y'. How to do this is described in JCTVC-X0036 [6], see Section 4.2 in [6], but is repeated here for the convenience of the reader.

The luminance for a pixel is calculated as $$Yo = w_R tf(R') + w_G tf(G') + w_B tf(B'), \quad (3)$$

where R', G' and B' are obtained as $$R'=Y'+a13*Cr$$

$$G'=Y'-a22*Cb-a23*Cr$$

$$B'=Y'+a32*Cb. \quad (4)$$

We are interested when R', G', and B' clip, i.e., when R'<0 or R'>1, G'<0 or G'>1, B'<0 or B'>1. We notice that this can only happen when Y'+a13*Cr≤0 or Y'+a13*Cr≥1 for the red channel, and using similar expressions from Equation (4) for the other two color channels. We therefore create helper variables $$Rt=a13*Cr$$

$$Gt=-a22*Cb-a23*Cr$$

$$Bt=a32*Cb, \quad (5)$$

which means that the luminance for a pixel can instead be calculated using $$Y=w_R tf(Y'+Rt)+w_G tf(Y'+Gt)+w_B tf(Y'+Bt). \quad (6)$$

We are now ready to follow the proceeding steps:
1. First calculate Rt, Gt, and Bt using Equation (5).
2. Calculate the Y' value where the red channel, i.e. the red color component, starts to clip. It is −Rt if it clips against 0, and 1−Rt if it clips against 1. Note that it cannot clip both 0 and 1 for legal values of Y'. Store this value as $Y'_{Rclip}$ and do the same for the green and blue channels, i.e., the green and blue color components.
3. Sort the values $\{Y'_{RClip}, Y'_{Gclip}, Y'_{Bclip}\}$, call the sorted values $\{Y'_a, Y'_b, Y'_c\}$.
4. Calculate the luminances $\{Y_a, Y_b, Y_c\}$ associated with $\{Y'_a, Y'_b, Y'_c\}$ using Equation (6).
5. Figure out which interval contains the desired luminance $Y_{target}$. For instance, if $Y_a<Y_{target}<Y_b$ then we know that Y' belongs to the interval $[Y'_a, Y'_b]$. We call this interval $[Y'_{low}, Y'_{high}]$.
6. Figure out the clipping variables n and l for this interval. This can, for instance, be done by calculating the mid-point of the interval Y'mid=$(Y'_{low}+Y'_{high})/2$ and testing Y'mid against −Rt and 1−Rt for the red channel and likewise for the green and blue channels using the following pseudo code:

```
// Step 6: Set Clipping variables for this branch
int l[3] = {0, 0, 0};
int n[3] = {0, 0, 0};
if( (YpMid + Rterm > 0)&&(YpMid + Rterm < 1) )
    n[0] = 1;
else if( YpMid + Rterm > 1)
    l[0] = 1;
if( (YpMid + Gterm > 0)&&(YpMid + Gterm < 1) )
    n[1] = 1;
else if( YpMid + Gterm > 1)
    l[1] = 1;
if( (YpMid + Bterm > 0)&&(YpMid + Bterm < 1) )
    n[2] = 1;
else if( YpMid + Bterm > 1)
    l[2] = 1;
```

Here the variables n=$(n_0, n_1, n_2)$, also written as n[0], n[1] and n[2] above, and l=$(l_0, l_1, l_2)$, also written as l[0], l[1], l[2] above, describe which variables clip. As an example, $n_0$ and $l_0$ are now set according to if the red component clips according to:

$$n_0 = \begin{cases} 0 & \text{if the optimum } Y'^* \text{ makes } R' \text{ clip against 0 or 1} \\ 1 & \text{otherwise} \end{cases}$$

$$l_0 = \begin{cases} 1 & \text{if the optimum } Y'^* \text{ makes } R' \text{ clip against 1} \\ 0 & \text{otherwise.} \end{cases}$$

Whether and how the green component clips is described by $n_1$ and $l_1$ and $n_2$ and $l_2$ describe the blue component.

Since either color component can either clip against 0, against 1 and not clip there are $3^3=27$ possible combinations. However, only a handful of these need to be solved by the lookup-table technique, which we will go through in the following sections.

Note that to execute step 4 we need to calculate Equation (6) three times. Each time involves the calculation of the transfer function tf(x). This transfer function can for instance be the transfer function defined in Equation 4.1 in SMPTE document [7]. Alternatively, it can be the Hybrid Log Gamma transfer function, or the BT.709 transfer function, or any other transfer function. In the remaining disclosure, we will go through the case when it is equal to the SMPTE ST 2084 transfer function, also known as the PQ transfer function.

Many of these transfer functions are expensive to calculate. Therefore, we can instead use a LUT for tf(x). As an example, a LUT of size 2048 elements can be used, if interpolation is used. Assume that we want to evaluate tf(x) for a value of x between 0 and 1. We can then interpolate using the following pseudo code:

```
double floatindex = (LUTSIZE_MINUS_ONE*1.0)*x;
int lowerindex = (int)((LUTSIZE_MINUS_ONE*1.0)*x);
double fracindex = floatindex − lowerindex;
int higherindex = iMin(lowerindex+1, LUTSIZE_MINUS_ONE);
double lowerval = LUT_pq_eotf[lowerindex];
double higherval = LUT_pq_eotf[higherindex];
double tfx = (1−fracindex) * lowerval + fracindex * higherval;
```

In this case the LUTSIZE_MINUS_ONE equals 2047, and iMin(a,b) calculates the minimum value of the two integers a, b. The LUT LUT_pq_eotf can be created using

```
int numbits = 11;
int topval = (1 << numbits) − 1;
for(int qq = 0; qq<=topval; qq++)
    LUT_pq_eotf[qq] = pq_eotf( (qq*1.0)/(topval*1.0) );
```

Where pq_eotf(x) executes the transfer function tf(x).

Note that when executing step 4, we know that one of the color channels will clip, so we do not need to calculate the transfer function for this value. Hence, we need to execute the transfer function two times for each of $Y'_a, Y'_b, Y'_c$, i.e., six times in total. Since this may need to be done in parallel we can implement six instances of the LUT. We need two values from each LUT, namely the one in lowerindex and the one in higherindex. However, we can arrange the LUT so that we can access odd values from one LUT-partition and even values from another LUT-partition. Since higherindex differs from lowerindex with 1, both requests cannot be odd, and both cannot be even. Thus, in all we need six instances of 2048 values, or 12288 values. If 16 bits are used per value, this means 24 kBytes of data.

The case when all color channels clip (n[0]+n[1]+n[2]=0)
In the case when n[0]+n[1]+n[2]=0, we know that all color channels clip in the interval that contains the best Y', [Y'$_{low}$,Y'$_{high}$]. Since any Y' value in this interval will produce the same and optimal luminance, it doesn't matter which value we take. We can then take, for instance, the middle value Y'mid=(Y'$_{low}$+Y'$_{high}$)/2. This case covers 8 of the possible 27 cases. Thus, for this case, no LUT is needed.

The Case when Exactly Two Color Channels Clip (n[0]+n[1]+n[2]=1)

In this case two color channels clip. This case covers 12 of the remaining 19 cases, leaving 7 for the following sections. In this situation we know the values of two of the color channels, and only one color channel is influenced by the luma Y'. As an example, if red clips against 0 and blue clips against 1, Equation (1) used to calculate the original luminance value $$Yo = w_R tf(Y' + a_{13}Cr) + w_G tf(Y' - a_{22}Cb - a_{23}Cr) + w_B tf(Y' + a_{32}Cb), \quad (1)$$

Becomes which can be simplified to $$Yo = 0 + w_G tf(Y' - a_{22}Cb - a_{23}Cr) + w_B 10000 \quad (8)$$

but since Y' only appears once, we can solve for Y':

$$Y' = tf^{-1}\left(\frac{Y_O - w_B 10000}{w_G}\right) + a_{22}Cb + a_{23}Cr. \quad (9)$$

We therefore need a look-up table for $tf^{-1}(x)$. Since this function is very steep for small values of x, it may be necessary to have several LUTs depending upon how small the value is. As an example, we can use five LUTs of size 2048 which are created using

```
int numbits = 11;
int topval = (1 << numbits) - 1;
// Convert back to linear light
for(int qq = 0; qq<=topval; qq++)
{
    LUT_pq_eotf_inv10k[qq] = pq_eotf_inv(
        10000.0*((qq*1.0)/(topval*1.0)) );
    LUT_pq_eotf_inv1k[qq] = pq_eotf_inv(
        1000.0*((qq*1.0)/(topval*1.0)) );
    LUT_pq_eotf_inv100[qq] = pq_eotf_inv(
        100.0*((qq*1.0)/(topval*1.0)) );
    LUT_pq_eotf_inv10[qq] = pq_eotf_inv(
        10.0*((qq*1.0)/(topval*1.0)) );
    LUT_pq_eotf_inv1[qq] = pq_eotf_inv(
        1.0*((qq*1.0)/(topval*1.0)) );
}
``` where pq_eotf_inv(x) implements $tf^{-1}(x)$. When we want to evaluate $tf^{-1}(x)$ we first select which LUT to use, for instance using the following pseudo code:

```
if(Y_lin_facit_pix > 1000.0*k)
    LUT_to_use = LUT_pq_eotf_inv_10k;
else if(Y_lin_facit_pix > 100.0*k)
    LUT_to_use = LUT_pq_eotf_inv_1k[lowerindex];
else if(Y_lin_facit_pix > 10.0*k)
    LUT_to_use = LUT_pq_eotf_inv_100[lowerindex];
else if(Y_lin_facit_pix > 1.0*k)
    LUT_to_use = LUT_pq_eotf_inv_10[lowerindex];
Else
    LUT_to_use = LUT_pq_eotf_inv_1[lowerindex];
``` where k=2046/2047. We can now use interpolation similar to that of the pseudo code for LUT_pq_eotf above to obtain the number we are looking for. Note that we do not need to implement the selection of the LUT as is described above with if-statements. If we instead of using a table where the largest allowed value is 10000, 1000, 100, 10 and 1 we use 10000, 1024, 128, 16 and 2 we can count the number of leading zeros of the luminance value, if converted to an integer, and use that value to select the table. Counting the number of leading zeros in a number can be done in one clock cycle, which means it can be implemented quickly in hardware. In Table 1, we have listed the binary expression for a number of values, and the result of count leading zeros (CLZ) for them.

TABLE 1

| binary expressions and CLZ | | | |
|---|---|---|---|
| Value | 16 bit binary | CLZ | s = (CLZ − 2) div 3 |
| 8192 | 0010000000000000 | 2 | 0 |
| 1024 | 0000010000000000 | 5 | 1 |
| 128 | 0000000010000000 | 8 | 2 |
| 16 | 0000000000010000 | 11 | 3 |
| 2 | 0000000000000010 | 14 | 4 |

We, thus, convert the value x to a 16 bit integer unless it is already in this form. We then count the number of leading zeros, subtract 2 and do integer division by 3. We then get the s-value also tabulated in Table 1. The address of the LUT of interest is now s*LUTsize, where LUTsize in this case is 2048. Here the LUTs are laid out in memory according to short LUT_pq_eoff_inv_10000[2048]; //4096 bytes of the largest table
short LUT_pq_eoff_inv_1024[2048]; //4096 bytes of the largest table
short LUT_pq_eoff_inv_128[2048]; //4096 bytes of the largest table
short LUT_pq_eoff_inv_16[2048]; //4096 bytes of the largest table
short LUT_pq_eoff_inv_2[2048]; //4096 bytes of the largest table As an example, if we have a Y value of 367.43, it becomes after conversion to integer 367, and CLZ will be 7. This means s=(7−2) div 3=5 div 3=1. We should therefore use the table 20481 values after LUT_pq_eoff_inv_100000, which is the base address for LUT_pq_eoff_inv_1024[ ]. This is correct, since the value of 367.43 is larger than 128 but smaller than 1024. In this case the LUT will have different maximum values; for instance LUT_pq_eoff_inv_128 will go up to values of 128 instead of 100 as before. Above we have shown the special case where R clips against 0 and B clips against 1. However, we can use a general formula for all the cases. Note that Equation (6) could be written as $$Y = w_R tf(\text{clip}(Y'+Rt,0,1)) + w_G tf(\text{clip}(Y'+Gt,0,1)) + w_B tf(\text{clip}(Y'+Bt,0,1)). \quad (10)$$

where clip(x,a,b) returns a if x<a, b if x>b and x otherwise. But tf(clip(Y'+Rt,0,1)) can be written as $n_0 tf(Y+Rt) + l_0 t_m$, where $t_m$ is the maximum output value for tf( ), in this case $t_m$=tf(1)=10000. We can do likewise for blue and green. Therefore, Equation (10) can be written as $$Y = w_R n_0 tf(Y'+Rt) + w_R l_0 t_m + w_G n_1 tf(Y'+Gt) + w_G l_1 t_m + w_B n_2 tf(Y'+Bt) + w_B l_2 t_m. \quad (11)$$

Gathering terms all the terms not including tf( ) on the left side gives $$Y - w_R l_0 t_m + w_G l_1 t_m + w_B l_2 t_m = w_R n_0 tf(Y'+Rt) + w_R l_0 + w_G n_1 tf(Y'+Gt) + w_B n_2 tf(Y'+Bt). \quad (12)$$

But on the right hand side, all but one of the transfer functions terms must be zero, hence we can write $$Y - w_R l_0 t_m + w_G l_1 t_m + w_B l_2 t_m = (w_R n_0 + w_G n_1 + w_B n_2) tf(Y' + n_0 Rt + n_1 Gt + n_2 Bt). \quad (13)$$

And here we can solve for Y':

$$Y' = tf^{-1}\left(\frac{Y - w_R l_0 t_m + w_G l_1 t_m + w_B l_2 t_m}{w_R n_0 + w_G n_1 + w_B n_2}\right) - n_0 Rt - n_1 Gt - n_2 Bt. \quad (14)$$

This becomes equivalent with Equation (8) when R' clips against 0 and B' clips against 1, since we then have $n_0=0$, $n_1=1$, $n_2=0$, and $l_0=0$, $l_1=0$, $l_2=1$.

The pseudo code for Equation (14) is as shown below.

```
Yp=pq_eotf_inv((yLinear-w_R*l[0]*t_m-wG*l[1]
    *t_m-w_B*l[2]*t_m)/(w_R*n[0]+wG*n[1]+w_B*n
    [2]))-n[0]*Rterm-n[1]*Gterm-n[2]*Bterm;
```

The Case when Exactly One Color Channel Clips, (n[0]+n[1]+n[2]=2)

In this case we use a 3D LUT. The LUT may have different sizes in the different dimensions. We will start divide this case into cases when the one color channel that clips clips against 0, and the other when the one color channel that clips clips against 1.

The Case when Exactly One Channel Clips Against 0. (n[0]+n[1]+n[2]=2, l[0]+l[1]+n[2]=0)

We will first go through the case when the red channel clips against 0 and the green and blue channels do not clip.

R Clips Against 0, G, and B are not Clipping (Free): R0GfBf

What we want to do is effectively having a LUT of the form Y'=LUT(Yo, Cb, Cr). However, since Y' changes very quickly with small Yo, it may not be good to use Yo as the index. Therefore, in one embodiment of the invention, we instead index $tf^{-1}(Y_O)$, or tfiYo for short. This way values near Yo=0 are represented with more LUT values. Finding the nearest integer position in the table for tfiYo can be implemented with the following pseudo code:

```
double tfiYo = pq_eotf_inv_LUT(Yo);
double tab_tfiYo = tfiYo;
int tfiYoInt = round(LUTsizeYoMinus1*(tab_tfiYo))
```

Here LUTsizeYoMinus1 is the LUT resolution in the tfiYo dimension minus 1. A typical value for the LUT dimension is 32, hence LUTsizeYoMinus1 is 31 in this case.

Since R clips against 0, the largest value that Equation (3) can get is $$Yo = w_R 0 + w_G tf(1) + w_R tf(1) = (w_G + w_B) t_m \quad (15)$$

which for BT.2020 color space equals Yo=$(w_G+w_B)$×10000=(0.6780+0.0593)×10000=7373. Thus, the largest value Yo can get is pq_eotf_inv(7373), which is approximately 0.96791647729828811. It is therefore wasteful to spend LUT entries above this value. Therefore we can, instead of indexing on tfiYo, index on tfiYo/0.96791647729828811.

Here we have used the BT.2020 constants for $w_G$ and $w_B$, but it may also be reasonable to use the constants that are used when converting BT.2020 to XYZ, $w_G$=0.677998 and $w_B$=0.059302.

If instead of indexing on tfiYo, we index on tfiYo/0.96791647729828811, we can use the following pseudo code:

```
double tfiYo=pq_eotf_inv_LUT(Yo);

double           tab_tfiYo=(tfiYo-tfiYoMin)/
    (tfiYoMax-tfiYoMin);

int tfiYoInt=round(LUTsizeYoMinus1*tab_tfiYo);
```

In this case tfiYoMin=0.0, since there are situations where R clips for Yo=0, but where tfiYoMax=0.96791647729828811.

In some cases we want to further strengthen the resolution for values close the minimum. For this reason we may apply a power function on the value tab_tfiYo:

```
double tfiYo=pq_eotf_inv_LUT(Yo);

double           tab_tfiYo=(tfiYo-tfiYoMin)/
    (tfiYoMax-tfiYoMin);

int        tfiYoInt=round(LUTsizeYoMinus1*
    (pow(tab_tfiYo,(1.0)/(EXTRA_GAMMA))));
``` where EXTRA_GAMMA can be a value higher than 1.0, for instance 1.7. Since a power function is expensive to calculate and may be slow, it is possible to use a LUT for that as well:

```
double tfiYo=pq_eotf_inv_LUT(Yo);

double           tab_tfiYo=(tfiYo-tfiYoMin)/
    (tfiYoMax-tfiYoMin);

int         tfiYoInt=round(LUTsizeYoMinus1*
    (extra_gamma_LUT(tab_tfiYo));
```

In an alternative embodiment it is possible to have a LUT that takes in Yo and directly outputs the value $$\left(\frac{tf^{-1}(Y_O) - tfiYoMin}{tfiYoMax - tfiYoMin}\right)^{\frac{1}{1.7}}, \quad (16)$$

However in that case it is not possible to share the $tf^{-1}(x)$ table with other cases such as the case when two variables clip. Also the $x^{1/1.7}$ table cannot be shared with other cases. Still, in some circumstances it may be a beneficial idea, such as when latency is of importance. As in the case with $tf^{-1}(x)$, it is possible to use several tables to reach good accuracy.

Generally when using LUTs, it is typically not best to only take the closest value. Instead we do trilinear interpolation, and to do that we need to find the closest lower integer and the closest higher integer, which may be done using

```
double tfiYo = pq_eotf_inv_LUT(Yo);
double tab_tfiYo = (tfiYo - tfiYoMin)/(tfiYoMax-tfiYoMin);
int tfiYoInt =
    floor(LUTsizeYoMinus1*(extra_gamma_LUT(tab_tfiYo));
int tfiYoLoInt = dMax(0, tfiYoInt);
int tfiYoHiInt = dMin(LUTsizeYoMinus1 tfiYoInt+1);
```

To be able to do the interpolation, we now need to know the value of tfiY in the two positions tfiYoLoInt and tfiYoHiInt. This can be done by

```
tab_tfiYo=pow((double)((1.0*tfiYoLoInt)/
    (LUTsizeYoMinus1*1.0)),EXTRA_GAMMA);
``` double  tfiYoLo=tab_tfiYo*(tfiYoMax−tfiYoMin)+
tfiYoMin;

and similarly for tfiYoHi. Since there are only 32 possible values of tfiYoLoInt/tfiYoHiInt, a small table of 32 values is sufficient for this, and the expensive power function and even the division can be avoided. We call this small table the "inverse LUT" herein.

We now want to find the closest table entries in the Cr dimension. Here one key insight is used: all possible Cr values are not always applicable. In the current case we know that R' clips against 0. This means that R'=Y'+a13*Cr<0. In BT.2020, a13 equals 1.4746. We know that Cr can take any value in the range [−0.5, 0.5]. However, if Cr>0, we have Y'+positive_constant<0, which is only possible if Y'<0, which is not allowed. Hence we do not need to have entries in the table where Cr>0.

In reality, if we know that tfiYo is between two values, such as between tfiYoLoInt and tfiYoHiInt, we can further restrict the minimum and maximum value of Cr that it is worth tabulating.

Therefore, for each value of tfiYoInt, we store a smallest value CrMin and a largest value CrMax and calculate the closest smaller Cr-index as CrInt=floor(((Cr−CrMin[tfiYoLoInt])/(CrMax[tfiY-
oLoInt]−CrMax[tfiYoLoInt]))*lutSizeCrMinus1);

CrInt=iMax(0,CrInt);

where lutSizeCrMinus1 equals the size of the LUT in the Cr dimension minus 1. In this case lutSizeCrMinus1=7. Alternatively, instead of storing CrMin and CrMax, we can have already precalculated values so that the expression becomes simpler:

CrInt=iMin(floor((Cr−m[tfiYoLoInt])/k[tfiYoLoInt]),
lutSizeCrMinus1);

CrInt=iMax(0,CrInt);

where m[ ] and k[ ] are lookup-tables which store m[x]=CrMin[x]

k[x]=(CrMax[x]−CrMin[x])/lutSizeCrMinus1;

Another possibility is to store p[x]=1/k[x]=lutSizeCrMinus1/(CrMax[x]−Crmin[x]) in order to avoid the division. The expression then becomes even simpler:

CrInt=iMin(floor((Cr−m[tfiYoLoInt])*p[tfiYoLoInt]),
lutSizeCrMinus1);

CrInt=iMax(0,CrInt);

In this way, we obtain a CrLoInt for the nearest integer position that will correspond to a value lower than Cr, and a CrHiInt for the nearest integer position that will correspond to a value higher than Cr.

int CrLoInt=dMax(0,CrInt);

int CbHiInt=dMin(lutSizeCrMinus1,CrInt+1);

We now recover the values for Cr in these positions:

double  CrLo=clamp(k[tfiYoLoInt]*(1.0*CrLoInt)+
m[tfiYoLoInt],−0.5,0.5);

double  CrHi=clamp(k[tfiYoLoInt]*(1.0*CrHiInt)+
m[tfiYoLoInt],−0.5,0.5);

We can now find the interpolation parameter CrAlpha:

```
if(CrHi == CrLo)
    CrAlpha = 0.0;
else
    CrAlpha = (Cr−CrLo)/(CrHi−CrLo);
```

We then do the same thing for the Cb component. This will give us the values CbLoInt, CbHiInt and CbAlpha. From this we can interpolate a Y' value for when tifYo=tfiYoLo:

bot=linearBlend(LUT
[CbLoInt*LUTsizeCr*LUTsizeYo+
CrLoInt*LUTsizeYo+tfiYoLoInt],LUT
[CbHiInt*LUTsizeCr*LUTsizeYo+
CrLoInt*LUTsizeYo+tfiYoLoInt],CbAlpha);

top=linearBlend(LUT
[CbLoInt*LUTsizeCr*LUTsizeYo+
CrHiInt*LUTsizeYo+tfiYoLoInt],LUT
[CbHiInt*LUTsizeCr*LUTsizeYo+
CrHiInt*LUTsizeYo+tfiYoLoInt],CbAlpha);

bilin1=linearBlend(bot,top,CrAlpha);

Here LUTsizeCr is the size of the LUT in the Cr dimension, which is equal to 8 in this case, LUTsizeCb is the size of the LUT in the Cb dimension, which is equal to 32 in this case, and LUTsizeYo is the size of the LUT in the tfiYo dimension, which is equal to 32 in this case, although other sizes are of course possible.

Also, the function linearBlend just does a linear blend between the two values according to double linearBlend (double low, double high, double alpha)

```
{
    return ((1−alpha)*low + alpha*high);
}
```

We have now obtained a bilinearly blended value of Y' for the case when tfiYo=tfiYoLo. We then repeat the Cr and Cb calculations but this time for tfiYoHiInt. As seen above, bilin1 is the value obtained for tfiYoLoInt. Let bilin2 be the value obtained for tfiYoHiInt. We then get the trilinearly interpolated value as double trilin=linearBlend(bilin1,bilin2,tfiYoAlpha);

where tfiYoAlpha is obtained as

```
if(tfiYoHi==tfiYoLo)
    tfiYoAlpha = 0.0;
else
    tfiYoAlpha = (tfiYo − tfiYoLo)/(tfiYoHi−tfiYoLo);
```

Another key insight is that we should preferably not use the trilinearly interpolated value as is. Instead we should clamp it to an allowed value. As an example, if we have already established that the best Y' produces an R' that clips against 0, i.e., is smaller than zero, we should not return a value for which R'>0. Since R'=Y'+a13*Cr, the maximally allowed value for Y' should be −a13*Cr. As an example, if Cr=−0.3, this means −a13*Cr=−1.4746*(−0.3)=0.4424 should be the largest allowed Y' to be returned. Any value larger than this will not make R' clip against 0.

This may seem like a trivial detail but has wide implications. This means that we can allow very large values of Y', which may help the function be smooth and easy to approximate with a small LUT. Since we anyway clamp against the largest possible value, we are in no danger of returning too big a value. Therefore the last thing done is to clamp the value against −a13*Cr, where Cr is the actual Cr value of the pixel:

trilinClip=dMax(YpMinValue,trilin);

LUTresult=(dMin(YpMaxValue,trilinClip));

Here YpminValue equals 0.0 and YpMaxValue equals −a13*Cr. LUTresult now holds the interpolated value of Y' that will be used.

In summary, for the case when R' clips against 0 and G' and B' do not clip, we have a table of the dimensions CbSize=32, CrSize=4, tifYoSize=32, in total 32*32*4=4096 bytes, which if we use 16 bits per value becomes 8192 values, or 8 kB. The minimum allowed value for tfiYo is 0.0, and the maximum allowed value for tfiYo is 0.96791647729828811. After trilinear interpolation we clip against the range [0.0, −a13*Cr]. The values for CbMin, CbMax, CrMin and CrMax for each value of tfiYo are listed in Annex B.

In an alternative embodiment, instead of clipping the trilinearly interpolated value against the range [0.0, −a13*Cr] we can clip against $[Y'_{low}, Y'_{high}]$, which was calculated in step 5 above. Alternatively we could clip against $[Y'_{low2}, Y'_{high2}]$ where $Y'_{low2}=\max\{Y'_{low}, 0\}$, $Y'_{high2}=\min\{Y'_{high}, 1.0\}$.

G Clips Against 0, R, and B are not Clipping (Free): RfG0Bf

This case is handled just as the case R0GfBf. The only difference is the values of the parameters. In this case, we have a table of the dimensions CbSize=16, CrSize=16, tifYoSize=32, in total 16*16*32=8192 values, which if we use 16 bits per value becomes 16384 bytes, or 16 kB. The minimum allowed value for tfiYo is 0.0, and the maximum allowed value for tfiYo is 0.87914973149558051. After trilinear interpolation we clip against the range [0.0, a22*Cb+a23*Cr], where a22 and a23 for BT.2020 are 0.164553126843657 and 0.571353126843657 respectively. The values for CbMin, CbMax, CrMin and CrMax for each value of tfiYo are listed in Annex B under RfG0Bf.

In an alternative embodiment, instead of clipping the trilinearly interpolated value against the range [0.0, a22*Cb+a23*Cr] we can clip against $[Y'_{low}, Y'_{high}]$, which was calculated in step 5 above. Alternatively we could clip against $[Y'_{low2}, Y'_{high2}]$ where $Y'_{low2}=\max\{Y'_{low}, 0\}$, $Y'_{high2}=\min\{Y'_{high}, 1.0\}$.

B Clips Against 0, R, and G are not Clipping (Free): RfGfB0

This case is handled just as the case R0GfBf. The only difference is the values of the parameters. In this case, we have a table of the dimensions CbSize=4, CrSize=32, tifYoSize=32, in total 4*32*32=4096 values, which if we use 16 bits per value becomes 8192 values, or 8 kB. The minimum allowed value for tfiYo is 0.0, and the maximum allowed value for tfiYo is 0.993593931969598. After trilinear interpolation we clip against the range [0.0, −a32*Cb], where a32 for BT.2020 is 1.8814. The values for CbMin, CbMax, CrMin and CrMax for each value of tfiYo are listed in Annex B under RfGfB0.

In an alternative embodiment, instead of clipping the trilinearly interpolated value against the range [0.0, −a32*Cb] we can clip against $[Y'_{low}, Y'_{high}]$ which was calculated in step 5 above. Alternatively we could clip against $[Y'_{low2}, Y'_{high2}]$ where $Y'_{low2}=\max\{Y'_{low}, 0\}$, $Y'_{high2}=\min\{Y'_{high}, 1.0\}$.

The Case when Exactly One Channel Clips Against 1. (n[0]+n[1]+n[2]=2, l[0]+l[1]+l[2]=1)

R Clips Against 1, R, and G are not Clipping (Free): R1GfBf

This case is handled just as the case R0GfBf. The only difference is the values of the parameters. In this case, we have a table of the dimensions CbSize=32, CrSize=4, tifYoSize=32, in total 4*32*32=4096 values, which if we use 16 bits per value becomes 8192 bytes, or 8 kB. The minimum allowed value for tfiYo is 0.85708486016117891. This is due to the fact that R' clips against 1, and therefore the smallest possible value that we can reach for Equation (3) is if both the other components are zero, i.e., $$Yo=w_R tf(1)+w_G 0+w_R 0, \qquad (17)$$

Using wR=0.2627, we get tfiYoMin=$tf^{-1}$(0.2627×10000)=0.85708486016117891, and the maximum allowed value for tfiYo is 1.0. After trilinear interpolation we clip against the range [1.0−a13*Cr, 1.0]. This is another key insight: since we know that the red channel is supposed to clip, i.e., we know that R'>1, this means that Y'+a13*Cr>1, which means that Y' must be larger than 1−a13*Cr. Hence it does not make sense to allow a value lower than 1−a13*Cr as the resulting Y'. While this may look like a detail, it has huge implications; it means that we can now use a different function that has a much better interpolation property than what we would otherwise have to use. This added feature had been measured to be able to reduce errors by a factor of 6. The values for CbMin, CbMax, CrMin and CrMax for each value of tfiYo are listed in Annex B under R1GfBf.

In an alternative embodiment, instead of clipping the trilinearly interpolated value against the range [1.0−a13*Cr, 1.0] we can clip against $[Y'_{low}, Y'_{high}]$ which was calculated in step 5 above. Alternatively we could clip against $[Y'_{low2}, Y'_{high2}]$ where $Y'_{low2}=\max\{Y'_{low}, 0\}$, $Y'_{high2}=\min\{Y'_{high}, 1.0\}$.

G Clips Against 1, R, and B are not Clipping (Free): RfG1Bf

This case is handled just as the case R0GfBf. The only difference is the values of the parameters. In this case, we have a table of the dimensions CbSize=16, CrSize=16, tifYoSize=16, in total 16*16*16=4096 values, which if we use 16 bits per value becomes 8192 bytes, or 8 kB. The minimum allowed value for tfiYo is 0.95902806919828032. This is due to the fact that G' clips against 1, and therefore the smallest possible value that we can reach for Equation (3) is if both the other components are zero, i.e., $$Yo=w_R 0+w_G tf(1)+w_R 0, \qquad (18)$$

Using wG=0.6, we get tfiYoMin=$tf^{-1}$(0.6780×10000)=0.95902806919828032, and the maximum allowed value for tfiYo is 1.0. After trilinear interpolation we clip against the range [1.0+a22*Cb+a23*Cr, 1.0]. The values for CbMin, CbMax, CrMin and CrMax for each value of tfiYo are listed in Annex B under RfG1Bf.

In an alternative embodiment, instead of clipping the trilinearly interpolated value against the range [1.0+a22*Cb+a23*Cr, 1.0] we can clip against $[Y'_{low2}, Y'_{high}]$ which was calculated in step 5 above. Alternatively we could clip against $[Y'_{low2}, Y'_{high2}]$ where $Y'_{low2}=\max\{Y'_{low}, 0\}$, $Y'_{high2}=\min\{Y'_{high}, 1.0\}$.

B Clips Against 1, R, and G are not Clipping (Free): RfGfB1

This case is handled just as the case R0GfBf. The only difference is the values of the parameters. In this case, we have a table of the dimensions CbSize=4, CrSize=32, tifYoSize=32, in total 4*32*32=4096 values, which if we use 16 bits per value becomes 8192 bytes, or 8 kB. The minimum allowed value for tfiYo is 0.69502326557701644. This is due to the fact that G' clips against 1, and therefore the smallest possible value that we can reach for Equation (3) is if both the other components are zero, i.e., $$Yo = w_R 0 + w_G 0 + w_B tf(1), \quad (19)$$

Using wG=0.0593, we get tfiYoMin=tf$^{-1}$(0.0593× 10000)=0.69502326557701644, and the maximum allowed value for tfiYo is 1.0. After trilinear interpolation we clip against the range [1.0−a32*Cb, 1.0]. The values for CbMin, CbMax, CrMin and CrMax for each value of tfiYo are listed in Annex B under RfGfB1.

In an alternative embodiment, instead of clipping the trilinearly interpolated value against the range [1.0−a32*Cb, 1.0] we can clip against [Y'$_{low}$,Y'$_{high}$] which was calculated in step 5 above. Alternatively we could clip against [Y'$_{low2}$, Y'$_{high2}$] where Y'$_{low2}$=max{Y'$_{low}$, 0}, Y'$_{high2}$=min{Y$_{high}$', 1.0}.

The Case when No Channel Clips, (n[0]+n[1]+n[2]=3)

This case is handled just as the case R0GfBf. The only difference is the values of the parameters. In this case, we have a table of the dimensions CbSize=32, CrSize=32, tifYoSize=32, in total 32*32*32=32768 values, which if we use 16 bits per value becomes 65536 bytes, or 64 kB. The minimum allowed value for tfiYo is 0.0, and the maximum 1.0. After trilinear interpolation we clip against the range [0.0, 1.0]. The values for CbMin, CbMax, CrMin and CrMax for each value of tfiYo are listed in Annex B under RfGfB1.

In an alternative embodiment, instead of clipping the trilinearly interpolated value against the range [0.0, 1.0] we can clip against [Y'$_{low}$,Y'$_{high}$] which was calculated in step 5 above. Alternatively we could clip against [Y'$_{low2}$,Y'$_{high2}$] where Y'$_{low2}$=max{Y$_{low}$', 0}, Y'$_{high2}$=min{Y$_{high}$', 1.0}.

Typical Size of LUT

Table 2 below summarizes all the LUTs.

Calculation of the Borders for Cb and Cr

The first step is to find the min and max values for Cb and Cr for every value of tfiYoInt.

This can be done by Monte Carlo sampling. For a particular value of tfiYoInt, say tfiYoInt=3, we find all values of Yo, that would use this value of tfiYoInt during interpolation. This means all values of tfiYoInt from 2 to 4.

Consider the example with R0GfBf, i.e., where R' is smaller than zero and therefore clipped to zero, whereas G and B are both in the interval]0.0, 1.0[. The range of tfiYo can now be calculated by inserting tfiYoInt=2 and tfiYoInt=4 in the code below.

tab_*tfiYo*=pow((double)((1.0**tfiYo*Int)/
    (LUTsize*Yo*Minus1*1.0)),EXTRA_GAMMA);

double *tfiYo*=tab_*tfiYo**(*tfiYo*Max−*tfiYo*Min)+*tfiYo*Min;

As described above, LUTsizeYoMinus1=31, tfiYoMax=0.96791647729828811, tfiYoMin=0.0 and EXTRA_GAMMA=1.7, giving tfiYo=0.00916799 for tfiYoInt=2 and tfiYo=0.02978688 for tfiYoInt=4. This is equivalent to Yo=0.01947362 for tifYoInt=2 and Yo=0.00196899 for tfiYoInt=4.

If we want to evaluate the biggest possible value that, say Cb can take and yet make R clip against 0 while not clipping G and B, we can start setting the limit to CbLimit=−0.5. We can now do random sampling of Yo in the interval [0.01947362, 0.00196899], Cb in the interval [−0.5, 0.5] and Cr in the interval [−0.5, 0.5]. For each such triplet Yo, Cb, Cr we calculate the luma Y' using luma adjustment: Y'=luma_adjustment(Yo, Cb, Cr). We now check which variables clip when inserting this luma in Equation (1). If red clips against 0 and G and B do not clip, it is a valid point.

TABLE 2

LUTs

| Type | Number of values | Bytes per value | Instantiations | Nestings | Size in bytes | Size in kB |
|---|---|---|---|---|---|---|
| tf (x) | 2048 | 2 | 6 | 1 | 24576 | 24 |
| tf$^{-1}$ (x) | 2048 | 2 | 1 | 5 | 20480 | 20 |
| x$^{1/1.7}$ | 2048 | 2 | 1 | 5 | 20480 | 20 |
| R0GfBf | 32 × 8 × 32 | 2 | 1 | 1 | 16384 | 16 |
| RfG0Bf | 16 × 16 × 32 | 2 | 1 | 1 | 16384 | 16 |
| RfGfB0 | 4 × 32 × 32 | 2 | 1 | 1 | 8192 | 8 |
| R1GfBf | 32 × 4 × 32 | 2 | 1 | 1 | 8192 | 8 |
| RfG1Bf | 16 × 16 × 16 | 2 | 1 | 1 | 8192 | 8 |
| RfGfB1 | 4 × 32 × 32 | 2 | 1 | 1 | 8192 | 8 |
| RfGfBf | 32 × 32 × 32 | 2 | 1 | 1 | 65536 | 64 |
| CbMinMax | 7 × 32 × 2 | 2 | 1 | 1 | 896 | 0.875 |
| CrMinMax | 7 × 32 × 2 | 2 | 1 | 1 | 896 | 0.875 |
| inverse LUTs | 7 × 3 × 32 | 2 | 1 | 1 | 672 | 0.65625 |
| sum | | | | | 199072 | 194.4063 |

Here "instantiations" means how many copies of the table is needed in hardware for parallel access. "Nestings" means that we have implemented the LUT as a number of smaller LUTs to increase accuracy near 0, or wherever the curve i steep. The CbMinMax and CrMinMax are the values of k and m that are derived from the limits in Anenx B.

We see here that it is possible to get well under 200 kBytes for all tables if 2 bytes per value is used. If we instead use four bytes per value, we get 400 kBytes, which is still well under the limit of 1 Mbyte.

LUT Creation

In this section we will go through a number of items to show how the LUTs can be created.

Now if the Cb value is bigger than our previously biggest limit CbLimit, we replace CbLimit with Cb.

In an alternative embodiment we do not calculate luma adjustment but just the clipping variables n and l, and make sure that they are consistent with R0GfBf, i.e., n[0]=0, n[1]=n[2]=1, l[0]=l[1]=l[2]=0.

The sampling can be made much quicker by not sampling the entire interval [−0.5, 0.5] for Cb but only from the previously biggest value [CbLimit, 0.5]. Another way to make it quicker is to sample at least some of the points close to the previously worst point.

By doing the same for the smallest value of Cb, and for the largest and smallest value of Cr, it is possible to construct the table shown in Annex B under R0GfBf. Note that this only has to be done once; an implementation would likely just store the tables in Annex B as part of the software or memory, such as ROM, and they would therefore not need to be generated.

The bounds for Cb and Cr can be made tighter by checking not only that a particular point has the correct clipping, but that the Y' returned by the point is larger than the minimum Y' that would generate a luminance of zero.

As an example, assume our random sample comes up with Cr=−0.2, Cb=0.4, Yo=57 when trying to determine the Cb limit for R0GfBf. The method checking our clipping parameters determines that this combination would indeed clip R0GfBf. However, When we set Y'=0 and insert in (1) we get $$Yo = w_R tf(0 + a_{13}(-0.2)) + w_G tf(0 - a_{22} 0.4 - a_{23}(-0.2)) +$$
$$w_R tf(0 + a_{32} 0.4)$$
$$= 59.7379.$$

But this is larger than the desired Yo=57 even though we cannot go further down than Y'=0. This means that the point is invalid and we do not need to change the limit CbLimit.

Calculation of Actual LUT Values

The next and final step is to calculate the LUT values themselves. This is done by simply looping through the table. In the case of R0GfBf, we loop over tfiYoInt=0 to tfiYoInt=31, and from CbInt=0 to CbInt=31 and from CrInt=0 to CrInt=7.

We then calculate the Yo, Cb and Cr values for those integer coordinates using

// Yo:

tab_tfiYo=pow((double)((1.0*tfiYoInt)/(LUTsizeYoMinus1*1.0)),EXTRA_GAMMA);

double tfiYo=tab_tfiYo*(tfiYoMax−tfiYoMin)+tfiYoMin;

Yo=pq_eotf(tfiYo);

// Cr:

double Cr=clamp(k_Cr[tfiYoInt]*(1.0*CrInt)+m_Cr[tfiYoInt],−0.5,0.5);

// Cb:

double Cb=clamp(k_Cb[tfiYoInt]*(1.0*CbInt)+m_Cb[tfiYoInt],−0.5,0.5);

In the case of R0GfBf, as As described above, LUTsizeYoMinus1=31, tfiYoMax=0.96791647729828811, tfiYoMin=0.0 and EXTRA_GAMMA=1.7. The k_Cr and m_Cr are the tables calculated from the tables in Annex B, and ditto for k_Cb and m_Cb.

We now calculate the luma value using luma adjustment: Y'=luma_adjustment(Yo, Cb, Cr). This is then stored in the position LUT(tfiYoInt, CbInt, CrInt).

Here it is possible to use the regular luma adjustment method, shown in Annex C under "Regular Luma Adjustment". However, it is better to use a somewhat altered version. To start, regular luma adjustment finds the solution to Y' within the interval [0.0, 1.0]. However, if we also allow for negative values of Y' in the table, and values greater than 1.0, the interpolation works better since it will not be upset by the discontinuities at 0 and 1.

Another change is that instead of using the transfer function tf(x) in the calculation of the luminance inside the luma adjustment loop, it is better to use a transfer function that does not saturate when x>1.0. As an example, it is better to use an extended transfer function tf*(x) that continues linearly with the same slope as before x=1.0. One example can be shown here:

```
double pq_eotf_no_clip1(double value)
{
    if(value<=1.0)
    {
        double m1 = (2610.0   ) / (4096.0 * 4.0);
        double m2 = (2523.0 * 128.0) / 4096.0;
        double c1 = (3424.0   ) / 4096.0;
        double c2 = (2413.0 * 32.0) / 4096.0;
        double c3 = (2392.0 * 32.0) / 4096.0;
        double m_normalFactor = 10000.0;
        value = dClip(value, 0.0, 1.0);
        double tempValue = pow(value, (1.0 / m2));
        return (m_normalFactor*(pow(dMax(0.0, (tempValue − c1))/(c2
            − c3 * tempValue),(1.0 / m1))));
    }
    else
    {
        double deltaValue = value − 1.0;
        double slope = 95534.92418490350200000000;
        return (10000.0 + deltaValue*slope);
    }
}
```

Also, when calculating the LUT for the case when one component clips against 0, this component is removed from Equation (1) and replaced by a zero. Furthermore, when calculating the LUT for the case when one component clips against 1, this component is removed from Equation (1) and replaced by the maximum value.

Therefore, when creating the LUT for the R0GfBf case, we use the function ajustyR0GfBf outlined in Annex C under "The R0GfBf Case".

When creating the LUT for the RfG0Bf case, we use the function ajustyRfG0Bf outlined in Annex C under "The RfG0Bf Case".

When creating the LUT for the RfGfB0 case, we use the function ajustyRfGfB0 outlined in Annex C under "The RfGfB0 Case".

When creating the LUT for the R1GfBf case, we use the function ajustyR1GfBf4 outlined in Annex C under "The R1GfBf Case".

When creating the LUT for the RfG1Bf case, we use the function ajustyRfG1Bf4 outlined in Annex C under "The RfG1Bf Case".

When creating the LUT for the RfGfB1 case, we use the function ajustyRfGfB14 outlined in Annex C under "The RfGfB1 Case".

Finally, when creating the LUT for the RfGfBf case, we use the function ajustyRfGfBf5 outlined in Annex C under "The RfGfBf Case".

The lowest level for tfiYoInt is treated differently from the others. As is described above, tfiYoInt=0 is very rare, so it is better to set the values in that layer so that values interpolating from that layer get a good value. This can be done by optimizing for the mid point between the layers, as is done in the following code.

When creating the LUT for the RfGfB1 case, we use the function ajustyRfGfB14 outlined in Annex C under "The RfGfB1 Case".

```
if(tfiYoInt == 0)
{
    // The value for exactly zero is never really used. It is only used for
    interpolation. Therefore it is better
    // to optimize the value for interpolated values, such as for the value
    halfway between level 0 and 1.
        double YpHalf = (*myAjusty)(tfiYoHalf, Cb, Cr);
        double YpHi = (*myAjusty)(tfiYoHi, Cb, Cr);
        // We now want the Yp to be such that if we do a lookup at
        tfiYoHalf we get the exactly correct value.
    // Thus the value to store YpStore needs to be satisfy
    // YpHalf = 0.5*YpHi + 0.5*_YpStore
    // (YpHalf - 0.5*YpHi) = 0.5*YpStore
    // YpStore = 2*(YpHalf - 0.5*YpHi);
        double YpStore = 2.0*(YpHalf - 0.5*YpHi);
        Yp = YpStore;
}
else
{
    // Normal case: just calculate the best Yp for this point.
    Yp = (*myAjusty)(tfiYo, Cb, Cr);
}
myLUT[CbInt*LUTsideCr*LUTsideYo + CrInt*LUTsideYo + tfiYoInt] =
Yp;
```

The entire source code for the generation of the LUT is found in Annex D.

Error Analysis

To see how well the LUT performs, we can put it to the test and find the worst case error. This is done by doing Monte Carlo sampling of Yo, Cb and Cr, calculating the best luma Y' using regular luma adjustment Y'=luma_adjustment (Yo, Cb, Cr) and then obtaining the approximate luma from the LUT=getLUTluma(Yo, Cb, Cr). We can then measure the error in luminance by calculating the correct luminance using $$Yo = w_R tf(Y' + a_{13}Cr) w_G tf(Y' - a_{22}Cb - a_{23}Cr) + w_R tf(Y' + a_{32}Cb), \quad (20)$$

and the luminance obtained from the approximate luma obtained using the LUT $$\hat{Y}o = w_R tf(\hat{Y}' + a_{13}Cr) + w_G tf(\hat{Y}' - a_{22}Cb - a_{23}Cr) + w_R tf(\hat{Y}' + a_{32}Cb). \quad (21)$$

We can now look at the difference $|Yo - \hat{Y}o|$. Typically though, since we are more sensitive to the relative change, it makes more sense to look at the error after having used the transfer function inverse $tf^{-1}(x)$ on the two luminances; $|tf^{-1}(Yo) - tf^{-1}(\hat{Y}o)|$. When performing this test, the biggest error becomes less than 0.002735. As a comparison, changing the luma one code level would bring an error of $\frac{1}{876} = 0.001142$, so the maximum error is only about 2.4 times bigger than this "luma code step". The average error is much smaller. If we calculate the average of $(tf^{-1}(Yo) - tf^{-1}(\hat{Y}o))^2$ for a lot of randomly sampled pixels, and then take the square root of that, we arrive at a value of 0.0003540, or about 0.31 of a "luma code step".

It is also possible to calculate the worst case error in luma directly, and here the error can be a lot bigger. As an example, if tfiYo=0.959030; Cb=−0.270815; Cr=−0.462703, we get a luma from the LUT of 0.974868 on a scale from 0 to 1, whereas the best luma obtained from luma adjustment is 0.691071. However, the resulting colors from these two different lumas are RGB=(0.001815, 10000.000000, 1.786024) for the correct luma, and RGB= (9.129639, 10000.000000, 64.899087) for the luma from the LUT. This can seem like a big difference, but it is quite impossible to see an error of 63.11 in the blue channel if the green channel is 10000. The luminances between the two colors are very similar.

All of these errors can easily be made smaller by increasing the size of the tables. In the error evaluation used here we have used LUT entries of four bytes, but expect two-byte entries to be very similar in precision.

Implementation Example

This contribution presents a way to implement luma adjustment using multiple look-up tables (LUTs). Trilinear interpolation is used, and in an attempt to reduce errors due to interpolation over discontinuities, different LUTs are employed for different cases, depending upon whether the output color will clip any of its color components. Seven 3D LUTs are used, indexed based on Cb, Cr and tfiYo, where the latter is the luminance of the color fed through the inverse transfer function. The different tables have different dimensions, such as 32×32×4 values or 16×16×16 values. In total 99536 values are used for the LUTs and other tables, which the contribution states makes it feasible for video-rate hardware implementations. It is asserted that the root square error in $tf^{-1}(Y)$, i.e., the luminance fed through the inverse transfer function, averaged over all possible combinations of Yo, Cb and Cr is 0.0003540. This error is equivalent to 0.31 times the $tf^{-1}(Y)$ change that would be obtained by changing luma of a white color one code level. The worst case error in $tf^{-1}(Y)$ is claimed to be 0.002735, or equivalent to 2.4 times the $tf^{-1}(Y)$ change obtained by changing luma of a white color one code level.

Prior to the MPEG Call for Evidence for HDR and WCG Video Coding [1] it was reported in several contributions [8-10] that there is a subjective quality problem with HDR Y'CbCr non-constant luminance 4:2:0 color format.

In [11] an iterative solution to the problem is proposed that finds the luma sample that results in a linear luminance that is closest to the original luminance signal. We will refer to this solution as iterative luma adjustment. A more detailed description to this method is given in [12]. In [3] a non-iterative solution based on linearization of the transfer function is proposed.

In [5] and [13] a LUT-based approach of obtaining the luma Y' from the luminance Yo and Cb Cr is taken. The 3D space is divided into eight octants which are further subdivided until an error criterion has been reached. In the leaves of this tree coefficients of a second degree polynomial are stored that can be used to calculate Y' from tfiYo, Cb and Cr. Here tfiYo=$tf^{-1}(Y_O)$ denotes the inverse of the transfer function applied to the original luminance Yo.

In this implementation example an attempt is made to use LUTs without subdivision, employing trilinear interpolation between the eight values closest to the requested triplet (Cb, Cr, tfiYo).

A brute-force method for creating a LUT would be to quantize Cb, Cr and tfiYo to ten bits and store the result. Assuming 1024 values per dimension this means $10^{30}$ values or 1.25 Gb if we store 10 bits per value. While this is certainly feasible storage wise it may be difficult to guarantee a random access every clock cycle with a LUT that size.

One possibility to lower the number of table entries can be to fetch several neighboring values from the LUT and interpolate between them to get the result. In this contribution we use trilinear interpolation. This means that we find the closest values tfiYoLo and tfiYoHi surrounding the requested value tfiYo, and for both these cases we interpolate in Cb and Cr bilinearly. These two cases are then combined linearly to get the resulting luma Y'.

Figure 9:
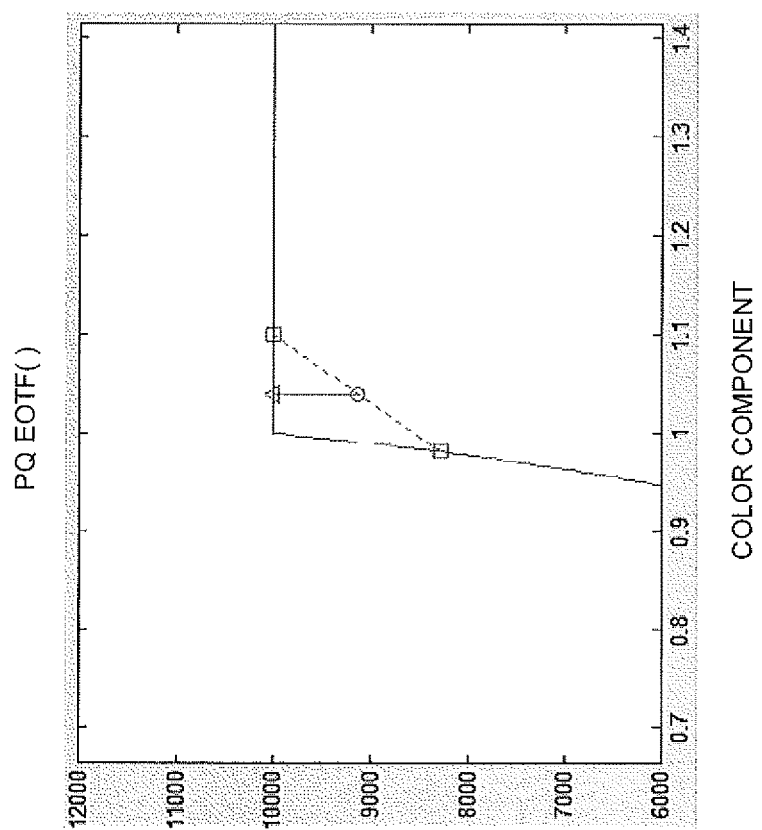
FIG. 9 is a diagram showing the problem of linearly interpolating over a discontinuity.

A problem with this solution is that the function Y'=lumaAdjustment(tfiYo, Cb, Cr) that we are trying to approximate has discontinuities. Doing linear interpolation across a discontinuity typically gives bad results. This is intuitively easy to see from FIG. 9—the interpolated value (circle) becomes far from the real one (triangle) due to the discontinuity. FIG. 9 illustrates an example showing the problem of linearly interpolating over a discontinuity. The function drawn in solid is sampled before and after the discontinuity (squares). The middle value (circle) becomes far from the true value (triangle).

In the function we are trying to approximate, these discontinuities arise due to clipping of the color components. In detail, the luminance of a pixel is the weighted average of the linear RGB components $$Y_O = w_R R + w_G G + w_B B. \quad (22)$$

Since R=tf(R') where tf(x) is the transfer function (we have used SMPTE ST 2084), we get $$Y_O = w_R tf(R') + w_G tf(G') + w_B tf(B'), \quad (23)$$

or $$Y_O = w_R tf(Y' + a_{13}Cr) + w_G tf(Y' - a_{22}Cb - a_{23}Cr) + w_B tf(Y' + a_{32}Cb) \quad (24)$$

where $a_{13}$, $a_{22}$, $a_{23}$, and $a_{32}$ are positive constants that depend on the color space.

Assume that we want to obtain Y'=luma_adjustment(Yo, Cb, Cr) for a specific triplet (Yo, Cb, Cr) that we are interested in. Assume also that we for some reason already know that this particular triplet should not give a Y' that will cause any component in Equation (24) to clip. Still, when we use the look-up table, we have to interpolate between the eight closest values to (Yo, Cb, Cr), and some of these may clip. In that case we are interpolating across a discontinuity as in FIG. 9 and the results will be poor.

The idea in this implementation example is to replace the function tf(x) with a function tf*(x) which does not clip, but is just a linear extension of tf(x), as shown in FIG. 10. The function tf*(x) can be defined as $$tf^*(x) = \begin{cases} tf(x) & \text{if } x \le 1 \\ 10000 + 95534.92418(x-1) & \text{if } x > 1 \end{cases}$$

For the case when we know none of the components will clip, we therefore use $$Y_O = w_R tf^*(Y' + a_{13}Cr) + w_G tf^*(Y' - a_{22}Cb - a_{23}Cr) + w_B tf^*(Y' + a_{32}Cb)) \quad (25)$$

when we create the LUT. This means that there will be no interpolations across discontinuities, which will give a better interpolated value. However, it also means that we cannot use that LUT in case the solution actually does clip any of the components.

Therefore, the idea in this implementation example is to first find out whether the resulting Y' will clip. This can be done as presented in [6]. If no components clip, we use one LUT. If one component clips, we use one of six LUTs depending upon which component clips and to which value. We differentiate between the following cases:

No Color Component Clips, RfGfBf

In this case, the optimal Y' generates a red component R' such that 0<R'<1, and ditto for the green and blue components. We say that all three components are "free", hence the name RfGfBf for this case. We use a LUT of size 32×32×32, i.e., the LUT is 32 elements wide in Cb, 32 elements wide in Cr and 32 elements wide in tfiYo. When creating the table, for every value we calculate the luma adjusted value Y'=luma_adjustment_RfGfBf(Y', Cb, Cr), but inside that function we do not use Equation (23) to determine the luminance Y in the interval halving procedure, instead we use the formula in Equation (24) to determine Y in order to avoid discontinuities.

The Red Component Clips

Here it turns out that it is beneficial to differentiate between two cases, namely when R'>1 and when R'<0.

Red Clips to 1

In the first case, which we can call R1GfBf, we realize that since the luminance is defined as $$Y_O = w_R tf(R') + w_G tf(G') + w_B tf(B'), \quad (26)$$

the smallest value that $Y_O$ can have is $w_R tf(1) = w_R \times 10000$. Thus we do not need to tabulate from tfiYo=0 to tfiYo=1 but can instead tabulate from tfiYo=tf$^{-1}$($w_R \times 10000$)=0.85708 to 1. We can therefore calculate the position in the table as $$tfiYo\text{Index} = (\text{LUTsize}Yo - 1) * (tfiYo - tfiYo\text{Min}) / (tfiYo\text{Max} - tfiYo\text{Min}),$$

where tfiYoMin=0.85708 and tfiYoMax=1.0. This increases the precision for the same number of LUT elements. Also, since R'=Y'+a13*Cr=Y'+1.4746 Cr, it is not possible for R' to exceed 1 if Cr is negative. We take advantage of this fact by not having entries for which Cr<0 in this table.

To be able to avoid having entries for negative Cr values, we can use a CrMin value of 0 and a CrMax value of 0.5. For a particular Cr value, we can then calculate the position in the table as $$Cr\text{Index} = (\text{LUTSize}Cr - 1) * (Cr - Cr\text{Min}) / (Cr\text{Max} - Cr\text{Min}).$$

In fact, it turns out that for some values of $Y_O$ we can do even better than CrMin=0 and CrMax=0.5. We can therefore make CrMin dependent on the tfiYoIndex:

$$Cr\text{Index} = (\text{LUTSize}Cr - 1) * (Cr - Cr\text{Min}[tfiYo\text{Index}]) / (Cr\text{Max}[tfiYo\text{Index}] - Cr\text{Min}[tfiYo\text{Index}]).$$

This also increases the precision, meaning that it becomes sufficient with a LUT of size Cb×Cr×tfiYo=32×4×32. The fact that we can avoid a lot of values in Cr pays off—only a width of 4 is needed.

Since we know that red clips to 1 it does not make sense to use Equation (25) when calculating the values in the LUT, instead we use $$Y_O = w_R \times 10000 + w_G tf^*(Y' - a_{22}Cb - a_{23}Cr) + w_B tf^*(Y' + a_{32}Cb), \quad (27)$$

since we know the red channel will always saturate.

Red Clips to 0

For the case when R'<0, which we can call R0GfBf, we can't find a minimum value for tfiYo that is larger than 0, but we can find a maximum value. Since we know that R'<0, the largest $Y_O$ we can possibly get is $$Y_O = w_R tf(0) + w_G tf(1) + w_B tf(1), \quad (28)$$

so the largest possible value for tfiYo=tf$^{-1}$(($w_G + w_B$)×10000)=0.96791. The LUT we settled on for this case was Cb×Cr×tfiYo=32×8×32. Since we know that the red component is always 0, instead of using Equation (24) when calculating the LUT we instead use $$Y_O = w_G tf^*(Y' - a_{22}Cb - a_{23}Cr) + w_B tf^*(Y' + a_{32}Cb). \quad (29)$$

Green or Blue Component Clips

These cases are done in a manner very similar to the case when the red component clips; the only difference is the values of tfiYoMin and tfiYoMax, and the size of the LUT dimensions. It is summarized in the following Table 3, where we have also included R1GfBf and R0GfBf for completion.

TABLE 3

LUT dimensions

| Case | which means | tfiYoMin | tfiYoMax | LUT dimensions (Cb × Cr × tfiYo) |
|---|---|---|---|---|
| R1GfBf | R' > 1 | 0.85708 | 1.0 | 32 × 4 × 32 |
| R0GfBf | R' < 0 | 0.0 | 0.96791 | 32 × 8 × 32 |
| RfG1Bf | G' > 1 | 0.95902 | 1.0 | 16 × 16 × 16 |
| RfG0Bf | G' < 0 | 0.0 | 0.87915 | 16 × 16 × 32 |
| RfGfB1 | B' > 1 | 0.69502 | 1.0 | 4 × 32 × 32 |
| RfGfB0 | B' < 0 | 0.0 | 0.99359 | 16 × 16 × 32 |

The equation used to calculate the luminance inside the iterative luma adjustment loop during the calculation of the LUT in these cases are shown in Table 4.

TABLE 4 functions to calculate luminance

| Case | Function used to calculate luminance during creation of LUT |
|---|---|
| RfGfBf | $Y_O = w_R tf^*(Y' + a_{13}Cr) + w_G tf^*(Y' - a_{22}Cb - a_{23}Cr) + w_B tf^*(Y' + a_{32}Cb)$ |
| R1GfBf | $Y_O = w_R \times 10000 + w_G tf^*(Y' - a_{22}Cb - a_{23}Cr) + w_B tf^*(Y' + a_{32}Cb)$ |
| R0GfBf | $Y_O = w_G tf^*(Y' - a_{22}Cb - a_{23}Cr) + w_B tf^*(Y' + a_{32}Cb)$ |
| RfG1Bf | $Y_O = w_R tf^*(Y' + a_{13}Cr) + w_G \times 10000 + w_B tf^*(Y' + a_{32}Cb)$ |
| RfG0Bf | $Y_O = w_R tf^*(Y' + a_{13}Cr) + w_B tf^*(Y' + a_{32}Cb)$ |
| RfGfB1 | $Y_O = w_R tf^*(Y' + a_{13}Cr) + w_G tf^*(Y' - a_{22}Cb - a_{23}Cr) + w_B \times 10000$ |
| RfGfB0 | $Y_O = w_R tf^*(Y' + a_{13}Cr) + w_G tf^*(Y' - a_{22}Cb - a_{23}Cr)$ |

When calculating which color components clip according to [6], a by-product is that we get a range $[Y'_a, Y'_b]$, in which the ideal luma Y' must be included, from Step 5 in Section 4.2 in [6]. We can further refine this range by making sure we never venture outside [0, 1];

$$Y_{a2}' = \max\{Y_a', 0\} \quad (30)$$

$$Y_{b2}' = \min\{Y_b', 1\} \quad (31).$$

Hence we can clip the interpolated value Y' we get from the LUT against the range $[Y_{a2}', Y_{b2}']$.

Two Color Components Clip

In this situation we know the values of two of the color channels, and only one color channel is influenced by the luma Y'. It is then possible to analytically calculate the luma Y', as we will see. Repeating Equation (23), we have $$Y = w_R tf(Y' + a_{13}Cr) + w_G tf(Y' - a_{22}Cb - a_{23}Cr) + w_B tf(Y' + a_{32}Cb). \quad (32)$$

Assume we have a case where two of the color channels clip, for instance when the red clips against 0 and the blue channel clips against 1.

Equation (32) then becomes $$Y = w_R tf(0) + w_G tf(Y' - a_{22}Cb - a_{23}Cr) + w_B tf(1) \quad (33)$$

which can be simplified to $$Y = 0 + w_G tf(Y' - a_{22}Cb - a_{23}Cr) + w_B \times 10000 \quad (34)$$

but since Y' only appears once, we can solve for Y':

$$Y' = tf^{-1}\left(\frac{Y_O - w_B 10000}{w_G}\right) + a_{22}Cb + a_{23}Cr. \quad (35)$$

A similar approach can be taken for all the cases when two components clip. Therefore we do not need a LUT at all for this case. However, we do need to be able to calculate the inverse of the transfer function. This can be efficiently done using a nested lookup-table, as is done in the HDRTools software package [14].

All Color Components Clip

In this case, all three components will be either 0 or 1 when the optimal Y' is selected. We can therefore choose any Y' in the allowed range $[Y_a', Y_b']$. The method in [6] calculates the midpoint of the interval for Y' as YpMid. We can therefore use Y'=YpMid without doing any further computation.

The reason why the table uses tfiYo=$tf^{-1}(Y_O)$ to calculate the index instead of $Y_O$ is that the latter would give far too poor results for low luminance values. However, it turns out that an even stronger nonlinearity than $tf^{-1}(x)$ can be even more helpful. Therefore, instead of calculating the index in the tfiYo dimension as tfiYoIndex=(LUTsizeYo−1)*(tfiYo−tfiYoMin)/
  (tfiYoMax−tfiYoMin), we use tfiYo_tab=(tfiYo−tfiYoMin)/(tfiYoMax−tfiYoMin), tifYoIndex=(LUTsizeYo−1)*pow(tfiYo,1/1.7)

This power function can be implemented as a LUT.

Table 5 shows the different LUTs and the number of values in each one.

TABLE 5

LUT sizes

| Type | Number of values | Bytes per value | Instantiations | Nestings | Size in bytes |
|---|---|---|---|---|---|
| tf(x) | 2048 | 2 | 6 | 1 | 12288 |
| $tf^{-1}(x)$ | 2048 | 2 | 1 | 5 | 10240 |
| $x^{1/1.7}$ | 2048 | 2 | 1 | 5 | 10240 |
| R0GfBf | 32 × 8 × 32 | 2 | 1 | 1 | 8192 |
| RfG0Bf | 16 × 16 × 32 | 2 | 1 | 1 | 8192 |
| RfGfB0 | 4 × 32 × 32 | 2 | 1 | 1 | 4096 |
| R1GfBf | 32 × 4 × 32 | 2 | 1 | 1 | 4096 |
| RfG1Bf | 16 × 16 × 16 | 2 | 1 | 1 | 4096 |
| RfGfB1 | 4 × 32 × 32 | 2 | 1 | 1 | 4096 |
| RfGfBf | 32 × 32 × 32 | 2 | 1 | 1 | 32768 |
| CbMinMax | 7 × 32 × 2 | 2 | 1 | 1 | 448 |
| CrMinMax | 7 × 32 × 2 | 2 | 1 | 1 | 448 |
| sum | | | | | 99200 |

Here, tf(x) is a look-up table that calculates the forward transfer function. Its needed in the method in [6] that determines which variables clip, and it is multiplied by six since six parallel instantiations may be needed if one pixel per clock is needed. The next, $tf^{-1}(x)$, is used to calculate tfiYo, as well as in the case when two colors clip. As described in [14] several tables, i.e., nestings, are needed to get good accuracy near 0. The power function is denoted $x^{1/1.7}$ and it is also nested. Among the LUTs storing the luminance, the one when no component clips is the biggest at 32 kValues. Finally we also need to store min and max values for Cb and Cr. In total 99 kValues are needed.

When we evaluate the accuracy, the error in the retrieved luma Y' is not necessarily very important. The reason is that due to the non-linear relationship between luma and luminance, in some circumstances it is possible to have a rather large error in luma, whereas the error in luminance is very small.

Instead we can look at the error in luminance. However, just measuring the squared error of the luminance is also misleading, since it would say that an error between 5000 and 5005 is worse than an error between 0 and 4, which is at odds with how we perceive brightness.

A more relevant metric is the error in the luminance after it has been fed through the inverse of the transfer function $tf^{-1}(Y)$. This is closer to the way tPSNR is measured and we therefore use this error metric here.

We do two evaluations, for average error and for worst case error. We calculate the average squared error for $tf^{-1}(Y_O)-tf^{-1}(Y_{LUT})$, where $Y_O$ is the original luminance of the pixel and $Y_{LUT}$ is the luminance we get when feeding $Y_{LUT}'$ into Equation (23), and $Y_{LUT}'$ is the value we get from the LUT technique presented here.

To find the average error, we do Monte Carlo sampling of the entire color space for all possible values of (Yo, Cb, Cr), and average the result. The root of that average equals the root mean square error of the system, and it is equal to 0.0003540. To set that into perspective, the error in $tf^{-1}(Y)$ that we would get from a white pixel if we changed the luma one step equals 0.0011, so this average value is around 0.31 times that, or smaller than the quantization error in luma for white pixels.

To find the worst case error, we do Monte Carlo sampling of the entire color space for all possible values of (Yo, Cb, Cr), and find the worst result. The worst error in $tf^{-1}(Y)$ then equals 0.002735, or about 2.4 times one code level step in luma for a white pixel.

Implementation Aspects

Another aspect of the embodiments relates to a pixel processing device configured to determine which color component of a pixel of an original red, green and blue (RGB) color in a picture that will be clipped for a luma value resulting in a luminance value that is closest to an original luminance value obtained based on the original RGB color. The pixel processing device is also configured to select a look-up table (LUT) based on which color component of the pixel that will be clipped for the luma value resulting in a luminance value that is closest to the original luminance value. The pixel processing device is further configured to obtain at least one LUT index based on LUT-specific maximum and minimum values for the selected LUT and the original luminance value. The pixel processing device is additionally configured to determine a luma value for the pixel based on a LUT entry fetched from the selected LUT using the at least one LUT index.

In an embodiment, the pixel processing device configured to clip the luma value to be within an allowed range defined based on which color component of the pixel that will be clipped for the luma value resulting in a luminance value that is closest to the original luminance value In an embodiment, the pixel processing device is configured to obtain a luminance LUT index tfiYoInt based on a quotient (tfiYo−tfiYoMin)/(tfiYoMax−tfiYoMin).

In an embodiment, the pixel processing device is configured to obtain the luminance LUT index based on the quotient and a parameter LUTsizeYo representing a size of the selected LUT in a luminance dimension.

In an embodiment, the pixel processing device is configured to obtain the luminance LUT index based on (LUTsizeYo−1)×f((tfiYo−tfiYoMin)/(tfiYoMax−tfiYoMin)).

In a particular embodiment, the function f(·) is a power function $x^p$. In an embodiment, p=1/γ. The gamma parameter γ is preferably larger than one, such as equal to 1.7.

In an embodiment, the pixel processing device is configured to determine a low luminance LUT index tfiYoLoInt as the maximum of 0 and tfiYoInt and determine a high luminance LUT index tfiYoHiInt as the minimum of (LUTsizeYo−1) and (tfiYoLoInt+1).

In an embodiment, the pixel processing device is configured to obtain, for each chroma component of a Cb chroma component and a Cr chroma component, a chroma LUT index CInt based on a quotient (C−CMin)/(CMax−Cmin).

In an embodiment, the pixel processing device is configured to obtain, for each chroma component of the Cb chroma component and the Cr chroma component, the chroma LUT index based on the quotient and a parameter LUTsizeC representing a size of the selected LUT in a chroma dimension.

In an embodiment, the pixel processing device is configured to obtain, for each chroma component of the Cb chroma component and the Cr chroma component, the chroma LUT based on (LUTsizeC−1)×(C−CMin)/(CMax−Cmin).

In an embodiment, the pixel processing device is configured to determine, for each chroma component of the Cb chroma component and the Cr chroma component, a low chroma LUT index CLoInt as the maximum of 0 and CInt, and determine, for each chroma component of the Cb chroma component and the Cr chroma component, a high chroma LUT index CHiInt as the minimum of (LUTsizeC−1) and (CLoInt+1).

In an embodiment, the pixel processing device is configured to obtain multiple LUT indices based on the LUT-specific maximum and minimum values for the selected LUT and the original luminance value. The pixel processing device is also configured to determine the luma value as a linear combination of multiple LUT entries fetched from the selected LUT using the multiple LUT indices.

In an embodiment, the pixel processing device is configured to calculate a first linear combination of a first LUT entry fetched from the selected LUT using the low luminance LUT index, a low Cb chroma LUT index and a low Cr chroma LUT index and a second LUT entry fetched from the selected LUT using the low luminance LUT index, a high chroma Cb LUT index and the low chroma Cr LUT index. The pixel processing device is also configured to calculate a second linear combination of the first LUT entry fetched from the selected LUT using the low luminance LUT index, the low Cb chroma LUT index and the low Cr chroma LUT index and a third LUT entry fetched from the selected LUT using the low luminance LUT index, the low chroma Cb LUT index and a high chroma Cr LUT index. The pixel processing device is further configured to calculate a third linear combination of the first linear combination and the second linear combination. In this embodiment, the pixel processing device is configured to calculate a fourth linear combination of a fourth LUT entry fetched from the selected LUT using the high luminance LUT index, the low Cb chroma LUT index and the low Cr chroma LUT index and a fifth LUT entry fetched from the selected LUT using the high luminance LUT index, the high chroma Cb LUT index and the low chroma Cr LUT index. The pixel processing device is also configured to calculate a fifth linear combination of the fourth LUT entry fetched from the selected LUT using the high luminance LUT index, the low Cb chroma LUT index and the low Cr chroma LUT index and a sixth LUT entry fetched from the selected LUT using the high luminance LUT index, the low chroma Cb LUT index and the high chroma Cr LUT index. The pixel processing device is further configured to calculate a sixth linear combination of the fourth linear combination and the fifth linear combination. The pixel processing device is additionally configured to determine the luma value based on a linear combination of the third linear combination and the sixth linear combination.

In an embodiment, the pixel processing device is configured to determine the luma value based on clipping the linear combination to be within an allowed range defined based on which color component of the pixel that will be clipped for the luma value resulting in a luminance value that is closest to the original luminance value.

In an embodiment, the pixel processing device is configured to calculate a luma value $Y'_{RClip}$ where a red color component will be clipped, calculate a luma value $Y'_{GClip}$ where a green color component will be clipped and calculate a luma value $Y'_{BClip}$ where a blue color component will be clipped. The pixel processing device is also configured to sort the luma values $Y'_{RClip}$, $Y'_{GClip}$, $Y'_{BClip}$ in ascending order to obtain sorted luma values $Y'_a$, $Y'_b$, $Y'_c$. The pixel processing device is further configured to calculate luminance values $Y_a$, $Y_b$, $Y_c$ for the sorted luma values $Y'_a$, $Y'_b$, $Y'_c$. The pixel processing device is additionally configured to identify an interval defined by the luminance values $Y_a$, $Y_b$, $Y_c$ to which the original luminance value belongs. The pixel processing device is also configured to determine which color component of the pixel that will be clipped based on a comparison of a luma value representative of the identified interval and luma values where the red, green and blue color components will be clipped.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 13:
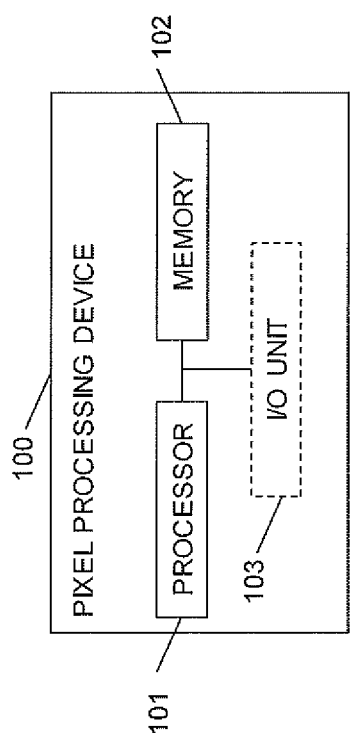
FIG. 13 is a schematic block diagram of a pixel processing device according to an embodiment.

FIG. 13 is a schematic block diagram illustrating an example of a pixel processing device 100 based on a processor-memory implementation according to an embodiment. In this particular example, the pixel processing device 100 comprises a processor 101, such as processing circuitry, and a memory 102. The memory 102 comprises instructions executable by the processor 101.

In an embodiment, the processor 101 is operative to determine which color component of the pixel that will be clipped. The processor 101 is also operative to select the LUT and obtain the at least one LUT index. The processor 101 is further operative to determine the luma value for the pixel based on the LUT entry fetched from the selected LUT using the at least one LUT index.

Optionally, the pixel processing device 100 may also include a communication circuit, represented by an input and output (I/O) unit 103 in FIG. 13. The I/O unit 103 may include functions for wired and/or wireless communication with other devices and/or network nodes in a wired or wireless communication network. In a particular example, the I/O unit 103 may be based on radio circuitry for communication with one or more other network devices or user equipment, including transmitting and/or receiving information. The I/O unit 103 may be interconnected to the processor 101 and/or memory 102. By way of example, the I/O unit 103 may include any of the following: a receiver, a transmitter, a transceiver, I/O circuitry, input port(s) and/or output port(s).

Figure 14:
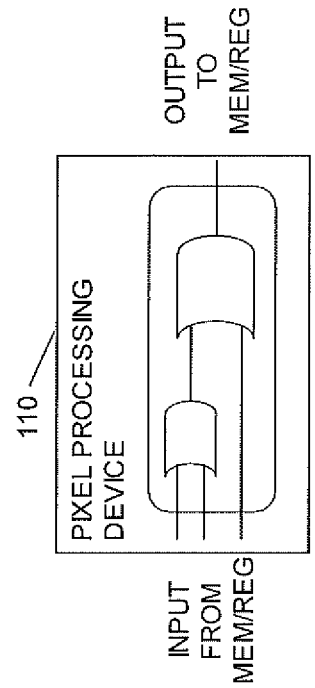
FIG. 14 is a schematic block diagram of a pixel processing device according to another embodiment.

FIG. 14 is a schematic block diagram illustrating another example of a pixel processing device 110 based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 15:
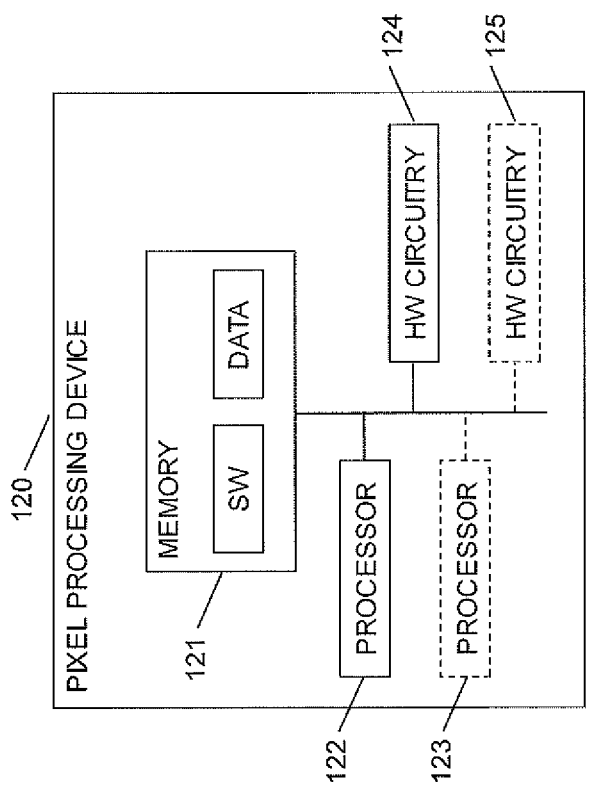
FIG. 15 is a schematic block diagram of a pixel processing device according to a further embodiment.

FIG. 15 is a schematic block diagram illustrating yet another example of a pixel processing device 120 based on combination of both processor(s) 122, 123 and hardware circuitry 124, 125 in connection with suitable memory unit(s) 121. The pixel processing device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 16:
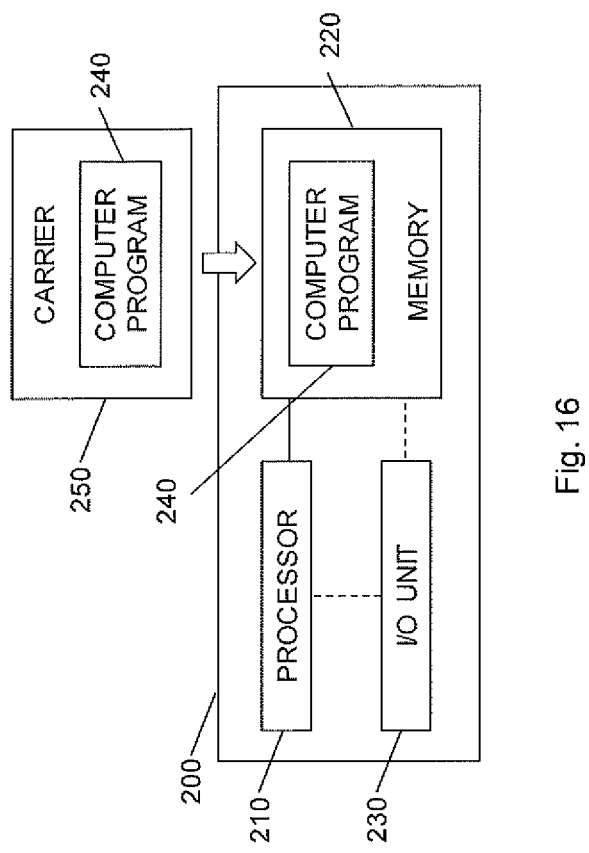
FIG. 16 schematically illustrate a computer program based implementation of an embodiment.

FIG. 16 is a schematic diagram illustrating an example of a pixel processing device 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as input of red, green and blue values and output of luma and chroma values of pixels in a video sequence.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to determine which color component of a pixel of an original RGB color in a picture that will be clipped for a luma value resulting in a luminance value that is closest to an original luminance value obtained based on the original RGB color. The at least one processor 210 is also caused to select a LUT based on which color component of the pixel that will be clipped for the luma value resulting in a luminance value that is closest to the original luminance value. The at least one processor 210 is further caused to obtain at least one LUT index based on LUT-specific maximum and minimum values for the selected LUT and the original luminance value. The at least one processor 210 is also caused to determine a luma value for the pixel based on a LUT entry fetched from the selected LUT using the at least one LUT index.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a pixel processing device 200 for execution by the processing circuitry 210 thereof.

The flow diagram or diagrams presented herein may be regarded as a computer flow diagram or diagrams, when performed by one or more processors. A corresponding device for filtering of a picture may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 17:
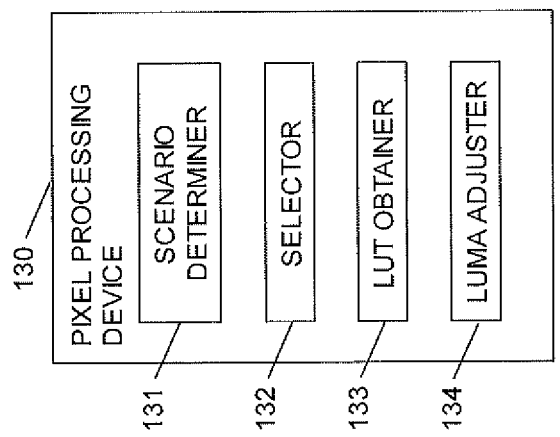
FIG. 17 is a schematic block diagram of a pixel processing device according to yet another embodiment.

FIG. 17 is a schematic block diagram of a pixel processing device 130 according to an embodiment. The pixel processing device 130 comprises a scenario determiner 131 for determining which color component of a pixel of an original RGB color in a picture that will be clipped for a luma value resulting in a luminance value that is closest to an original luminance value obtained based on the original RGB color. The pixel processing device 130 also comprises a selector 132 for selecting a LUT based on which color component of the pixel that will be clipped for the luma value resulting in a luminance value that is closest to the original luminance value. The pixel processing device 130 further comprises an index obtainer 133 for obtaining at least one LUT index based on LUT-specific maximum and minimum values for the selected LUT and the original luminance value. The pixel processing device 130 also comprises a luma adjuster 134 for determining determine a luma value for the pixel based on a LUT entry fetched from the selected LUT using the at least one LUT index.

Figure 18:
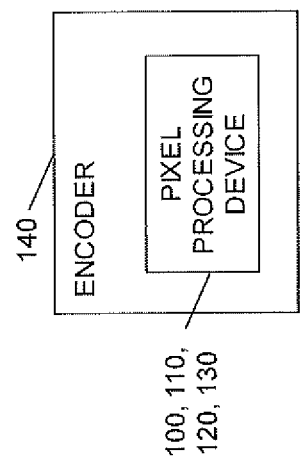
FIG. 18 is a schematic block diagram of an encoder according to an embodiment.

An embodiment relates to an encoder 140, such as a video encoder, comprising a pixel processing device 100, 110, 120, 130 according to the embodiments, such as illustrated in any of FIGS. 12-14, 15, see FIG. 18.

Figure 19:
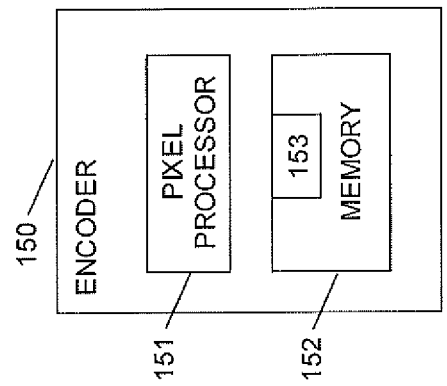
FIG. 19 is a schematic block diagram of an encoder according to another embodiment.

According to an aspect, a pixel processor 151 for processing a pixel in a picture is provided according to FIG. 19. The pixel processor 151 may be implemented in an encoder 150. The pixel processor 151 is configured to determine a clipping scenario, i.e., determine which color components that will be clipped. The pixel processor 151 is also configured to select a LUT based on the determination. The values of the LUT is calculated based on a maximum and a minimum value of Cb and Cr for a tfiYo or max/min Cb index, and max/min Cr index for each tfiYoInt. The pixel processor 151 is further configured to perform luma adjustment by using the selected LUT.

According to an embodiment, the pixel processor 151 is further configured to obtain an index tfiYoLoInt for tfiYo using tfiYoMin and tfiYoMax, obtain an index CbLoInt for Cb using tfiYoLoInt and a first table, and obtain an index CrLoInt for Cr using tfiYoLoInt and a second table. The pixel processor 151 is also configured to fetch the entry tfiYoLoInt, CbLoInt, CrLoInt from the LUT, interpolate the fetched value, and clamp the interpolated fetched value to its allowed range.

The pixel processor 151 may comprise a memory 152 for storing the LUT 153, a determiner for determining a clipping scenario, i.e., determining which color components that will be clipped, a selector for selecting a LUT based on said determination, wherein the values of the LUT is calculated based on a maximum and a minimum value of Cb and Cr for a tfiYo or max/min Cb index, and max/min Cr index for each tfiYoInt, and a luma adjuster for performing luma adjustment by using the selected LUT.

A further embodiment relates to a user equipment comprising a pixel processing device according to any of the embodiments and/or an encoder according any of the embodiments. In a particular embodiment, the user equipment is selected from the group consisting of a mobile telephone, a camera, a tablet, a desktop, a notebook, a multimedia player, a video streaming server, a set-top box and a computer.

The pixel processing device and/or the encoder of the embodiments may alternatively be implemented in a network node in a communication network. Such a network node may contain an equipment for converting video according to one video coding standard to another video coding standard, i.e., transcoding.

As used herein, network node may refer to base stations, access points, network control nodes, such as network controllers, radio network controllers, base station controllers, access controllers, and the like. In particular, the term "base station" may encompass different types of radio base stations including standardized base station functions, such as Node Bs, or evolved Node Bs (eNBs), gNodeBs, and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

It is becoming increasingly popular to provide computing services, hardware and/or software, in network equipment, such as network devices, nodes and/or servers, where the resources are delivered as a service to remote locations over a network. By way of example, this means that functionality, as described herein, can be distributed or re-located to one or more separate physical devices, nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

Figure 20:
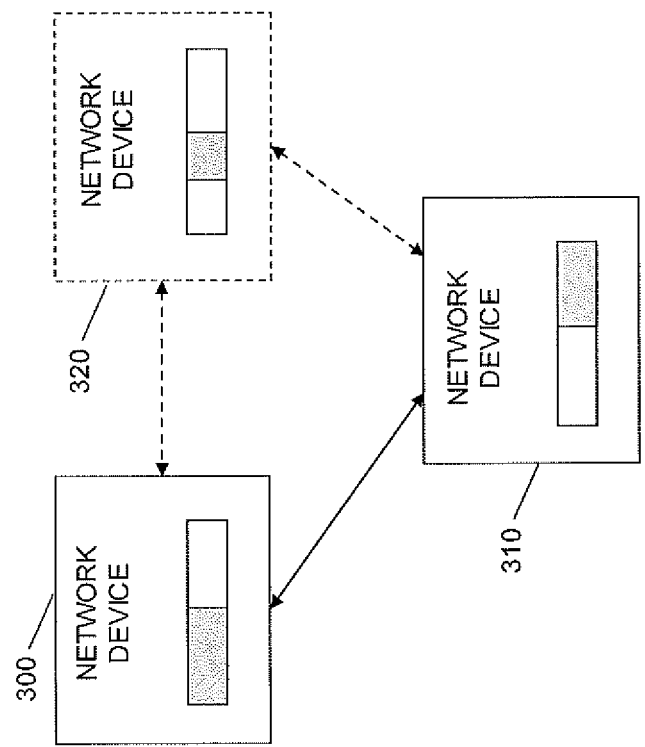
FIG. 20 schematically illustrates a distributed implementation among network devices.

FIG. 20 is a schematic diagram illustrating an example of how functionality can be distributed or partitioned between different network devices in a general case. In this example, there are at least two individual, but interconnected network devices 300, 310, which may have different functionalities, or parts of the same functionality, partitioned between the network devices 300, 310. There may be additional network devices 320 being part of such a distributed implementation. The network devices 300, 310, 320 may be part of the same wireless or wired communication system, or one or more of the network devices may be so-called cloud-based network devices located outside of the wireless or wired communication system.

Figure 21:
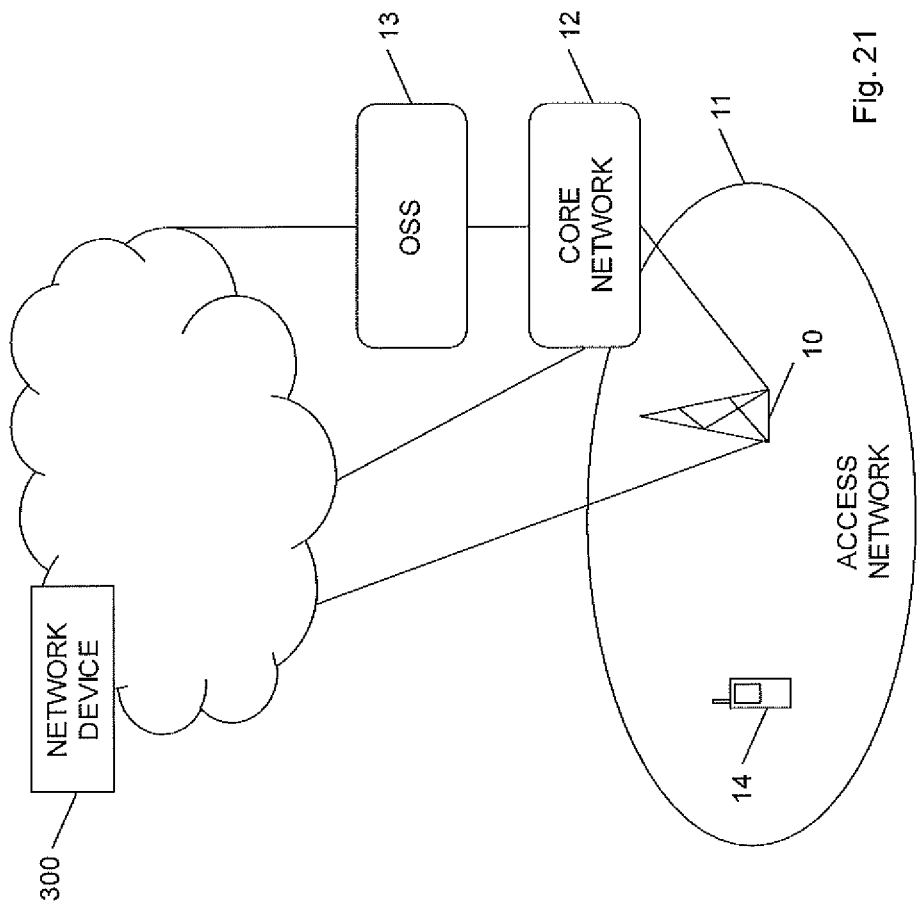
FIG. 21 is a schematic illustration of an example of a wireless communication system with one or more cloud-based network devices according to an embodiment.

FIG. 21 is a schematic diagram illustrating an example of a wireless communication network or system, including an access network 11 and a core network 12 and optionally an operations and support system (OSS) 13 in cooperation with one or more cloud-based network devices 300. The figure also illustrates a user equipment 14 connected to the access network 11 and capable of conducting wireless communication with a base station representing an embodiment of a network node 10.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ANNEX A

The following Annex A describes the source code for LUT interpolation according to an embodiment.

double biCubicInterpolationKM(double tfiYo, double Cb, double Cr, double* LUT, double *CbK, double *CbM, double *CrK, double *CrM, double tfiYoMin, double tfiYoMax, int LUTsizeYo, int LUTsizeCb, int LUTsizeCr, double YpMinValue, double YpMaxValue)

```
{
        int LUTsizeYoMinus1 = LUTsizeYo − 1;
        int LUTsizeCbMinus1 = LUTsizeCb − 1;
        int LUTsizeCrMinus1 = LUTsizeCr − 1;
                int tfiYoLoInt = dMax(0, fromFloatToIntTfiYoFloor(tfiYo, tfiYoMin, tfiYoMax, LUTsizeYoMinus1));
        int tfiYoHiInt = dMin(LUTsizeYoMinus1, tfiYoLoInt+1);
        double tfiYoLo = fromIntToFloatTfiYo(tfiYoLoInt, tfiYoMin, tfiYoMax, LUTsizeYoMinus1);
        double tfiYoHi = fromIntToFloatTfiYo(tfiYoHiInt, tfiYoMin, tfiYoMax, LUTsizeYoMinus1);
        // printf("tfiYoLoInt = %d tfiYoHiInt = %d\n", tfiYoLoInt, tfiYoHiInt);
        double tfiYoAlpha;
        if(tfiYoHi==tfiYoLo)
                tfiYoAlpha = 0.0;
        else
                tfiYoAlpha = (tfiYo − tfiYoLo)/(tfiYoHi−tfiYoLo);
                // We will get different CbInt and CrInt when Yo = Lo and Yo = Hi.
        // Start when Yo = Lo:
                // First find the closest Cb-points.
        int CbLoInt = dMax(0, fromFloatToIntCbKMfloor(Cb, CbK[tfiYoLoInt], CbM[tfiYoLoInt], LUTsizeCbMinus1));
                // int CbHiInt = dMin(LUTsizeCbMinus1, CbLoInt+1);
                int CbHiInt = dMin(LUTsizeCbMinus1,fromFloatToIntCbKMfloorPlus1(Cb, CbK[tfiYoLoInt], CbM[tfiYoLoInt], LUTsizeCbMinus1));
        double CbLo = fromIntToFloatCbKM(CbLoInt, CbK[tfiYoLoInt], CbM[tfiYoLoInt]);
        double CbHi = fromIntToFloatCbKM(CbHiInt, CbK[tfiYoLoInt], CbM[tfiYoLoInt]);
        double CbAlpha;
        if(CbHi == CbLo)
                CbAlpha = 0.0;
        else
                CbAlpha = (Cb−CbLo)/(CbHi−CbLo);
        // Then find the closest Cr-points.
        int CrLoInt = dMax(0, fromFloatToIntCrKMfloor(Cr, CrK[tfiYoLoInt], CrM[tfiYoLoInt], LUTsizeCrMinus1));
                // int CrHiInt = dMin(LUTsizeCrMinus1, CrLoInt+1);
                int CrHiInt = dMin(LUTsizeCrMinus1, fromFloatToIntCrKMfloorPlus1(Cr, CrK[tfiYoLoInt], CrM[tfiYoLoInt], LUTsizeCrMinus1));
        double CrLo = fromIntToFloatCrKM(CrLoInt, CrK[tfiYoLoInt], CrM[tfiYoLoInt]);
        double CrHi = fromIntToFloatCrKM(CrHiInt, CrK[tfiYoLoInt], CrM[tfiYoLoInt]);
        double CrAlpha;
        if(CrHi == CrLo)
                CrAlpha = 0.0;
        else
                CrAlpha = (Cr−CrLo)/(CrHi−CrLo);
```

```
        // Now interpolate for Yo = lo
        double bot, top, bilin1, bilin2;
        bot = linearBlend(LUT[CbLoInt*LUTsizeCr*LUTsizeYo + CrLoInt*LUTsizeYo + tfiYoLoInt],
                    LUT[CbHiInt*LUTsizeCr*LUTsizeYo + CrLoInt*LUTsizeYo + tfiYoLoInt], CbAlpha);
        top = linearBlend(LUT[CbLoInt*LUTsizeCr*LUTsizeYo + CrHiInt*LUTsizeYo + tfiYoLoInt],
                    LUT[CbHiInt*LUTsizeCr*LUTsizeYo + CrHiInt*LUTsizeYo + tfiYoLoInt], CbAlpha);
        bilin1 = linearBlend(bot, top, CrAlpha);
        // Finish with Yo = Lo:
        // First find the closest Cb-points.
        CbLoInt = dMax(0, fromFloatToIntCbKMfloor(Cb, CbK[tfiYoHiInt], CbM[tfiYoHiInt],
LUTsizeCbMinus1));
        // CbHiInt = dMin(LUTsizeCbMinus1, CbLoInt+1);
        CbHiInt = dMin(LUTsizeCbMinus1, fromFloatToIntCbKMfloorPlus1(Cb, CbK[tfiYoHiInt],
CbM[tfiYoHiInt], LUTsizeCbMinus1));
        CbLo = fromIntToFloatCbKM(CbLoInt, CbK[tfiYoHiInt], CbM[tfiYoHiInt]);
        CbHi = fromIntToFloatCbKM(CbHiInt, CbK[tfiYoHiInt], CbM[tfiYoHiInt]);
        if(CbHi == CbLo)
                CbAlpha = 0.0;
        else
                CbAlpha = (Cb-CbLo)/(CbHi-CbLo);
        // Then find the closest Cr-points.
        CrLoInt = dMax(0, fromFloatToIntCrKMfloor(Cr, CrK[tfiYoHiInt], CrM[tfiYoHiInt], LUTsizeCrMinus1));
        // CrHiInt = dMin(LUTsizeCrMinus1, CrLoInt+1);
        CrHiInt = dMin(LUTsizeCrMinus1, fromFloatToIntCrKMfloorPlus1(Cr, CrK[tfiYoHiInt], CrM[tfiYoHiInt],
LUTsizeCrMinus1));
        CrLo = fromIntToFloatCrKM(CrLoInt, CrK[tfiYoHiInt], CrM[tfiYoHiInt]);
        CrHi = fromIntToFloatCrKM(CrHiInt, CrK[tfiYoHiInt], CrM[tfiYoHiInt]);
        if(CrHi == CrLo)
                CrAlpha = 0.0;
        else
                CrAlpha = (Cr-CrLo)/(CrHi-CrLo);
                // Now interpolate for Yo = lo
        bot = linearBlend(LUT[CbLoInt*LUTsizeCr*LUTsizeYo + CrLoInt*LUTsizeYo + tfiYoHiInt],
                    LUT[CbHiInt*LUTsizeCr*LUTsizeYo + CrLoInt*LUTsizeYo + tfiYoHiInt], CbAlpha);
        top = linearBlend(LUT[CbLoInt*LUTsizeCr*LUTsizeYo + CrHiInt*LUTsizeYo + tfiYoHiInt],
                    LUT[CbHiInt*LUTsizeCr*LUTsizeYo + CrHiInt*LUTsizeYo + tfiYoHiInt], CbAlpha);
        bilin2 = linearBlend(bot, top, CrAlpha);
                double LUTresult = linearBlend(bilin1, bilin2, tfiYoAlpha);
        LUTresult = dMax( YpMinValue, LUTresult);
                return (dMin(YpMaxValue, LUTresult));
}
```

ANNEX B

The following Annex B lists borders for Cb and Cr for 40 different tfiYo values.

```
R0GfBf case
double CbCutNegTab__32[32] = {-0.00127383743715076404, -0.00407658344364392623,
-0.00800817089195715766, -0.01289968019918501935, -0.01864672363411269337,
-0.02517567511554632750, -0.03243066634133528331, -0.04036725908837689170,
-0.04894891820316762260, -0.05814485898398311092, -0.06792864448372841479,
-0.07827722489260170724, -0.08917025341992318443, -0.10058958342020238308,
-0.11251888894792126672, -0.12494337207689044933, -0.13784958894702295028,
-0.15122498561482849988, -0.16505830998471707205, -0.17933892888887681405,
-0.19405700719688331879, -0.20920336688903751199, -0.22476941535056013666,
-0.24074708428366931035, -0.25712877728484107021, -0.27390732455816729773,
-0.29107594355453442203, -0.30862820456913553357, -0.32655800051698280484,
-0.34485952025176319635, -0.36036994728074678296, -0.36036994728074678296};
        double CbCutPosTab__32[32] = {0.00725987117354068116, 0.02034972350191287943,
0.03604999675507247758, 0.05338912853188689661, 0.07188545471039242685,
0.09125332189460251542, 0.11130536100165762392, 0.13191030106777409947,
0.15297176795838729468, 0.17441648284136027081, 0.19618717275670993772,
0.21823808513408984866, 0.24053198970140371449, 0.26303817574096349796,
0.28573089889355296478, 0.30858839497975071309, 0.33159199064099870169,
0.35472623432067962312, 0.37797653396037900198, 0.40132978788861917163,
0.42477936237828944899, 0.44831129495496202519, 0.47191736855315155709,
0.49559625267560730721, 0.50000000000000000000, 0.50000000000000000000,
0.50000000000000000000, 0.34434455488753107355, 0.27317306378480865625,
0.23150994681422598642, 0.19802203608626331444, 0.16800541335249610797};
        double CrCutNegTab__32[32] = {-0.00640959219984844376, -0.02058268367187460202,
-0.04055934045568879848, -0.06550996255112352673, -0.09492023190375395436,
-0.12842635278483635619, -0.16575156405608870713, -0.20667521611716574426,
-0.25101551556951018362, -0.29861898259051594673, -0.34935357325656596350,
-0.40310396677308779623, -0.45976820206401480817, -0.50000000000000000000,
-0.50000000000000000000, -0.50000000000000000000, -0.50000000000000000000,
```

-continued

```
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000};
    double CrCutPosTab_32[32] = {-0.00000001939487659230, -0.00000001939487659234,
-0.00054926510969009962, -0.00153963254464980093, -0.00272750227002843118,
-0.00403936674885009995, -0.00543878347630096307, -0.00690414032822684372,
-0.00842126107330901964, -0.00998021387909762969, -0.01157370719250228053,
-0.01319619656319917685, -0.01484334896839464325, -0.01651170281073725127,
-0.01819844222222491426, -0.01990124169183193903, -0.02161815582633526758,
-0.02334753911564979231, -0.02508798624907343164, -0.02683828687251243322,
-0.02859739072147342645, -0.03036438035580497213, -0.03213844956071811726,
-0.03391888603682721715, -0.03570505738176988492, -0.03749639962954742778,
-0.03929240779989009308, -0.30742507662429935378, -0.37137545547504485777,
-0.39376988370837634479, -0.41664599797412965598, -0.43999638399679064094};
RfG0Bf case
    double CbCutNegTab_RfG0Bf_32[32] = {-0.00077210106278208614, -0.00237044735816330015,
-0.00449224417800392437, -0.00701888740851120026, -0.00988134306939439030,
-0.01303324879756095900, -0.01644086673984825400, -0.02007832969670978254,
-0.02392505830313461368, -0.02796422130203516168, -0.03218175381379399097,
-0.03656569849699965041, -0.04110574516531530914, -0.04579289836351960186,
-0.05061923073313318727, -0.05557769579445025199, -0.06066198302597887448,
-0.06586640377267720392, -0.07118580088817715354, -0.07661547094633266997,
-0.08215111181753381731, -0.08778876467448369636, -0.09352477624022872971,
-0.09935576282460557851, -0.10527858048165814053, -0.11129029950504776281,
-0.11738812490056326426, -0.12356966535509500416, -0.12983234082380526453,
-0.13617394399181415032, -0.13963007271925095831, -0.13963007271925095831};
    double CbCutPosTab_RfG0Bf_32[32] = {0.00665317895990073967, 0.01875570828141124094,
0.03332863249022600949, 0.04946167169127433511, 0.06670118771252440959,
0.08477716800200066349, 0.10351198677436820872, 0.12278089424758427406,
0.14249210851848762016, 0.16255770183119329776, 0.18297692840957788252,
0.20365198012712223963, 0.22456516877196078252, 0.24568696884269169978,
0.26699263231566489063, 0.28846127392161180492, 0.31007491793836788885,
0.33181813335956428235, 0.35367749893592370647, 0.37564129931851669708,
0.39769910974426020411, 0.41984198294781960303, 0.44206138380336368332,
0.46435084822756944600, 0.48670300242551478576, 0.50000000000000000000,
0.50000000000000000000, 0.50000000000000000000, 0.50000000000000000000,
0.50000000000000000000, 0.46218151369256293970, 0.42403288882918421798};
    double CrCutNegTab_RfG0Bf_32[32] = {-0.00005647863415476404, -0.00141905066644266282,
-0.00252162609393359908, -0.00374223853627908033, -0.00504656610191018314,
-0.00641417986463377592, -0.00783164080421770888, -0.00928951048781221159,
-0.01078084467990736081, -0.01230035278587101634, -0.01384389280750505070,
-0.01540815026245029654, -0.01699042473738420281, -0.01858848275261838767,
-0.02020045323911352081, -0.02182475137724714312, -0.02346002188243123329,
-0.02510509596974689131, -0.02675895815626006327, -0.02842072027735888240,
-0.03008960088497900781, -0.03176490872290479994, -0.03344602933345423856,
-0.03513241409923246322, -0.03682357119990422450, -0.03851905809051792834,
-0.04021430540214275540, -0.04021430540214275540, 0.05726243450640761123,
0.34288991827715348260, 0.39366155407426306478, 0.42954796548324347683};
    double CrCutPosTab_RfG0Bf_32[32] = {0.00374987265413128431, 0.01151266049370615156,
0.02181772301788605442, 0.03408902823585078373, 0.04799129463336636314,
0.06329935116726537192, 0.07984934097894078042, 0.09751563124069635713,
0.11619827822235388737, 0.13581553328396811509, 0.15629908402150952118,
0.17759085662307860787, 0.19964077942375510477, 0.22240517797458095317,
0.24584546665656734077, 0.26992739879764887645, 0.29462078579898087760,
0.31989741970571095031, 0.34573238443914355855, 0.37210304300572932812,
0.39898750419522421851, 0.42636790454968681585, 0.45422750239838760589,
0.48254727159258303804, 0.50000000000000000000, 0.50000000000000000000,
0.50000000000000000000, 0.50000000000000000000, 0.50000000000000000000,
0.50000000000000000000, 0.50000000000000000000, 0.50000000000000000000};
RfGfB0 case
    double CbCutNegTab_RfGfB0_32[32] = {-0.02530684155122148518, -0.08203408087619538935,
-0.16308050963150010277, -0.26543749269753391662, -0.38722888352413181723,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000};
    double CbCutPosTab_RfGfB0_32[32] = {-0.00000009206341852207, -0.00000009206341852215,
-0.00086898092377465106, -0.00265769366937836050, -0.00502574726143923192,
-0.00784071929806486739, -0.01102575480827142247, -0.01452993967731268906,
-0.01831404278895931020, -0.02235119970850023285, -0.02661802860962307615,
-0.03109591306007733827, -0.03576930825557824573, -0.04062500764956818861,
-0.04565163089323605317, -0.05083925435827639505, -0.05617913718624008290,
```

```
        -0.06166351345583826610, -0.06728543139093894065, -0.07303862683620561402,
        -0.07891742221226433207, -0.08491664475920454591, -0.09103155961501067928,
        -0.09725781446601250435, -0.10359139333909538061, -0.11002857769862495196,
        -0.11656591344091452034, -0.12320182695094348501, -0.12992837957509820179,
        -0.13674768920534907668, -0.33474992288985072619, -0.35350643888949812021};
            double CrCutNegTab__RfGfB0__32[32] = {-0.00166801136120569931, -0.00533669297231415939,
        -0.01048204226881967703, -0.01688289336326024778, -0.02440259467423915377,
        -0.03294477523450288492, -0.04243631425481671909, -0.05281905498476222732,
        -0.06404518647478284199, -0.07607442515231541136, -0.08887217837902623707,
        -0.10240828685443603696, -0.11665612904108643710, -0.13159196288283614429,
        -0.14719442911500840721, -0.16344416816175649787, -0.18032351904506416229,
        -0.19781627888178179853, -0.21590750804024480547, -0.23458837031037174158,
        -0.25383100033878591706, -0.27363839258736954996, -0.29399430749180505140,
        -0.31488819151735492063, -0.33631010855592241571, -0.35825068066288323632,
        -0.38070103654952891503, -0.40365276656473858541, -0.42709788314455776614,
        -0.45102878589902450912, -0.45978571459785499975, -0.45978571459785499975};
            double CrCutPosTab__RfGfB0__32[32] = {0.00422049219955764401, 0.01290784433482881216,
        0.02440891408188868364, 0.03808056746093658324, 0.05354952556704817984,
        0.07056560290869097474, 0.08894699903552732989, 0.10855451976941676850,
        0.12927748860148013943, 0.14906440737624573889, 0.16542345041261896643,
        0.18242064239724825603, 0.20001614684976284919, 0.21817522648479864555,
        0.23686728425811634513, 0.25606513585611379025, 0.27574444684950233375,
        0.29588328979956801668, 0.31646179055455680995, 0.33746184206414386875,
        0.35886687012301499156, 0.38066163962186316816, 0.40283209279876835973,
        0.42536521306045554924, 0.44824890944767559198, 0.47147191792521636611,
        0.49502371650264831437, 0.50000000000000000000, 0.50000000000000000000,
        0.50000000000000000000, 0.15018597426600435729, 0.08202731177144517716};
R1GfBf case
            double CbCutNegTab__R1GfBf__32[32] = {-0.30190851471856944288, -0.35351968191049520929,
        -0.38670296551314681244, -0.41143156684506104748, -0.43125670500693735754,
        -0.44787583386824919573, -0.46223778729534764504, -0.47492838746928400795,
        -0.48633538250296820538, -0.49672896521948034509, -0.50000000000000000000,
        -0.50000000000000000000, -0.50000000000000000000, -0.50000000000000000000,
        -0.50000000000000000000, -0.50000000000000000000, -0.50000000000000000000,
        -0.50000000000000000000, -0.50000000000000000000, -0.50000000000000000000,
        -0.50000000000000000000, -0.50000000000000000000, -0.50000000000000000000,
        -0.50000000000000000000, -0.50000000000000000000, -0.50000000000000000000,
        -0.50000000000000000000, -0.50000000000000000000, -0.50000000000000000000,
        -0.50000000000000000000, -0.50000000000000000000, -0.50000000000000000000};
            double CbCutPosTab__R1GfBf__32[32] = {0.14157987415879277893, 0.20437602537933119429,
        0.24218469842015974414, 0.26929573668166528755, 0.29045184957464303954,
        0.30782397731282767905, 0.32258827767639342010, 0.33545347167837102909,
        0.34687938786433053506, 0.35718112849130029263, 0.36036994728071553018,
        0.36036994728071553018, 0.17363346370762050563, 0.13760552939814471585,
        0.11757370467870183195, 0.10321212250322212012, 0.09179934600869238404,
        0.08219954371805604185, 0.07382685949778472478, 0.06633835899284554194,
        0.05951533636621669787, 0.05320942234602673432, 0.04731509857725677698,
        0.04175447681501900238, 0.03646830246533800529, 0.03141035471214286001,
        0.02654381017147851296, 0.02183879677414464482, 0.01727069838862876905,
        0.01281894927410076081, 0.00846615759125719444, 0.00419745566025806448};
            double CrCutNegTab__R1GfBf__32[32] = {0.33746529741354436283, 0.28515615871270350024,
        0.25143828754579011786, 0.22627333357991322171, 0.20607685765617730911,
        0.18913260739180071113, 0.17447996546013003205, 0.16152531500866806891,
        0.14987540776267624376, 0.13925603333044253573, 0.12946819142262397384,
        0.12036282897464120611, 0.11182531112239397970, 0.10376525575778950041,
        0.09611143277146845521, 0.08880425394388639926, 0.08179559550243289956,
        0.07504500726923331311, 0.06851830529009778070, 0.06218634915070808677,
        0.05602403726005199952, 0.05000958318037437844, 0.04412394205795155955,
        0.03835033758267647475, 0.03267390679855011054, 0.02708139238219046951,
        0.02156092559631402061, 0.01610180515057617334, 0.01069435950576362419,
        0.00532975379249148520, -0.00000000099999969884, -0.00000000099999969884};
            double CrCutPosTab__R1GfBf__32[32] = {0.50000000000000000000, 0.50000000000000000000,
        0.50000000000000000000, 0.50000000000000000000, 0.50000000000000000000,
        0.50000000000000000000, 0.50000000000000000000, 0.50000000000000000000,
        0.50000000000000000000, 0.50000000000000000000, 0.50000000000000000000,
        0.50000000000000000000, 0.50000000000000000000, 0.50000000000000000000,
        0.50000000000000000000, 0.50000000000000000000, 0.50000000000000000000,
        0.50000000000000000000, 0.50000000000000000000, 0.50000000000000000000,
        0.50000000000000000000, 0.50000000000000000000, 0.50000000000000000000,
        0.50000000000000000000, 0.50000000000000000000, 0.50000000000000000000,
        0.50000000000000000000, 0.50000000000000000000, 0.50000000000000000000,
        0.50000000000000000000, 0.50000000000000000000, 0.50000000000000000000};
RfG1Bf case
            double CbCutNegTab__RfG1Bf__16[16] = {-0.50000000000000000000, -0.50000000000000000000,
        -0.50000000000000000000, -0.50000000000000000000, -0.50000000000000000000,
        -0.50000000000000000000, -0.50000000000000000000, -0.50000000000000000000,
        -0.50000000000000000000, -0.50000000000000000000, -0.50000000000000000000,
        -0.50000000000000000000, -0.50000000000000000000, -0.50000000000000000000,
        -0.50000000000000000000, -0.50000000000000000000};
```

```
double CbCutPosTab_RfG1Bf_16[16] = {-0.02861821115133716953, 0.03563032707549628614,
0.07349861754940163749, 0.10032242107397708331, 0.12107887037575625067,
0.13801535283141064259, 0.13963007271920124808, 0.13963007271920124808,
0.04181508842460046615, 0.02941851023115166913, 0.02201427048210862977,
0.01659627768007845491, 0.01225897252168394423, 0.00860395774991815077,
0.00541941442331886434, 0.00257875374432709132};
    double CrCutNegTab_RfG1Bf_16[16] = {-0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000, -0.50000000000000000000,
-0.50000000000000000000, -0.50000000000000000000};
    double CrCutPosTab_RfG1Bf_16[16] = {-0.20576642765567176863, -0.14439383129596464195,
-0.10695403346185793081, -0.07989887448078490662, -0.05866990505851416016,
-0.04116300878207145714, -0.02623134205915689243, -0.01318059141464786657,
-0.00155853521138023775, 0.00894573525525740008, 0.01855509169586030960,
0.02743471068968550072, 0.03571039267008900564, 0.04021430540213202093,
0.04021430540213202093, 0.00538201782679995945};
RfGfB1 case
    double CbCutNegTab_RfGfB1_32[32] = {0.37470501703773290147, 0.32834750962172887245,
0.29733557334585780652, 0.27356932641137055029, 0.25405826934698616526,
0.23734057486647897051, 0.22258558938520844883, 0.20927358490660380692,
0.19705658476359616538, 0.18568949161369902034, 0.17499269231348985043,
0.16483028665909871258, 0.15509667526406795135, 0.14570794103922460327,
0.13659609031479616470, 0.12770510356518582906, 0.11898813015497652912,
0.11040547632289630930, 0.10192312002496083101, 0.09351160308643273467,
0.08514518825531575130, 0.07680120840589492459, 0.06845957406666836054,
0.06010237364741480987, 0.05171356093455677094, 0.04327870978861283330,
0.03478481272793841617, 0.02622011929506212757, 0.01757400413808768089,
0.00883685675799965320, -0.00000000999999291187, -0.00000000999999929187};
    double CbCutPosTab_RfGfB1_32[32] = {0.50000000000000000000, 0.50000000000000000000,
0.50000000000000000000, 0.50000000000000000000, 0.50000000000000000000,
0.50000000000000000000, 0.50000000000000000000, 0.50000000000000000000,
0.50000000000000000000, 0.50000000000000000000, 0.50000000000000000000,
0.50000000000000000000, 0.50000000000000000000, 0.50000000000000000000,
0.50000000000000000000, 0.50000000000000000000, 0.50000000000000000000,
0.50000000000000000000, 0.50000000000000000000, 0.50000000000000000000,
0.50000000000000000000, 0.50000000000000000000, 0.50000000000000000000,
0.50000000000000000000, 0.50000000000000000000, 0.50000000000000000000,
0.50000000000000000000, 0.50000000000000000000, 0.50000000000000000000,
0.50000000000000000000, 0.50000000000000000000, 0.50000000000000000000};
    double CrCutNegTab_RfGfB1_32[32] = {-0.17439753022333343013, -0.22184580752843069407,
-0.25324768328207938405, -0.27715754177497819999, -0.29669606802915943211,
-0.31337731043264682729, -0.32805687366751329348, -0.34126775773441553330,
-0.35336552231095158527, -0.36459980476406600447, -0.37515301377565724028,
-0.38516279827692712079, -0.39473583906104320329, -0.40395670125810106965,
-0.41289372947641883593, -0.42160309623379600850, -0.43013165555626215783,
-0.43851899966428203870, -0.44678987000091484127, -0.45500078594156723177,
-0.46314990021795715558, -0.47126865548309820886, -0.47937679392380760923,
-0.48749185679595125054, -0.49562950053998444666, -0.50000000000000000000,
-0.50000000000000000000, -0.50000000000000000000, -0.50000000000000000000,
-0.50000000000000000000, -0.50000000000000000000, -0.14400300841947416552};
    double CrCutPosTab_RfGfB1_32[32] = {0.13519415120974304090, 0.18947369043916320597,
0.22435149638911616732, 0.25044363905088956601, 0.27149968274527674916,
0.28930248717506429346, 0.30484484337199907467, 0.31873580490765037764972,
0.33138595128181763672, 0.34306970572864370350, 0.35399319923484229289,
0.36430921346190808796, 0.37413537260760204584, 0.38356431735185075871,
0.39267044346089802209, 0.40151450728460252870, 0.41014685818658908056,
0.41860975949335493818, 0.42693908804220342956, 0.43516600574870493941,
0.44331588871940497132, 0.45141311671839590147, 0.45947758549900724612,
0.45978571459785039233, 0.45978571459785039233, 0.13802803591705350983,
0.09814230203673798836, 0.07311604202585193779, 0.05406018092453609980,
0.03820049826074207316, 0.02430059672478867802, 0.01169916998794638500};
RfGfBf case
    double CbCutNegTab_RfGfBf_32[32] = {-0.00151036923006677955, -0.00489590864762055964,
-0.00973280761443453407, -0.01584150369792602236, -0.02311002509312948608,
-0.03145871337593957734, -0.04082663938212219290, -0.05116498342562093848,
-0.06243333249448038830, -0.07459742015908495116, -0.08762764083109000901,
-0.10149804377504527408, -0.11618559274107298496, -0.13166964503475117598,
-0.14793153811018064370, -0.16495427984577962222, -0.18272230059246605260,
-0.20122125923737813058, -0.22043787449474946949, -0.24035980251161379040,
-0.26097552049908229188, -0.28227423456786343570, -0.30424581734223193896,
-0.32688070752086939574, -0.35016988750747940484, -0.37410481449498733664,
-0.39867738446937023289, -0.42387989030029055160, -0.44970499046726974957,
-0.47614567989836281692, -0.50000000000000000000, -0.50000000000000000000};
    double CbCutPosTab_RfGfBf_32[32] = {0.00703364326093259325, 0.01967775694812028825,
0.03482341577234486507, 0.05153641774279654059, 0.06935443420211630239,
0.08800362261331637348, 0.10730453639145243194, 0.12713156082569371241,
0.14739254246491326206, 0.16801745494659958702, 0.18895160566359592291,
```

0.21015132629746605120, 0.23158111357902388949, 0.25321166183879284528,
0.27501846765377435666, 0.29698081467212761320, 0.31908101873603822440,
0.34130385585108080626, 0.36363612148717905370, 0.38606628606933030001,
0.40858422214638623338, 0.43118098580044511570, 0.45384863967185562483,
0.47658010831311375943, 0.49936905894268485140, 0.50000000000000000000,
0.50000000000000000000, 0.39216167549657209836, 0.37744179720047393856,
0.36700253452535280818, 0.17004725538866366508, 0.14829987949717812756};
    double CrCutNegTab_RfGfBf_32[32] = {−0.00173926680058514717, −0.00558378930588915041,
−0.01100158475294558263, −0.01776755108823878729, −0.02574215741096564855,
−0.03482672043502735987, −0.04494617021157485542, −0.05604066327264418945,
−0.06806089263579979953, −0.08096524023154136329, −0.09471789559482352017,
−0.10928759031444004735, −0.12464667814020598258, −0.14077045775842789155,
−0.15763669222614387633, −0.17522518301787054495, −0.19351748693034728777,
−0.21249666319213972310, −0.23214707083291716283, −0.25245420796933093488,
−0.27340458286555857637, −0.29498557880862225078, −0.31718538106765575835,
−0.33999288328608068266, −0.36339760623715111620, −0.38738969727883126870,
−0.41195976412746493356, −0.43709892984004738992, −0.46279875262561304128,
−0.48905119045506439956, −0.50000000000000000000, −0.50000000000000000000};
    double CrCutPosTab_RfGfBf_32[32] = {0.00313111751081321908, 0.00957419685215164101,
0.01810288994767998705, 0.02824026144476536257, 0.03970955060756901217,
0.05232527006112256546, 0.06595265170379588371, 0.08048849774079298858,
0.09585079328949581978, 0.11197252198631303666, 0.12879772709915177087,
0.14627887062658181949, 0.16437498942170747362, 0.18305036479110697867,
0.20227353609554046820, 0.22201655244072193707, 0.24225439375606194758,
0.26296451526354225336, 0.28412648369048137953, 0.30572168293177920395,
0.32773307312561111848, 0.35014499139351379364, 0.37294298549417248534,
0.39611367377641276688, 0.41964462636466370871, 0.44352426364840241702,
0.46774176899603175928, 0.49228701325427465241, 0.50000000000000000000,
0.50000000000000000000, 0.13641658380116497562, 0.07443729091424453048};

ANNEX D

The following Annex D describes LUT generation according to an embodiment.

void calculateLUT(double*myLUT, double *currentkCb, double *currentmCb, double *currentkCr, double *currentmCr, double *currentCbCutNegTab, double *currentCbCutPosTab, double *currentCrCutNegTab, double *currentCrCutPosTab, double tfiYoMin, double tfiYoMax, int LUTsideCb, int LUTsideCr, int LUTsideYo, double (*myAjusty)(double, double, double))

```
{
    int LUTsizeCb = LUTsideCb;
    int LUTsizeCr = LUTsideCr;
    int LUTsizeYo = LUTsideYo;
    int tfiYoInt;
    double tfiYo;
    double Yo;
    double CbCutPos;
    double CrCutPos;
    double CbCutNeg;
    double CrCutNeg;
    double k, m;
    int CbInt, CrInt;
    double Cb, Cr;
    double Yp;
    for(tfiYoInt = 0; tfiYoInt < LUTsideYo; tfiYoInt++)
    {
        tfiYo = fromIntToFloatTfiYo(tfiYoInt, tfiYoMin, tfiYoMax, LUTsizeYo−1);
        //sprintf(kommastring, "%.20f", tfiYo);
        //toComma(kommastring);
        //printf("%s \n", kommastring);
        printf("%d\n", tfiYoInt);
        Yo = pq_eotf(tfiYo);
        // To calculate safe boundaries we need to take into consideration not only this level but the level
        // below and above, since we may be interpolating with them.
        int tfiYoIntLo = iMax(0, tfiYoInt−1);
        int tfiYoIntHi = iMin(LUTsideYo−1, tfiYoInt+1);
        double tfiYoLo = fromIntToFloatTfiYo(tfiYoIntLo, tfiYoMin, tfiYoMax, LUTsizeYo−1);
        double tfiYoHi = fromIntToFloatTfiYo(tfiYoIntHi, tfiYoMin, tfiYoMax, LUTsizeYo−1);
        double tfiYoHalf = (tfiYoLo + tfiYoHi)/2.0;
        // Now calculate the borders of the LUT for Cb and Cr:
        CbCutPos = currentCbCutPosTab[tfiYoInt];
        CrCutPos = currentCrCutPosTab[tfiYoInt];
        CbCutNeg = currentCbCutNegTab[tfiYoInt];
        CrCutNeg = currentCrCutNegTab[tfiYoInt];
        // If we want to disable:
//            CbCutPos = 0.5;
//            CrCutPos = 0.5;
```

```
//          CbCutNeg = -0.5;
//          CrCutNeg = -0.5;
//      CrCutNeg = 0.0;
        CbCutPos = dMin(CbCutPos, 0.5);
        CrCutPos = dMin(CrCutPos, 0.5);
        CbCutNeg = dMax(CbCutNeg, -0.5);
        CrCutNeg = dMax(CrCutNeg, -0.5);
// if(CrCutPos <= CrCutNeg)
// {
//   CrCutNeg = -0.01;
//   CrCutPos = 0.01;
// }
        if(CbCutPos < 0.0 || CbCutNeg > 0.0)
        {
            // We have a situation where zero is not inside the interval. This can happen especially for R0GfBf,
            // RfG0Bf and RfG0Bf. It is not worth making the interval much bigger just to make sure that zero is
            // reproduced perfectly.
            calcBordersNotContainingZero(CbCutNeg, CbCutPos, k, m, LUTsizeCb-1);
            currentkCb[tfiYoInt] = k;
            currentmCb[tfiYoInt] = m;
        }
        else
        {
            calcBorders(CbCutNeg, CbCutPos, k, m, LUTsizeCb-1);
            currentkCb[tfiYoInt] = k;
            currentmCb[tfiYoInt] = m;
        }
        if(CrCutPos < 0.00 || CrCutNeg > 0.0)
        {
            calcBordersNotContainingZero(CrCutNeg, CrCutPos, k, m, LUTsizeCr-1);
            currentkCr[tfiYoInt] = k;
            currentmCr[tfiYoInt] = m;
        }
        else
        {
            calcBorders(CrCutNeg, CrCutPos, k, m, LUTsizeCr-1);
            currentkCr[tfiYoInt] = k;
            currentmCr[tfiYoInt] = m;
        }
        for(CbInt = 0; CbInt < LUTsideCb; CbInt++)
        {
            Cb = fromIntToFloatCbKM(CbInt, currentkCb[tfiYoInt], currentmCb[tfiYoInt]);
                    for (CrInt = 0; CrInt < LUTsideCr; CrInt++)
            {
                Cr = fromIntToFloatCrKM(CrInt, currentkCr[tfiYoInt], currentmCr[tfiYoInt]);
                        if(tfiYoInt == 0)
                {
                    // The value for exactly zero is never really used. It is only used for interpolation. Therefore it is
                    // better to optimize the value for interpolated values, such as for the value halfway between
                    // level 0 and 1.
                            double YpHalf = (*myAjusty)(tfiYoHalf, Cb, Cr);
                            double YpHi = (*myAjusty)(tfiYoHi, Cb, Cr);
                    // We now want the Yp to be such that if we do a lookup at tfiYoHalf we get the exactly correct
                    // value. Thus the value to store YpStore needs to be satisfy
                    // YpHalf = 0.5*YpHi + 0.5*___YpStore
                    // (YpHalf - 0.5*YpHi) = 0.5*YpStore
                    // YpStore = 2*(YpHalf - 0.5*YpHi);
                    double YpStore = 2.0*(YpHalf - 0.5*YpHi);
                    Yp = YpStore;
                }
                else
                {
                    // Normal case: just calculate the best Yp for this point.
                    Yp = (*myAjusty)(tfiYo, Cb, Cr);
                }
                            myLUT[CbInt*LUTsideCr*LUTsideYo + CrInt*LUTsideYo + tfiYoInt] = Yp;
            }
        }
    }
}
```

ANNEX E

This Annex E describes accommodating all the nonlinear branches of Ajusty.

BACKGROUND

It is now a well-known that using 4:2:0 subsampling with non-constant luminance (NCL) gives rise to luminance artifacts if the luma channel is created the traditional way. One way to solve this is to find the luma value that will give the correct luminance. One way of finding this luma value is to perform binary search/bisection search/interval halving, as described in the AJUSTY invention: Starting with the interval [0, 1023] for the value of Y', (luma), if the candidate value (say Y'=512) will generate too high a Y-value (luminance value), then the method continues with the lower half of the interval [0, 512] and so forth. One problem with using binary search is that the number of iterations can vary. As an example, if 10 bits are used, then up to ten iterations are needed to reduce the interval in the bisection search. Techniques for reducing the interval are available [5]. These methods work by finding a mathematical bound on Y'. As an example, if the lower bound of Y' is 324 and the upper bound of Y' is 455, then the interval [321, 448] can be used in the interval halving instead. Since this interval is only 127 steps wide, it will be ready in seven ($2^7$) iterations instead of ten. Using such techniques it is possible to get the average number of iterations down to less than two iterations. This means that it can be efficiently used for offline (non-realtime) applications, when the average processing time is what counts. However, for real-time applications, it is typically necessary to know in advance how many iterations will take place. To this end, it was envisioned already in [2] to use a linearization of the transfer function in order to calculate Y' approximately without resorting to interval halving. In fact, the application even described using a single step to calculate Y'. Furthermore, a contribution [3] has also described using a linearization to calculate an approximate value for Y'.

The problem with the linearization strategy is that it can sometimes lead to failures. In some cases the result obtained by the linearization strategy is worse than what would have been obtained by using traditional subsampling, which is cheaper.

SUMMARY

According to a first aspect a method of processing a pixel in a picture is provided, wherein the pixel can be represented by color components in a first color space, e.g., R',G'B', color components in a second color space, e.g. Y', Cb, Cr, and color components in a third color space, e.g., Y, Cb, Cr or XYZ, and wherein the color components of the different color spaces can be transferred between each other (as exemplified above) by color transformation functions. The method comprising
 determining a modified color Y'component in a second color space using a first function,
 checking whether this Y'component will generate clipping, and if said Y'component will generate clipping, and
 determining a modified color Y'component in said second color space using a second function.

According to a second aspect a processor for processing a pixel in a picture is provided, wherein the pixel can be represented by color components in a first color space, e.g. R',G'B', color components in a second color space, e.g. Y', Cb, Cr, and color components in a third color space, e.g. Y, Cb, Cr or XYZ, and wherein the color components of the different color spaces can be transferred between each other by color transformation functions. The processor is operative to:
 determine a modified color Y'component in a second color space using a first function, check whether this Y'component will generate clipping, and if the Y'component will generate clipping, the processor is operative to determine a modified color Y'component in said second color space using a second function.

The processor may also comprise modules, a module configured to determine a modified color Y'component in a second color space using a first function, a module configured to check whether this Y'component will generate clipping, and if the Y'component will generate clipping, a module configured to determine a modified color Y'component in said second color space using a second function.

DETAILED DESCRIPTION

One idea behind the embodiments of the invention is to find out whether the individual color channels (red (R) green (G) or blue (B)) saturate to the maximum allowed value before linearizing. I.e., if it can be determined that the Y' that results in the best Y means that any of the RGB channels e.g. the red channel will saturate, it is important that the linearization of the transfer function for that channel will be a constant, instead of a sloping line. This will reduce errors. (The Y' that results in the best Y, is the solution to the equation $Yo = w_R * tf(Y' + a_{13} * Cr) + wG * tf(Y' - a22 * Cb - a23 * Cr) + w_B * tf(Y' + a32 * Cb)$, I.e. if the result of the terms within the respective parenthesis is <1 or <1).

An advantage is that errors due to linearization can be reduced or avoided. This means that a Y' can be found that gives a Y-value close to the desired (or original) luminance Yo (o stands for original).

Another advantage is that the calculation is guaranteed to be finished in a small number of steps, i.e., the worst case number of steps is small.

In AJUSTY, we note that the original pixel before subsampling has the color (Ro, Go, Bo) and gets the original luminance Yo: (we may use different terminology in AJUSTY)

$$Yo = wR*Ro + wG*Go + wB*Bo.$$

where Ro is the (linear) red channel, Go is the green and Bo is the blue channel of the original pixel. wR, wG and wB are constants such as the CIE1931 XYZ constants for Y or the (similar) constants for BT2020, for instance wR=0.2627, wG=0.6780, wB=0.0593.

After subsampling and upsampling, it may not be possible to obtain exactly the same values for red, green and blue. We denote the resulting color values R, G and B and the resulting luminance Y:

$$Y = wR*R + wG*G + wB*B,$$

where R is the (linear) red channel, G is the green and B is the blue channel. R is obtained from the nonlinear value R' by applying the transfer function tf( ), which can be the PQ-EOTF transfer function as defined by SMPTE ST 2084, or another transfer function such as BT.1886 or Hybrid Log Gamma (HLG). We thus get $$Y = wR*tf(R') + wG*tf(G') + wB*tf(B').$$

The values R', G' and B' in turn depend on Y', Cb and Cr according to $$R' = Y' + a13 * Cr$$

$$G' = Y' - a22 * Cb - a23 * Cr$$

$$B' = Y' + a32 * Cb$$

where a13, a22, a23 and a32 are positive constants that depend on which color space is used. For BT.2020 we have a13=1.4746, a22=0.1646, a23=0.5714, and a32=1.8814. Inserting this into the equation above gives $$Y = wR*tf(Y' + a13*Cr) + wG*tf(Y' - a22*Cb - a23*Cr) + wB*tf(Y' + a32*Cb).$$

Note that since Cr and Cb are subsampled, we cannot change them in each pixel. Hence we can assume that they are fixed. However, we can change Y' so that Y matches Yo. Note also that since tf(·) is non-linear, and exists in three places, it is not in general possible to algebraically invert the function Y=f(Y') to get Y'=f−1(Y'). However, as is described in [2], it is possible to linearize tf( ) three times. For instance, the first $w_R * tf(Y' + a13*Cr)$ can be approximated as a line k1*Y'+m1 by linearizing, $$tf(x) \sim tf(a) + tf'(a)*(x-a)$$

For instance, linearizing in the point Ro' gives $$tf(x) \sim tf(Ro) + tf'(Ro)*(x-Ro)$$

Thus, $tf(Y' + a13*Cr) \sim tf(Ro) + tf'(Ro)*(Y' + a13*Cr - Ro)$ and, hence, $$wR*tf(Y'+a13*Cr) \sim wR*tf(Ro) + wR*tf'(Ro)*(Y' + a13*Cr - Ro)$$ which equals $$wR*tf'(Y'+a13*Cr) - wR*tf'(Ro)*Y' + (wR*tf(Ro) + wR*tf'(Ro)*(a13*Cr-Ro)) = k1Y' + m1$$

where k1=wR*tf(Ro) and m1=wR*tf(Ro)+wR*tf(Ro)*(a13*Cr−Ro).

Doing similar for wG*tf(Y'−a22*Cb−a23*Cr) and $w_B$*tf(Y'+a32*Cb) by linearizing in Go' and Bo' respectively means that we can approximate Y as $$Y \sim k1*Y' + m1 + k2*Y' + m2 + k3*Y' + m3, \text{ which is}$$

described in [2]. This is equivalent to $$Y \sim (k1+k2+k3)*Y' + (m1+m2+m3).$$

This can be inverted to Y'∼Y'k=(Yo−(m1+m2+m3))/(k1+k2+k3). In more detail, starting with $$Yo = wR*tf(Y'+a13*Cr) + wG*tf(Y'-a22*Cb-a23*Cr) + w_B*tf(Y'+a32*Cb),$$

we linearize tf(x)∼tf(a)+tf'(a)(x−a), where the linearization point is a=Ro' for the first instance of the function, a=Go' for the second instance, and a=Bo' for the third instance of the function. This gives:

$$Yo = wR[tf(Ro') + tf'(Ro')(Y'+a13*Cr-Ro')] + wG[tf(Go') + tf'(Go')(Y'-a22*Cb-a23*Cr-Go')] + wB[tf(Bo') + tf'(Go')(Y'+a32*Cb-Bo')]$$

Collecting Y' terms gives $$Yo = \{wRtf'(Ro') + wGtf'(Go') + wBtf'(Bo')\}Y' + \{wRtf(Ro') + wRtf'(Ro')(a13*Cr-Ro') + +wGtf(Go') + wGtf'(Go')(-a22*Cb-a23*Cr-Go') + +wBtf(Bo') + wBtf'(Bo')(a32*Cb-Bo')\}$$

we can now write Y'=t/n, where $$t = Yo - \{wRtf(Ro') + wRtf'(Ro')(a13*Cr-Ro') + wGtf(Go') + wGtf'(Go')(-a22*Cb-a23*Cr-Go') + wBtf(Bo') + wBtf'(Bo')(a32*Cb-Bo')\}$$

$$n = wRtf'(Ro') + wGtf'(Go') + wBtf'(Bo')$$

since Yo=wR tf(Ro')+wG tf(Go')+wB tf(Bo') we can simplify t to $$t = -\{wRtf'(Ro')(a13*Cr-Ro') + wGtf'(Go')(-a22*Cb-a23*Cr-Go') + wBtf'(Bo')(a32*Cb-Bo')\}$$

and hence we get $$Y' = -\frac{wRtf'(Ro')(a13Cr-Ro') + wGtf'(Go')(-a22Cb-a23Cr-Go')}{wRtf'(Ro') + wGtf'(Go') + wBtf'(Bo')} - \frac{wBtf'(Bo')(a32Cb-Bo')}{wRtf'(Ro') + wGtf'(Go') + wBtf'(Bo')}$$

(Equation 1)

This is equivalent to "Algorithm 2" in [3].

Figure 11:
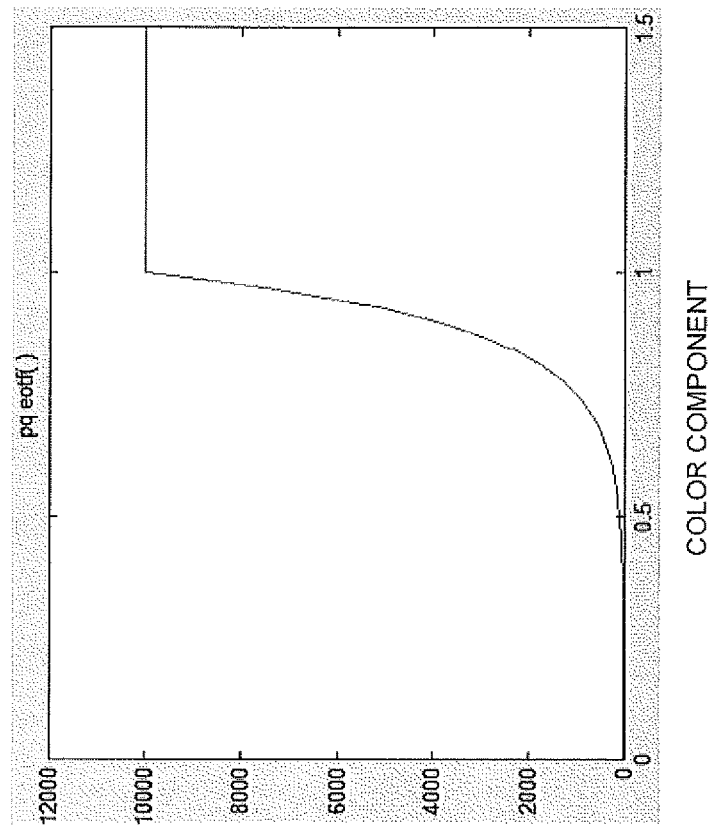
FIG. 11 is a diagram showing PQ EOTF.

This often works reasonably well. However, when we get close to the saturation point, the linearization breaks down. FIG. 11 shows the behavior of the PQ EOTF as defined by SMPTE ST 2084. The output increases strongly between 0 and 1.0, but after 1.0 the output is capped at 10000.

Note that just before input values of 1, the slope is very steep, the derivative here is over 90000. At input values over 1, the derivative is exactly zero.

Therefore, if one linearizes at a point where the input is just below one but the optimum color will have an input just above one, things can go wrong.

Here we have a detailed example of when that happens. Assume we have two pixels next to each other:
RGB1=[1000 1000 9995]
RGB2=[0 0 10000]
The subsampling process will first convert to nonlinear domain,
RGBp1=[0.7518 0.7518 0.9999]
RGBp2=[0.0000 0.0000 1.0000]
and then to Y'CbCr (using 2020 conversion matrix):
YCbCr1=[0.7665 0.1241 −0.0100]
YCbCr2=[0.0593 0.5000 −0.0402]
The subsampling now replaces these two values with an interpolated value:
YCbCr=[0.4129 0.3120 −0.0251]
Using Cb and Cr from this interpolated value, we can now use equation 1 to get the Y' value. For pixel1 we use Ro'=0.7518, Go'=0.7518, Bo'=0.9999. This gives $$Y' = 0.639883$$

But this is far too low, since it results in $$Y = wR*tf(Y'+a13*Cr) + wG*tf(Y'-a22*Cb-a23*Cr) + w_B*tf(Y'+a32*Cb) = 828.89$$

but the correct value should be Y'=0.7889 which would generate luminance value of
Yo=wR*1000+wG*1000+wB*9995=1533.4. This is a considerable error between the values 828.89 and 1533.4.

In this particular example the linear approximation breaks down since the blue channel saturates. In detail, the optimum Y' value, i.e., the Y' value that will create a Y value closest to Yo, will make the blue channel saturate. If we somehow knew that that was going to happen, we could make sure to linearize not in Bo', which at 0.9999 is on the wrong side of the saturation point, but instead linearize in, for instance the point 1.25.

Linearizing at Bo' (0.9999) would mean that we approximated $wB*tf(Y'+a32*Cb)$ with $k3*Y'+m3$ where k3 is over 90000. Linearizing at, say 1.25 would mean that k3=0.

Instead of linearizing in 1.25 one can replace the equation $$Y=wR*tf(Y'+a13*Cr)+wG*tf(Y'-a22*Cb-a23*Cr)+wB*tf(Y'+a32*Cb).$$

with the equation $$Y=wR*tf(Y'+a13*Cr)+wG*tf(Y'-a22*Cb-a23*Cr)+wB*10000$$

since tf(1)=10000, and do the linearization only in Ro' and Go'. This emanates to the same thing.

One question that comes up is how to know in advance if any channel will saturate or not. After all, in the current example, if the optimal Y' was a little bit lower, we could have the case that the blue channel would not saturate for the optimal Y', and then the linearization where k3=90000 would be correct.

The answer to that question can be seen when studying the conversion from Y'CbCr to R'G'B':

$$R'=Y'+a13*Cr$$

$$G'=Y'-a22*Cb-a23*Cr$$

$$B'=Y'+a32*Cb$$

Note that Cr and Cb are fixed, and so are a13, a22, a23 and a32. This means that there is a value Y'redclip, for which the red channel always clips if Y'>Y'redclip. This value can be easily computed as $$Y'\text{redclip}=1-a13*Cr,$$

since this means that R'=Y'+a13*Cr>Y'redclip+a13*Cr=1−a13*Cr+a13*Cr=1.

Likewise we have $$Y'\text{greenclip}=1+a22*Cb+a23*Cr,$$

$$Y'\text{blueclip}=1-a32*Cb.$$

We can now calculate the lowest value where any of these values clip, Y'firstclip:

$$Y'\text{firstclip}=\min(Y'\text{redclip},Y'\text{greenclip},Y'\text{blueclip}).$$

Now we can calculate the luminance for this value:

$$Y\text{firstclip}=wR*tf(Y'\text{firstclip}+a13*Cr)+wG*tf(Y'\text{firstclip}-a22*Cb-a23*Cr)+wB*tf(Y'\text{firstclip}+a32*Cb)$$

Now, if Yo<Yfirstclip, we know that the best Y' will not result in any color channels that saturate, and hence it is safe to use Equation 1.

However, assume that Yo>Yfirstclip. Assume Y'firstclip=Y'blueclip. This means that the blue channel will saturate, and we must linearize in a point above 1.0, for instance 1.25. However, it may still be the case that either the green or the red channel will also saturate. Therefore we will have to test $$Y'\text{firstclip}=\text{median}(Y'\text{redclip},Y'\text{greenclip},Y'\text{blueclip}),$$

where median gives the middle value. We now calculate the luminance for this second case:

$$Y\text{secondclip}=wR*tf(Y'\text{secondclip}+a13*Cr)+wG*tf(Y'\text{secondclip}-a22*Cb-a23*Cr)+wB*tf(Y'\text{secondclip}+a32*Cb)$$

Now, if Yo<Ysecondclip, we know that only the blue component saturated, and we can linearize in Ro', Go' and 1.25. Else, if Yo>Ysecondclip, and assume that Y'secondclip=Y'redclip, then we can linearize in 1.25, Go', and 1.25.

Note that all three color channels cannot simultaneously saturate for inputs Y' in [0, 1], so we can stop there.

In summary, we have to calculate two extra luminance values. This is unfortunate, since that is expensive. However, if we do that, we are sure that we are using the correct formula. Also, it is still less expensive than the worst case of having to perform ten iterations, as was the worst case in [2].

This is pseudo-code for approximating Y' in a safe way:
Step 1: calculate Y'redclip, Y'greenclip, Y'blueclip:

$$Y'\text{redclip}=1-a13*Cr,$$

$$Y'\text{greenclip}=1+a22*Cb+a23*Cr,$$

$$Y'\text{blueclip}=1-a32*Cb.$$

Step 2: calculate luminance for lowest clip value:

$$Y'\text{firstclip}=\min(Y'\text{redclip},Y'\text{greenclip},Y'\text{blueclip}).$$

$$Y\text{firstclip}=wR*tf(Y'\text{firstclip}+a13*Cr)+wG*tf(Y'\text{firstclip}-a22*Cb-a23*Cr)+wB*tf(Y'\text{firstclip}+a32*Cb)$$

--- if(Yo < Yfirstclip)
{
  calculate Y' according to linearization in Ro', Go', and Bo':

$$Y' = -\frac{wR\,tf'(Ro')(a13\,Cr - Ro') + wG\,tf'(Go')(-a22Cb - a23Cr - Go')}{wR\,tf'(Ro') + wG\,tf'(Go') + wB\,tf'(Bo')} - \frac{wB\,tf'(Bo')(a32Cb - Bo')}{wR\,tf'(Ro') + wG\,tf'(Go') + wB\,tf'(Bo')}$$

STOP
}

---

Step 3: at least one channel clips. See if another channel clips:

$$Y'\text{secondclip}=\text{median}(Y'\text{redclip},Y'\text{greenclip},Y'\text{blueclip}).$$

$$Y\text{secondclip}=wR*tf(Y'\text{secondclip}+a13*Cr)+wG*tf(Y'\text{secondclip}-a22*Cb-a23*Cr)+wB*tf(Y'\text{secondclip}+a32*Cb)$$

--- if(Yo < Ysecondclip)
{
  only one channel saturates. Use different approximations depending upon which channel saturated.
if Y'firstclip = Y'blueclips, use $$Y' = \frac{Yo - wB*10000 - wR\,tf(Ro') - wR\,tf'(Ro')(a13\,Cr - Ro') - wG\,tf(Go') - wG\,tf'(Go')(-a22Cb - a23Cr - Go')}{wR\,tf'(Ro') + wG\,tf'(Go')}$$

if Y'firstclip = Y'redclips, use $$Y' = \frac{Yo - wR*10000 - wB\,tf(Bo') - wB\,tf'(Bo')(a32\,Cb - Bo') - wG\,tf(Go')}{wB\,tf'(Bo') + wG\,tf'(Go')} - \frac{-wG\,tf'(Go')(-a22Cb - a23Cr - Go')}{wB\,tf'(Bo') + wG\,tf'(Go')}$$

if Y'firstclip = Y'greenclips, use $$Y' = \frac{Yo - wG*10000 - wBtf(Bo') - wBtf'(Bo')(a32\,Cb - Bo') - wR\,tf(Ro')}{wB\,tf'(Bo') + wR\,tf'(Ro')} - \frac{wR\,tf'(Ro')(a13Cr - Ro')}{wB\,tf'(Bo') + wR\,tf'(Ro')}$$

STOP
}

Step 4: Two channels saturate. We dont need a linearization since the transfer function now is invertible.

If Y'firstclip = Y'redclips and Y'secondclip = Y'greenclips $$Y' = tf^{-1}\left(\frac{Yo - 10000wR - 10000wG}{wB}\right) - a32\,Cb$$

If Y'firstclip = Y'redclips and Y'secondclip = Y'blueclips $$Y' = tf^{-1}\left(\frac{Yo - 10000wR - 10000wB}{wG}\right) + a22\,Cb + a23\,Cr$$

If Y'firstclip = Y'greenclips and Y'secondclip = Y'blueclips $$Y' = tf^{-1}\left(\frac{Yo - 10000wG - 10000wB}{wR}\right) - a13\,Cr$$

where tf$^{-1}$( ) is the inverse of the EOTF transfer function.
STOP

One idea behind the embodiments is to find out whether the individual color channels, i.e., red, green or blue, saturates to the maximum allowed value before linearizing. As an example, if it can be determined that the Y' that results in the best Y means that the red channel will saturate, it is important that the linearization of the transfer function for that channel will be a constant, instead of a sloping line. This will avoid large errors.

The core is thus to find out whether the solution to the equation $$Yo = wR*tf(Y'+a13*Cr) + wG*tf(Y'-a22*Cb-a23*Cr) + wB*tf(Y'+a32*Cb) \quad \text{Equation(2)}$$

will cause the values in the parenthesis to exceed 1 or not for the different color channels. Since all values Yo, Cr, Cb, wR, wG, wB, a13, a22, a23 and a32 are known, the solution to the equation will be a value for Y', let us call this number Y'*.

The idea is therefore, that even before we know the exact value of Y'*, we investigate whether it will cause any of the color channels to saturate, i.e., whether $$Y'^* + a13*Cr > 1 \quad \text{Equation (3)}$$

$$Y'^* - a22*Cb - a23*Cr > 1 \quad \text{Equation (4)}$$

$$Y'^* + a32*Cb > 1 \quad \text{Equation (5)}$$

If the answer to all these questions are "no", i.e., we know that Y'* will not exceed 1 in any of the above equations, we can safely use a first way to calculate Y'*. If the answer to any of the questions are "yes", we use a different way to calculate Y'*.

In the above-mentioned embodiment, we find the lowest value of Y' that will cause at least one of the Equations (3) through (5) to saturate, and we call that value Y'firstclip. We can then calculate what luminance Y that would be the result of using Y'=Y'firstclip by inserting it in Equation (2) obtaining $$Yfirstclip = wR*tf(Y'firstclip + a13*Cr) + wG*tf(Y'firstclip - a22*Cb - a23*Cr) + wB*tf(Y'firstclip + a32*Cb)$$

Now, if the desired Yo is smaller than Yfirstclip, we can be sure that the optimal value of Y'* will be smaller than Y'firstclip. Hence, without knowing the exact value for Y'*, we know that it will not exceed 1 in any of the Equations (3) through (5), and we can safely use a first approximation to calculate an approximate value for Y'*, for instance $$Y' = -\frac{wR\,tf'(Ro')(a13Cr - Ro') + wG\,tf'(Go')(-a22Cb - a23Cr - Go')}{wR\,tf'(Ro') + wG\,tf'(Go') + wB\,tf'(Bo')} - \frac{wB\,tf'(Bo')(a32Cb - Bo')}{wR\,tf'(Ro') + wG\,tf'(Go') + wB\,tf'(Bo')}$$

If Yo on the other hand is larger than Yfirstclip, we cannot use the above formula for calculating Y'*, but must use one that takes into account that one or more of the channels are clipped.

In another embodiment, we do not calculate Yfirstclip. Instead we have a predetermined look-up table LUT. The input to the look-up table is Yo, Cr and Cb. The constants wR, wG, wB, a13, a22 a23 and a32 do not vary from pixel to pixel and therefore do not need to be inputs to the lookup table. The output of the lookup table is three bits ba, bb, bc. If ba=0, this means that the optimal Y'* does not cause Equation (3) to saturate, i.e., it does not cause Equation (3) to exceed 1. If however ba=1, this means that the optimal Y'* does indeed cause Equation (3) to saturate, i.e., that Y'*+a13*Cr>1. Likewise, bb tells whether the optimal Y'* will cause Equation (4) to saturate, and bc tells whether the optimal Y'* will cause Equation (5) to saturate. In this embodiment, the first step is to get ba, bb and bc from the LUT:

$$(ba, bb, bc) = \text{LUT}(Yo, Cr, Cb)$$

Now if ba==bb==bc==0, we use a first approximation to calculate the approximate value of Y'*, for instance, we may use $$Y' = -\frac{wR\,tf'(Ro')(a13Cr - Ro') + wG\,tf'(Go')(-a22Cb - a23Cr - Go')}{wR\,tf'(Ro') + wG\,tf'(Go') + wB\,tf'(Bo')} - \frac{wB\,tf'(Bo')(a32Cb - Bo')}{wR\,tf'(Ro') + wG\,tf'(Go') + wB\,tf'(Bo')}$$

However, if one or more of ba, bb, bc equals 1, we use another approximation to calculate the value of Y'*.

As an example, if ba=0, bb=0, bc=1, we may use $$Y' = -\frac{Yo - wB*10000 - wRtf(Ro') - wR\,tf'(Ro')(a13Cr - Ro') - wG\,tf'(Go')}{wR\,tf'(Ro') + wG\,tf'(Go')}$$

-continued $$\frac{wG tf'(Go')(-a22Cb - a32Cr - Go')}{wR tf'(Ro') + wG tf'(Go')}$$

to calculate Y'. As another example, if ba=1, bb=0, bc=1 we may use $$Y' = tf^{-1}\left(\frac{Yo - 10000wR - 10000wB}{wG}\right) + a22\,Cb + a23\,Cr$$

to calculate the approximate value of Y'.

It should be noted that in each of the above cases we have used linearization to get a formula to calculate Y'. Note however that this formula is approximative, and we can use other approximations to get Y'. As an example, we can train a neural network for each of the cases. Thus, in one embodiment, we first obtain ba, bb, bc using the LUT:

(ba,bb,bc)=LUT(Yo,Cb,Cr)

Then we use one of the following seven neural networks to calculate Y'*:

```
if( ba==0 AND bb == 0 AND bc==0)
    Y' = neural_network_000(Yo, Cb, Cr)
else if(ba == 0 AND bb == 0 AND bc == 1)
    Y' = neural_network_001(Yo, Cb, Cr)
else if(ba == 0 AND bb == 1 AND bc == 0)
    Y' = neural_network_010(Yo, Cb, Cr)
else if(ba == 1 AND bb == 0 AND bc == 0)
'   Y' = neural_network_100(Yo, Cb, Cr)
else if(ba == 0 AND bb == 1 AND bc == 1)'
    Y' = neural_network_011(Yo, Cb, Cr)
else if(ba == 1 AND bb == 0 AND bc == 1)
    Y' = neural_network_101(Yo, Cb, Cr)
else if(ba == 1 AND bb == 1 AND bc == 0)
    Y' = neural_network_110(Yo, Cb, Cr)
else
    Y = 1
```

These seven neural networks have previously been trained using data that only comes from the relevant cases, for instance, neural_network_011 has only been trained on data where both the green and the blue channels saturate.

Thus the core idea of the method is to:

Find out whether the luma value Y'* that would provide the luminance value closest to Yo would cause any of the color components to saturate. If the answer is no, we use a first way to calculate the luma value. If the answer is yes, we use a different way to calculate the luma value.

Note also that in the above method the LUT may not give the correct answer. In order to use the look-up table, one really need to first quantize the input variables Yo→Yoq, Cb→Cbq, Cr→Crq hence the output we get (ba,bb,bc)=LUT(Yoq,Cbq,Crq)

is really the answer to whether the solution Y'* that satsifies

Yo=wR*tf(Y'q+a13*Crq)+wG*tf(Y'q-a22*Cbq-a23*Crq)+wB*tf(Y'q+a32*Cbq)

will cause any color channel to saturate, not whether the Y'* that satisfies

Yo=wR*tf(Y'+a13*Cr)+wG*tf(Y'-a22*Cb-a23*Cr)+wB*tf(Y'+a32*Cb)

will cause any color channel to saturate. However, hopefully the difference is small enough for this to be OK.

Instead of getting ba, bb and bc using a LUT, it is of course possible to calculate them using

```
if(Yo > Yredclip)
    ba = 1
else
    ba = 0
``` where

Yredclip=wR*tf(Yredclip+a13*Cr)+wG*tf(Yredclip-a22*Cb-a23*Cr)+wB*tf(Yredclip+a32*Cb)

which can be simplified to

Yredclip=wR*10000+wG*tf(Yredclip-a22*Cb-a23*Cr)+wB*tf(Yredclip+a32*Cb)

and where Y'redclip=Y'redclip=1-a13*Cr.

bb and bc can be calculated analogously. In this case they will be exact.

In another embodiment we also investigate clipping against zero. In that case we use

```
if(Yo > Yredclip)
    ba = 1
else if (Yo < YredclipZero)
    ba = -1
else
    ba = 0
``` where Yredclip is calculated as above but YredclipZero equals

Yredclip=wR*tf(YredclipZero+a13*Cr)+wG*tf(YredclipZero-a22*Cb-a23*Cr)+wB*tf(YredclipZero+a32*Cb)

and

YredclipZero=-a13*Cr.

bb and be are computed likewise. Thus we can use

```
if( ba==0 AND bb == 0 AND bc==0)
    Y' = neural_network_000(Yo, Cb, Cr)
else if(ba == 0 AND bb == 0 AND bc == 1)
    Y' = neural_network_001(Yo, Cb, Cr)
else if(ba == 0 AND bb == 1 AND bc == 0)
'   Y' = neural_network_010(Yo, Cb, Cr)
else if(ba == 1 AND bb == 0 AND bc == 0)
    Y' = neural_network_100(Yo, Cb, Cr)
else if(ba == 0 AND bb == 1 AND bc == 1)
'   Y' = neural_network_011(Yo, Cb, Cr)
else if(ba == 1 AND bb == 0 AND bc == 1)
    Y' = neural_network_101(Yo, Cb, Cr)
else if(ba == 1 AND bb == 1 AND bc == 0)
    Y' = neural_network_110(Yo, Cb, Cr)
else if(ba == 1 AND bb == 1 AND bc == 1)
    Y' = 1
else if(ba == 0 AND bb == 0 AND bc == -1)
    Y' = neural_network_00m(Yo, Cb, Cr)
else if(ba == 0 AND bb == -1 AND bc == 0)
    Y' = neural_network_0m0(Yo, Cb, Cr)
else if(ba == -1 AND bb == 0 AND bc == 0)
    Y' = neural_network_m00(Yo, Cb, Cr)
else if(ba == 0 AND bb == -1 AND bc == -1)
    Y' = neural_network_0mm(Yo, Cb, Cr)
else if(ba == -1 AND bb == 0 AND bc == -1)
    Y' = neural_network_m0m(Yo, Cb, Cr)
else if(ba == -1 AND bb == -1 AND bc == 0)
    Y' = neural_network_mm0(Yo, Cb, Cr)
else if(ba == -1 AND bb == -1 AND bc == -1)
    Y' = 0
```

In an alternative embodiment we do not try to minimize the error in luminance, but instead we want to minimize the square error in the linear RGB components. So instead of minimizing $(Y-Y_o)^2$ where $Y_o = wR*tf(Y'+a13*Cr)+wG*tf(Y'-a22*Cb-a23*Cr)+wB*tf(Y'+a32*Cb)$, we minimize $$wR*(R-R_o)^2+wG*(G-G_o)^2+wB*(B-B_o)_2 \quad \text{Equation (6)}$$

where
R=tf(Y'+a13*Cr)
G=tf(Y'-a22*Cb-a23*Cr)
B=tf(Y'+a32*Cb)

This was proposed in [3], and by linearizing tf( ) in Ro', Go' and Bo' one can get to the approximate solution $$Y' = -[wRtf(Ro')^2(a13*Cr+Ro')+wGtf'(Go')^2(-a22*Cb-a23*Cr-Go')+wBtf'(Bo')^2(a32*Cb-Bo')]/[wRtf'(Ro')^2+wGtf'(Go')^2+wBtf'(Bo')^2]$$

In the same way as above, we will run into problems when one of the components clip. Therefore we do the same where we find out if the optimal Y' will clip any components. As an example, we can use the LUT technique:

$$(ba,bb,bc)=LUT(Y_o,Cb,Cr)$$

where the LUT has been calculated by minimizing Equation (6).

If ba==bb==bc==0 then we can use the approximation $$Y' = -[wRtf'(Ro')^2(a13*Cr+Ro')+wGtf'(Go')^2(-a22*Cb-a23*Cr-Go')+wBtf'(Bo')^2(a32*Cb-Bo')]/[wRtf'(Ro')^2+wGtf'(Go')^2+wBtf'(Bo')^2]$$

If, for instance, the blue component clips, minimizing $$wR*(R-R_o)^2+wG*(G-G_o)^2+wB*(B-B_o)^2$$

is equivalent of minimizing $$wR*(R-R_o)^2+wG*(G-G_o)^2+wB*(10000-B_o)^2$$

since tf(1)=10000. We now note that Y' will not affect the last term, so we can instead minimize $$D=wR*(R-R_o)^2+wG*(G-G_o)^2$$

which is equal to $$D=wR*(tf(R')-tf(Ro'))^2+wG*(tf(G')-tf(Go'))^2$$

linearizing tf( ) in Ro' and Go' gives $$D \approx d = wR*(tf(Ro')+tf'(Ro')(R'-Ro')-tf(Ro'))^2+wG*(tf(Go')+tf'(Go')(G'-Go')-tf(Go'))^2$$

which equals $$d = wR*(tf'(Ro')(R'-Ro'))^2+wG*(tf'(Go')(G'-Go'))^2$$

inserting $$R=tf(Y'+a13*Cr)$$

$$G=tf(Y'-a22*Cb-a23*Cr)$$

gives $$d = w_R*(tf'(Ro')(Y'+a13*Cr-Ro'))^2+wG*(tf'(Go')(Y'-a22*Cb-a23*Cr-Go'))^2$$

Differentiating with respect to Y' and setting to zero gives $$wR*tf'(Ro')^2*2*(Y'+a13*Cr-Ro')+wG*tf'(Go')^2*2*(Y'-a22*Cb-a23*Cr-Go')=0$$

collecting terms for Y' and solving for Y' gives $$Y' = -[wR*tf'(Ro')^2(a13*Cr-Ro')+wG*tf'(Go')^2(-a22*Cb-a23*Cr-Go')]/[wR*tf'(Ro')^2+wG*tf'(Go')^2].$$

And this is therefore used when ba=0, bb=0 and bc=1.
In the case when we minimize $(Y-Y_o)^2$ where $$Y=wR*tf(Y'+a13*Cr)+wG*tf(Y'-a22*Cb-a23*Cr)+wB*tf(Y'+a32*Cb)$$

We can see that since tf( ) is a monotonically increasing function, Y will increase monotonically with Y'. This means that we if a particular value Y'1 gives a value Y1 that is too big, we know that the ideal Y' value, i.e., the one that will result in Y=Yo, will be smaller than Y'1. The reason is that any other Y'>Y'1 will generate a Y>Y1 but Y1 is already too big, so that cannot be good. Likewise, if another value Y'2 will generate a value Y2 that is too small, then we know that the ideal Y' value must be bigger than Y'2. Any value smaller than Y'2 would create a Y even worse than Y2. This means that the error function $(Y(Y')-Y_o)^2$ will have only one local minimum, and that this value will also be the global minimum, located at the ideal Y'-value, which we can call Y'*, and that the error will be increasing monotonically when moving away from Y'*.

However, when instead minimizing $wR*(R-R_o)^2+wG*(G-G_o)^2+wB*(B-B_o)^2$ which equals $$wR*(tf(Y'+a13*Cr)-R_o)^2+wG*tf(Y'-a22*Cb-a23*Cr-Go)^2+wB*tf(Y'+a32*Cr-Bo)^2$$

we cannot be sure that we have just one local minimum. As an example, assume we have the following two linear RGB-values:

$$RGB1=(113,3900,33);$$

$$RGB2=(3.11,0.17,3950);$$

Applying the inverse EOTF gives $$RGBp1=(0.5204,0.8998,0.4015)$$

$$RGBp2=(0.2157,0.0776,0.9012)$$

Converting to YCbCr gives $$YCbCr1=(0.7706,-0.1962,-0.1697)$$

$$YCbCr2=(0.1627,0.3925,0.0359)$$

and averaging these two values gives $$YCbCr=(0.46670.0982\ -0.0669)$$

Now, if we want to select a Y' for the first pixel (RGB1) we set Ro'=0.5204, Go'=0.8998 and Bo'=0.4015. We have Cb=0.0982 and Cr=−0.0669.
Now we can plot the RGB-error:

$$errRGB = wR*(tf(Y'+a13*Cr)-R_o)^2+wG*(tf(Y'-a22*Cb-a23*Cr)-G_o)^2+wB*(tf(Y'+a32*Cr)-B_o)^2$$

Figure 12:
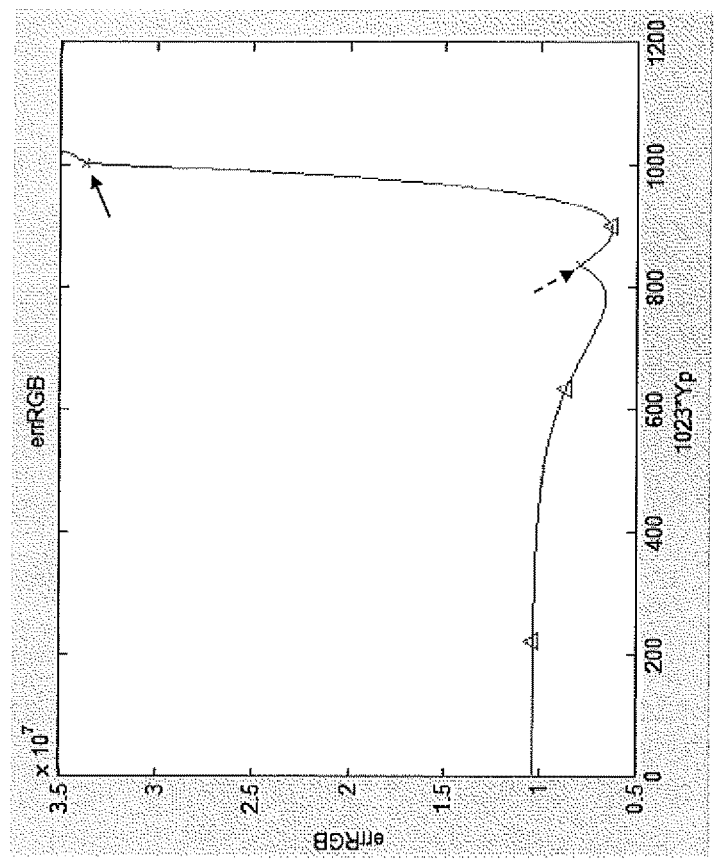
FIG. 12 is a diagram plotting errRGB as a function of Y'(Yp)

This is plotted in FIG. 12, in which the errRGB plotted as a function of Yp. Yp is multiplied by 1023 in this figure. Note how the curve has two local minima, one around 900 and another around 780. There is thus no simple way to know which approximation to use. The blue component clips for 1023*Yp=835, cross marked with hatched arrow. For values of 1023*Yp lower than 835 the linearization Y'rgb with all three components must be used. For values between 835 and 1005, where the green component clips, cross marked with full across, the linearization Y'rg that excludes the blue component should instead be used. Note that since there are multiple local minima there is no way to tell which linearization to use.

When we used the error function $(Y-Y_o)^2$, it was sufficient to check whether the first clipping point Y'firstclip would generate a Y-value larger than Yo. In that case it was unnecessary to continue with other linearizations. In this case however we cannot say anything from the value of errRGB in the clipping point. As an example, the first clipping point happens at 835, and this is higher than the local minimum to the left (at 783), but the true global minimum is at 895, to the right of the first clipping point.

The way to solve this is to calculate linearizations in all three areas. For values of Y' from zero up to the first clipping point Y'firstclip=835/1023 we use the linearization Y'rgb:

$$Y'rgb = -[wRtf(Ro')^2(a13*Cr+Ro')+wGtf(Go')^2 \\ (-a22*Cb-a23*Cr-Go')+wBtf(Bo')^2(a32*Cb- \\ Bo')]/[wRtf(Ro')^2+wGtf(Go')^2+wBtf(Bo')^2]$$

Since in this case the blue is the first to clip, we use the linearization Y'rg for the values from 835/1023 to where the green clips at 1005/1023:

$$Y'rg = -[wR*tf(Ro')^2(a13*Cr-Ro')+wG*tf(Go')^2* \\ (-a22*Cb-a23*Cr-Go')]/[wR*tf(Ro')^2+wG*tf \\ (Go')^2].$$

The last values from 1005/1023 to 1023 we can invert the function and we don't need to do a linearization, but we can use $$Y'r = tf^{-1}\left(\frac{Yo - 10000wG - 10000wB}{wR}\right) - a13\,Cr$$

So the method can be summarized as follows:
Step 1: calculate Y'redclip, Y'greenclip, Y'blueclip:

$$Y'redclip = 1 - a13*Cr,$$

$$Y'greenclip = 1 + a22*Cb + a23*Cr,$$

$$Y'blueclip = 1 - a32*Cb.$$

Step 2: calculate the approximation for no clipping and its associated error value:

$$Y'rgb = -[wRtf(Ro')^2(a13*Cr+Ro')+wGtf(Go')^2 \\ (-a22*Cb-a23*Cr-Go')+wBtf(Bo')^2(a32*Cb- \\ Bo')]/[wRtf(Ro')^2+wGtf(Go')^2+wBtf(Bo')^2]$$

$$errRGB(Y'rgb) = wR*(tf(Y'rgb+a13*Cr)-Ro)^2+wG*(tf \\ (Y'rgb-a22*Cb-a23*Cr)-Go)^2+wB*(tf(Y'rgb+ \\ a32*Cr)-Bo)^2$$

Step 3: calculate the approximation when one channel clips:

```
if(Y'blueclip < Y'redclip && Y'blueclip < Y'greenclip)
    Y'rg = - [wR*tf(Ro')²(a13 * Cr -Ro') + wG*tf(Go')²*(-a22 *
Cb - a23*Cr -Go')] / [wR*tf(Ro')² +
wG*tf(Go')²].
    Y'one = Y'rg
    errRGBone = wR*(tf(Y'one + a13*Cr)-Ro)²
        + wG*(tf(Y'one -a22*Cb-a23*Cr)-Go)²
        + wB*(10000-Bo)²
else if(Y'redclip < Y'greenclip && Y'redclip < Y'blueclip)
    Y'gb = - [wG*tf(Go')²*(-a22 * Cb - a23*Cr -Go') +
wB*tf(Ro')²(a32 * Cb -Bo')] / [wG*tf(Go')² +
wB*tf(Bo')²].
    Y'one = Y'gb
    errRGBone = wR*(10000-Ro)²
        + wG*(tf(Y'rgb -a22*Cb-a23*Cr)-Go)²
        + wB*( Y'rgb+a32*Cr-Bo)²
else // we have that Y'greenclip is the smallest
    Y'rb = - [wR*tf(Ro')²(a13 * Cr -Ro') + wB*tf(Ro')²(a32 *
Cb -Bo')] / [wR*tf(Ro')² + wB*tf(Bo')²].
    Y'one = Y'rb
    errRGBone = wR*(tf(Y'one + a13*Cr)-Ro)²
        + wG*(10000-Go)²
        + wB*( Y'rgb+a32*Cr-Bo)²
end
```

Step 4: Calculate the approximation, (or rather exact formula, for the case when two channels clip:

```
if(Y'redclip > Y'blueclip && Y'redclip > Y'greenclip) // both b and
g clips
    Y'r = tf⁻¹ ((Yo - 10000*wG - 10000*wB)/wR) - a13*Cr
    Y'two = Y'r
    errRGBtwo = wR*(tf(Y'two + a13*Cr)-Ro)²
        + wG*(10000-Go)²
        + wB*(10000-Bo)²
else if(Y'greenclip > Y'blueclip && Y'greenclip > Y'redclip) // both r and
b clips
    Y'g = tf⁻¹ ((Yo - 10000*wR - 10000*wB)/wG) + a22*Cb + a23*Cr
    Y'two = Y'g
    errRGBtwo = wR*(10000-Ro)²
        + wG*(tf(Y'one -a22*Cb-a23*Cr)-Go)²
        + wB*(10000-Bo)²
else if(Y'blueclip > Y'greenclip && Y'blueclip > Y'redclip) // both r and
g clips
    Y'b = tf⁻¹ ((Yo - 10000*wR - 10000*wG)/wB) - a32*Cb
    Y'two = Y'b
    errRGBtwo = wR*(10000-Ro)²
        + wG*(10000-Go)²
        + wB*( Y'two+a32*Cr-Bo)²
end
```

Step 5: Select the best approximation:

```
errBest = errRGB
Y'best = Y'rgb
if(errRGBone < errBest)
    errBest = errRGBone
    Y'best = Y'one
end
if(errRGBtwo < errBest)
    errBest = errRGBtwo
    Y'best = Y'two
end
```

We have now found the best approximation Y'best. It will have the error errBest.

When minimizing (Y-Yo)², even though clipping against 1 will create the worst errors, it has been found that clipping against 0 will also create errors, although less severe. It is therefore an aspect of one embodiment of this invention to investigate whether the best Y' clips against either 0 or 1 in any of the color channels.

It is possible to write a general formula that automatically adapts to the case when zero or one component clips either against 0 or against 1.

To do so we introduce e.g., two helper variables n and l. We define them as:

n[0]=0 if the best possible Y'* will clip the red component either against 0 or 1, n[0]=1 otherwise.

Similarly n[1] tells if the green component clips and n[2] tells if the blue component clips.

l[0]=1 if the best possible Y'* will clip the red component against 1, l[0]=0 otherwise.

The decoder will get three values Y', Cb and Cr, and from them calculate R', G' B' using $$R' = \text{clip}(Y' + a13*Cr)$$

$$G' = \text{clip}(Y' - a22*Cb - a23*Cr)$$

$$B' = \text{clip}(Y' + a32*Cb)$$

where clip(x) clips a value to the interval [0, 1]. By using $$Rt = a13*Cr$$

$$Gt = -a22*Cb - a23*Cr$$

$$Bt = a32*Cb$$

this can be simplified to $$R' = \text{clip}(Y' + Rt)$$

$$G' = \text{clip}(Y' + Gt)$$

$$B' = \text{clip}(Y' + Bt).$$

To get the linear values, the decoder will then apply the transfer function R=tf(R') etc. However, note that R=tf(clip(Y'+Rt)) can be written as R=l[0]+n[0]*tf(R'), and ditto for green and blue.

Now if we want do minimize the error in luminance Y, we need to calculate the luminance in the decoder Y=wR*tf(R')+wG*tf(G')+wB*tf(B').

Using the replacement above, we can thus write $$Y = wR*l[0] + wR*n[0]*tf(Y'+Rt) + wG*l[1] + wG*n[1]*tf(Y'+Gt) + wB*l[2] + wB*n[2]*tf(Y'+Bt)$$

which can be written $$Y' wR*l[0] - wG*l[1] - wB*l[2] = wR*n[0]*tf(Y'+Rt) + wG*n[1]*tf(Y'+Gt) + wB*n[2]*tf(Y'+Bt).$$

We can now linearize tf( ) around Ro', Go' and Bo'. For the red channel, we use $$tf(x) \approx tf(Ro') + (x-Ro')*tf'(Ro')$$

where Ro'=tf(Ro), and Ro is the linear red component in the original pixel. We do ditto for the green and blue channels and get $$Y' wR*l[0] - wG*l[1] - wB*l[2] == wR*n[0]*[tf(Ro') + (Y' + Rt - Ro')*tf'(Ro')] + wG*n[1]*[tf(Go') + (Y' + Gt - Go')*tf'(Go')] + wB*n[2]*[tf(Bo') + (Y' + Bt - Bo')*tf'(Bo')].$$

This is equal to $$Y' wR*l[0] - wG*l[1] - wB*l[2] - wR*n[0]*[tf(Ro') + (Rt-Ro')*tf'(Ro')] - wG*n[1]*[tf(Go') + (Gt-Go')*tf'(Go')] - wB*n[2]*[tf(Bo') + (Bt-Bo')*tf'(Bo')] = wR*n[0]*Y'*tf'(Ro') + wG*n[1]*Y'tf'(Go') + wB*n[2]*Y'tf'(Bo').$$

The right hand side of the equation can be simplified to $(w_R*n[0]*tf(Ro') + wG*n[1]*tf(Go') + w_B*n[2]*tf(Bo'))*Y'$, and hence we can find Y' as $$Y' = (Y' wR*l[0] - wG*l[1] - wB*l[2] - wR*n[0]*[tf(Ro') + (Rt-Ro')*tf'(Ro')] - wG*n[1]*[tf(Go') + (Gt-Go')*tf'(Go')] - wB*n[2]*[tf(Bo') + (Bt-Bo')*tf'(Bo')])/(wR*n[0]*tf'(Ro') + wG*n[1]*tf'(Go') + wB*n[2]*tf'(Bo')).$$

Note that this linearization works regardless if the optimum Y' would make either R', G' or B' clip against either 0 or 1. So it can be used both if we don't have any clipping at all, or if one component clips against either 0 or 1 for the optimum Y'.

However, if the best Y' would cause two color components to clip, which is indicated by n[0]+n[1]+n[2]=1, then, as we have seen above, we don't need to use an approximation through linearization. Instead we can invert the formula directly. We will now present the general formula for this too. Starting from $$Y' wR*l[0] - wG*l[1] - wB*l[2] = wR*n[0]*tf(Y'+Rt) + wG*n[1]*tf(Y'+Gt) + wB*n[2]*tf(Y'+Bt),$$

we realize that since two components will clip, the n[ ]-factors will zero out two of the factors to the right. If we know that the best Y' clips two components, the following equation will generate exactly the same result:

$$Y' wR*l[0] - wG*l[1] - wB*l[2] == (wR*n[0] + wG*n[1] + wB*n[2])*tf(Y'+n[0]*Rt + n[1]*Gt + n[2]*Bt).$$

Dividing by (wR*n[0]+wG*n[1]+wB*n[2]) and taking $tf^{-1}(\ )$ of both sides gives $$tf^{-1}(Y' wR*l[0] - wG*l[1] - wB*l[2])/(wR*n[0] + wG*n[1] + wB*n[2]) = Y' + n[0]*Rt + n[1]*Gt + n[2]*Bt$$

which equals $$Y' = tf^{-1}(Y' wR*l[0] - wG*l[1] - wB*l[2])/(wR*n[0] + wG*n[1] + wB*n[2]) - n[0]*Rt - n[1]*Gt - n[2]*Bt.$$

So if we know that the best Y' will cause exactly two components to clip, we can use the above formula to calculate Y' exactly.

Now we need a simple way to calculate n[0], n[1], n[2] and l[0], l[1], l[2]. It can be done using the following code:

```
// Figure out which values of Y' are on the limit of clipping.
// Step 1: Calculate Rterm, Gterm and Bterm from Cr and Cb and set up some variables. The desired
// luminance is stored in yLinear.
int clipListIndex = 0;
double YpThatClip[5] = {0.0, 0.0, 1.0, 1.0, 1.0};
// The first and the last are 0.0 and 1.0 respectively.
// Only the 3 middle ones are calculated.
double YLinAtClipBoundary[5] = {-0.1, 0.0, 1.0, 1.0, 1.0};
// The first and the last are -0.1 and 1.0 respectively, to stop the search in the correct position if we
// have Ytarget = 0.0 or 1.0.
double Rterm = a13*Cr;
double Gterm = -a22*Cb - a23*Cr;
double Bterm = a22*Cb;
// Unless Rterm = 0 we cannot have a situation where Y' in range [0, 1] clips against 0 and another Y'
// in range [0, 1] clips against 1. For instance, if Rterm > 0 then R' = Y' + Rterm will clip against 0
only
// for Y' < 0, which never happens. We can thus discard that one.
if( Rterm < 0 )
    YpThatClip[1 + clipListIndex++] = -Rterm;
else
    YpThatClip[1 + clipListIndex++] = 1-Rterm;
if( Gterm < 0 )
    YpThatClip[1 + clipListIndex++] = -Gterm;
else
    YpThatClip[1 + clipListIndex++] = 1-Gterm;
if( Bterm < 0 )
    YpThatClip[1 + clipListIndex++] = -Bterm;
```

```
else
    YpThatClip[1 + clipListIndex++] = 1-Bterm;
// Step 2: Sort the three middle values so that YpThatClip are in increasing order. Use bubble sort.
bubble3(&YpThatClip[1]);
// Step 3: Evaluate Ylinear for every Y' in the list.
for(int q = 0; q<3; q++)
    YLinAtClipBoundary[1+q] = convertToYLinear(YpThatClip[1+q], Rterm, Gterm, Bterm);
// Step 4: Find out which interval of Y' we belong to, i.e., which branch we are in.
int qq = 1;
while(YLinAtClipBoundary[qq] < yLinear)
    qq++;
// Step 5: Find a representative for that branch to find out which variables we clip.
double YpMid = (YpThatClip[qq-1] + YpThatClip[qq])/2.0;
// Step 6: Set Clipping variables for this branch.
int l[3] = {0, 0, 0};
int n[3] = {0, 0, 0};
if( (YpMid + Rterm > 0)&&(YpMid + Rterm < 1) )
    n[0] = 1;
else if( YpMid + Rterm > 1)
    l[0] = 1;
if( (YpMid + Gterm > 0)&&(YpMid + Gterm < 1) )
    n[1] = 1;
else if( YpMid + Gterm > 1)
    l[1] = 1;
if( (YpMid + Bterm > 0)&&(YpMid + Bterm < 1) )
    n[2] = 1;
else if( YpMid + Bterm > 1)
    l[2] = 1;
```

For the special case when Rterm=0 or Gterm=0 or Bterm=0 a slightly modified version of the code above may be used.

Finally, we need to choose the best formula for calculating Y'. If all the variables clip, it doesn't matter which Y' we choose as long as we choose one for which all variables clip in the same way. We can therefore use YpMid. If exactly two variables clip, we use the inverse formula, and if more than one variable is not clipping, we need to use the linearization formula if we want a solution in a single step. This is done using the following code.

```
// Step 7: Now we can see how many free variables we have.
double Yp_Branch;
if(n[0]+n[1]+n[2] == 0)
{
    // 7.1: All three variables clip, we can use any value in the interval,
    they will all give the same value.
    // Hence we can can just as well use the value YpMid.
    Yp_Branch = YpMid;
}
else if(n[0]+n[1]+n[2] == 1)
{
    // 7.2: All but one variable clips. We will therefore get an equation
    that is invertible. We don't have to
    // approximate at all.
    Yp_Branch = dClip(tfInverse((yLinear - wR*l[0] - wG*l[1] - wB*l[2])
        /(wR*n[0]+wG*n[1]+wB*n[2])) - n[0]*Rterm - n[1]*Gterm -
        n[2]*Bterm, 0.0, 1.0);
}
else
{
    // 7.3: So here we have more than one variable not clipping. This
    means that we cannot use the
    // inverse. We therefore have to linearize. We use the general
    formula.
    // Ro, Go and Bo are the linear components of the original pixel. Rpo
    is the original red component
    // primed, i.e., Rpo = tf(Ro) and ditto for Gpo and Bpo. Dtf( ) is the
    first derivative of the transfer
    // function tf( ).
    double Dtf_Rpo = (double) Dtf(Rpo);
    double Dtf_Gpo = (double) Dtf(Gpo);
    double Dtf_Bpo = (double) Dtf(Bpo);
```
```
    Yp_Branch = dClip( ( yLinear
        - wR*l[0] - wG*l[1] - wB*l[2]
        - wR*n[0]*(Ro + (Rterm - Rpo)*Dtf_Rpo)
        - wG*n[1]*(Go + (Gterm - Gpo)*Dtf_Gpo)
        - wB*n[2]*(Bo + (Bterm - Bpo)*Dtf_Bpo)
        ) / (wR*n[0]*Dtf_Rpo + wG*n[1]*Dtf_Gpo +
        wB*n[2]*Dtf_Bpo), 0.0, 1.0);
}
```

Note that the above code is quite a lot more work compared to the previous art, which is just doing the linearization (7.3 above). Especially the following code snippet is expensive:

```
// Step 3: Evaluate Ylinear for every Y' in the list.
for(int q = 0; q<3; q++)
    YLinAtClipBoundary[1+q] = convertToYLinear(YpThatClip[1+q],
        Rterm, Gterm, Bterm);
``` since it calculates the luminance three times. For each such calculation, it will need to execute the transfer function tf( ) three times. In all this means nine executions of the transfer function tf( ). Thus it may be tempting to just skip steps 1-6, just execute 7.3. But as we have seen we then open up to large problems if some components actually clip.

One solution is to only test against clippings above 1 and skip clippings against 0. This means that only the values that generate clipping against 1 need to be tested. That can at most be two values (all three values cannot clip to 1) and on average it may be something like 1.5 value. That saves computation.

Another embodiment goes even further: In this embodiment we calculate the step 7.3 directly without any testing, and only if the result will cause clipping in any of the components do we execute the other steps to do things properly. Hence we do:

```
// Step 0: First try the linearized version. Assume n and l are set so nothing clips.
int l[3] = {0, 0, 0};
int n[3] = {0, 0, 0};
double Dtf_Rpo = (double) Dtf(Rpo);
double Dtf_Gpo = (double) Dtf(Gpo);
double Dtf_Bpo = (double) Dtf(Bpo);
Yp_Candidate = dClip( ( yLinear
            - wR*l[0] - wG*l[1] - wB*l[2]
            - wR*n[0]*(Ro + (Rterm - Rpo)*Dtf_Rpo)
            - wG*n[1]*(Go + (Gterm - Gpo)*Dtf_Gpo)
            - wB*n[2]*(Bo + (Bterm - Bpo)*Dtf_Bpo)
          ) / (wR*n[0]*Dtf_Rpo + wG*n[1]*Dtf_Gpo +
            wB*n[2]*Dtf_Bpo), 0.0, 1.0);
if(Yp_Candidate + Rterm >= 0 && Yp_Candidate + Rterm <= 1 &&
        Yp_Candidate + Gterm >= 0 && Yp_Candidate + Gterm <= 1
        &&
        Yp_Candidate + Bterm >= 0 && Yp_Candidate + Bterm <= 1)
        // "Candidate test"
    return(Yp_Candidate);
else
{
        ... do steps 1 to 7 above.
    return(Yp_Branch);
}
```

Thus if the test "Candidate test" passes, we just use that one and we are as quick as just doing the linearization. However, when this test fails, it is indicating that we perhaps should not have used the Yp_Candidate value, since some values are probably clipping for the best Y'. Then we execute the steps 1 through 7 as before. Hopefully this will happen only for a small minority of the pixels, and we will have a fast computation on average.

Note that the worst case behavior however is not affected. It is possible that every pixel will clip. In this case the execution time will actually be longer, since we need to calculate both Yp_Candidate and Yp_Branch, whereas before we only needed to calculate Yp_Branch. Thus, for hardware applications where it is necessary to make sure that the worst case can be handled, it may be better to just calculate Steps 1 to 7 without calculating Yp_Candidate.

As has been noted above, a color component can clip both against 0 and 1. However, as we have seen above, it is the clipping against 1 that gives the most severe artifacts. Therefore we may want to use Yp_Candidate even if one or more of the components clip against 0. This can be done by replacing the candidate test with the following:

```
if(Yp_Candidate + Rterm <= 1 &&
    Yp_Candidate + Gterm <= 1 &&
    Yp_Candidate + Bterm <= 1) // "Alternative candidate test"
```

This will result in faster computation, with the potential loss in quality for pixels clipping against 0.

Note that neither the "Candidate test" or the "Alternative candidate test" are guarantees for a proper processing. It may be the case that the optimal Y' would clip one or more components against 1, but that the formula used to determine Yp_Candidate will result in a value that does not cause clipping against 1. That is a risk, but it may be a good trade off to see some loss in quality for this special case compared to running the computation of steps 1 through 7 for every pixel.

Note that a lot of the expensive calculations above (Step 3) is only used to calculate n[0],n[1],n[2] and l[0], l[1], l[2].

If we instead approximate this calculation with how Yp_Candidate clips we may further reduce the complexity. Thus instead of

```
else
{
        ... do steps 1 to 7 above.
    return(Yp_Branch);
}
We instead do
else
{
    YMid = YpCandidate
        ... do steps 6 to 7 above.
    return(Yp_Branch);
}
```

This avoids the expensive Step 3, yielding a faster computation even in the cases where we have clipping. Note however, that n[0], n[1], n[2] and l[0], l[1] and l[2] will only be approximations of their correct values, so again we cannot be sure that we will get the best approximation. Still, this may be an appropriate trade off sometimes.

In yet another embodiment, steps 1-6 are used to calculate the clipping parameters n[0], n[1], n[2], l[0], l[1] and l[2]. However, instead of using a linearization approximation in step 7, the clipping parameters are used to select one of several look-up tables. The look-up tables contain precomputed values which can be made without any approximations. If no variable is clipping, i.e., if n[0]+n[1]+n[2]=3, then a full-size 3D look-up table can be used. If one variable is clipping, i.e., if n[0]+n[1]+n[2]=2, then only a 2D look-up table is may be needed, which greatly reduces the size constraints. If two variables are clipping, then only a 1D look-up table is needed, which again greatly reduces the size requirements and also the cache misses.

Ideally, different LUTs will be used for the different clipping cases. As an example, if red clips against 0 and green and blue do not clip, one LUT can be used. If red instead clips against 1 and green and blue do not clip, another LUT can instead be used.

Since every channel can either clip against 0, clip against 1, or be "free", i.e., not clip, there should in principle be 27 different combinations possible, and hence 27 different LUTs. However, 8 of these will cover cases where all three components clip, such as 000, i.e., all components clip to zero, or 101, i.e., red and blue clips to 1, green clips to 0. In these cases it is possible to use the approximation Yp_Branch=Ymid from step 7.1. Hence only 19 different LUTs are really needed.

The following code can be used:

```
if(n[0]==1 && n[1]==1 && n[2]==1)
{
    Yp_Branch = LUT_fff(Yo, Cb, Cr);
}
else if(n[0]==1 && n[1]==1 && n[2]==0)
{
    if(l[2]==0)
        Yp_Branch = LUT_ff0(Yo, Cb, Cr);
    else
        Yp_Branch = LUT_ff1(Yo, Cb, Cr);
}
else if (n[0]==1 && n[1]==0 && n[2]==1)
{
    if(l[1]==0)
        Yp_Branch = LUT_f0f(Yo, Cb, Cr);
    else
        Yp_Branch = LUT_f1f(Yo, Cb, Cr);
```

```
}
else if (n[0]==0 && n[1]==1 && n[2]==1)
{
    if(l[0]==0)
        Yp_Branch = LUT_0ff(Yo, Cb, Cr);
    else
        Yp_Branch = LUT_1ff(Yo, Cb, Cr);
}
else if (n[0]==1 && n[1]==0 && n[2]==0)
{
    if(l[1]==0 && l[2]==0)
        Yp_Branch = LUT_f00(Yo, Cb, Cr);
    else if(l[1]==0 && l[2]==1)
        Yp_Branch = LUT_f01(Yo, Cb, Cr);
    else if(l[1]==1 && l[2]==0)
        Yp_Branch = LUT_f10(Yo, Cb, Cr);
    else if(l[1]==1 && l[2]==1)
        Yp_Branch = LUT_f11(Yo, Cb, Cr);
}
else if (n[0]==0 && n[1]==1 && n[2]==0)
{
    if(l[0]==0 && l[2]==0)
        Yp_Branch = LUT_0f0(Yo, Cb, Cr);
    else if(l[0]==0 && l[2]==1)
        Yp_Branch = LUT_0f1(Yo, Cb, Cr);
    else if(l[0]==1 && l[2]==0)
        Yp_Branch = LUT_1f0(Yo, Cb, Cr);
    else if(l[0]==1 && l[2]==1)
        Yp_Branch = LUT_1f1(Yo, Cb, Cr);
}
else if (n[0]==0 && n[1]==0 && n[2]==1)
{
    if(l[0]==0 && l[1]==0)
        Yp_Branch = LUT_00f(Yo, Cb, Cr);
    else if(l[0]==0 && l[1]==1)
        Yp_Branch = LUT_01f(Yo, Cb, Cr);
    else if(l[0]==1 && l[1]==0)
        Yp_Branch = LUT_10f(Yo, Cb, Cr);
    else if(l[0]==1 && l[1]==1)
        Yp_Branch = LUT_11f(Yo, Cb, Cr);
}
else
{
    Yp_Branch = YpMid
}
```

It should also be noted that each of these look-up-tables may be may be implemented as several LUTs. The reason is that sometimes more precision is needed in a certain area of the LUT, and it is not efficient to make the entire LUT higher resolution, since it becomes too big. As an example, when making a LUT for the transfer inverse of the transfer function $tf^{-1}(\ )$, more resolution is needed close to 0 since the values change much quicker close to zero. For that reason it may be a good idea to use several look up tables and then use the appropriate one. As an example, the inverse could be estimated using the following code:

```
double getInverseTF(double Y)
{
    if(Y>0.1)
        return(LUT_0_to_1[Y]);
    else if (Y> 0.01)
        return(LUT_0_to_0_1[Y]);
    else if (Y> 0.001)
        return(LUT_0_to_0_01[Y]);
    else if (Y> 0.0001)
        return(LUT_0_to_0_001[Y]);
    else if (Y> 0.00001)
        return(LUT_0_to_0_0001[Y]);
    else if (Y> 0.000001)
        return(LUT_0_to_0_00001[Y]);
    else if (Y> 0.0000001)
        return(LUT_0_to_0_000001[Y]);
    else if (Y> 0.00000001)
        return(LUT_0_to_0_0000001[Y]);
    else
        return(LUT_0_to_0_00000001[Y]);
}
```

Each of the LUTs LUT_0_to_1 through LUT_0_to_0_00000001 could be of the same size, such as 1024 values. A quicker way than doing all the nested ifs could be to convert the value to a fixed point number and then count the leading number of zeros:

```
double getInverseTF(double Y)
{
    int Ydecide = Y*65536.0;
    int num_leading_zeros_div_2 = (CLZ(Ydecide)+1)/2;
    int Yfixed = Y*2^26;
    int Yindex = Yfixed >> num_leading_zeros_div_2*2;
    return( LUT[num_leading_zeros_div2*1024 + Yindex] );
}
```

Here we first count the number of leading zeros, and divide by two. This is similar to comparing against 0.1, 0.01, 0.001 etc but instead of every step being 10 each step is 4. The function CLZ is counting the number of leading zeros in an integer and can be implemented with a single assembly instruction in every modern CPU such as Intel CPUs and ARM CPUs. The big LUT here is a concatenation of the LUTs LUT_0_to_1, LUT_0_to_0_1, LUT_0_to_0_01 etc.

Just as the inverse TF "LUT" really consists of several LUTs, the same thing can be true for the LUTs mentioned above, such as LUT_f00(Yo, Cb, Cr).

REFERENCES

[1] Luthra et al, Call for Evidence (CfE) for HDR and WCG Video Coding, International Organisation for Standardisation, Organisation Internationale de Normalisation, ISO/IEC JTC1/SC29/WG11, Coding of Moving Pictures and Audio, ISO/IEC JTC1/SC29/WG11 MPEG2014/N15083, February 2015, Geneva, Switzerland

[2] WO 2016/130066

[3] Norkin, Closed form HDR 4:2:0 chroma subsampling (HDR CE1 and AHG5 related), Joint Collaborative Team on Video Coding (JCT-VC) of ITU-T SG 16 WP 3 and ISO/IEC JTC 1/SC 29/WG 11, 23$^{rd}$ Meeting: San Diego, USA, 19-26 Feb. 2016, Document: JCTVC-W0107

[4] Ström et al., "Branches: Modified Linearization of Luma Adjustment" Joint Collaborative Team on Video Coding (JCT-VC) of ITU-T SG 16 WP 3 and ISO/IEC JTC 1/SC 29/WG 11, 24th Meeting: Geneva, CH, 26 May-1 Jun. 2016

[5] Rosewarne and Kolesnikov, "CE1-related: LUT-based luma sample adjustment", JCT-VC, JCTVC-W0056, San Diego 2016

[6] Ström et al., Modified Linearization of Luma Adjustment, Joint Collaborative Team on Video Coding (JCT-VC) of ITU-T SG 16 WP 3 and ISO/IEC JTC 1/SC 29/WG 11, 24th Meeting Geneva, CH, 26 May-1 Jun. 2016, Document JCTVC-X0036, Geneva

[7] SMPTE ST 2084:2014 "High Dynamic Range ElectroOptical Transfer Function of Mastering Reference Displays"

[8] Françcois et al., "About using a BT.2020 container for BT.709 content", ISO/IEC (MPEG) document m35255, Sapporo, July 2014

[9] Stessen et al., "Chromaticity Based Color Signals for Wide Color Gamut and High Dynamic Range", ISO/IEC (MPEG) document m35065, Strasbourg, France, October 2014.
[10] Ström, "Investigation of HDR color subsampling", ISO/IEC (MPEG) document m35841, Geneva, Switzerland, February 2015.
[11] Ström et al., "Ericsson's response to CfE for HDR and WCG", ISO/IEC (MPEG) document m36184, Warsaw, Poland, June 2015.
[12] Ström et al., "Luma Adjustment for High Dynamic Range Video", Proceedings of the IEEE Data Compression Conference (DCC), Snowbird, March 2016.
[13] Rosewarne and Kolesnikov, "AHG13: Further results for LUT-based luma sample adjustment", JCT-VC, JCTVC-X0054, Geneva 2016.
[14] Tourapis and Singer, "HDRTools: Software status", JCT-VC, JCTVC-X0053, Geneva 2016

The invention claimed is:

1. A method for processing a pixel of an original red, green and blue (RGB) color in a picture, said method comprises:
   determining which color component of said pixel that will be clipped for a luma value resulting in a luminance value that is closest to an original luminance value obtained based on said original RGB color;
   selecting a look-up table (LUT) based on which color component of said pixel that will be clipped for said luma value resulting in a luminance value that is closest to said original luminance value;
   obtaining at least one LUT index based on LUT-specific maximum and minimum values for said selected LUT and said original luminance value; and
   determining a luma value for said pixel based on a LUT entry fetched from said selected LUT using said at least one LUT index.

2. The method according to claim 1, further comprising clipping said luma value to be within an allowed range defined based on which color component of said pixel that will be clipped for said luma value resulting in a luminance value that is closest to said original luminance value.

3. The method according to claim 1, wherein the obtaining said at least one LUT index comprises obtaining a luminance LUT index tfiYoInt based on a quotient (tfiYo−tfiYoMin)/(tfiYoMax−tfiYoMin), wherein tfiYo represents an inverse transfer function of said original luminance value, tfiYoMax represents an inverse transfer function of said maximum value and tfiYoMin represents an inverse transfer function of said minimum value.

4. The method according to claim 3, wherein
   the obtaining said luminance LUT index comprises obtaining said luminance LUT index based on said quotient and a parameter LUTsizeYo representing a size of said selected LUT in a luminance dimension,
   the obtaining said luminance LUT index comprises obtaining said luminance LUT index based on (LUTsizeYo−1)×f((tfiYo−tfiYoMin)/(tfiYoMax−tfiYoMin)), wherein f(·) is a function, and
   the obtaining said luminance LUT index further comprises:
   determining a low luminance LUT index tfiYoLoInt as the maximum of 0 and tfiYoInt; and
   determining a high luminance LUT index tfiYoHiInt as the minimum of (LUTsizeYo−1) and (tfiYoLoInt+1).

5. The method according to claim 4, wherein
   the obtaining said at least one LUT index comprises obtaining multiple LUT indices based on said LUT-specific maximum and minimum values for said selected LUT and said original luminance value,
   the determining said luma value comprises determining said luma value as a linear combination of multiple LUT entries fetched from said selected LUT using said multiple LUT indices, and
   the determining said luma value comprises:
   calculating a first linear combination of a first LUT entry fetched from said selected LUT using said low luminance LUT index, a low Cb chroma LUT index and a low Cr chroma LUT index and a second LUT entry fetched from said selected LUT using said low luminance LUT index, a high chroma Cb LUT index and said low chroma Cr LUT index;
   calculating a second linear combination of said first LUT entry fetched from said selected LUT using said low luminance LUT index, said low Cb chroma LUT index and said low Cr chroma LUT index and a third LUT entry fetched from said selected LUT using said low luminance LUT index, said low chroma Cb LUT index and a high chroma Cr LUT index;
   calculating a third linear combination of said first linear combination and said second linear combination;
   calculating a fourth linear combination of a fourth LUT entry fetched from said selected LUT using said high luminance LUT index, said low Cb chroma LUT index and said low Cr chroma LUT index and a fifth LUT entry fetched from said selected LUT using said high luminance LUT index, said high chroma Cb LUT index and said low chroma Cr LUT index;
   calculating a fifth linear combination of said fourth LUT entry fetched from said selected LUT using said high luminance LUT index, said low Cb chroma LUT index and said low Cr chroma LUT index and a sixth LUT entry fetched from said selected LUT using said high luminance LUT index, said low chroma Cb LUT index and said high chroma Cr LUT index;
   calculating a sixth linear combination of said fourth linear combination and said fifth linear combination; and
   determining said luma value based on a linear combination of said third linear combination and said sixth linear combination.

6. The method according to claim 1, wherein the obtaining said at least one LUT index comprises obtaining, for each chroma component of a Cb chroma component and a Cr chroma component, a chroma LUT index CInt based on a quotient (C−CMin)/(CMax−Cmin), wherein C represents a chroma value of said pixel, CMax represents said maximum value that depends on said original luminance value and CMin represents said minimum value that depends on said original luminance value.

7. The method according to claim 6, wherein
   the obtaining said chroma LUT index comprises obtaining, for each chroma component of said Cb chroma component and said Cr chroma component, said chroma LUT index based on said quotient and a parameter LUTsizeC representing a size of said selected LUT in a chroma dimension,
   the obtaining said chroma LUT index comprises obtaining, for each chroma component of said Cb chroma component and said Cr chroma component, said chroma LUT based on (LUTsizeC−1)×(C−CMin)/(CMax−Cmin), and the obtaining said chroma LUT index further comprises, for each chroma component of said Cb chroma component and said Cr chroma component:
  determining a low chroma LUT index CLoInt as the maximum of 0 and CInt; and
  determining a high chroma LUT index CHiInt as the minimum of (LUTsizeC−1) and (CLoInt+1).

8. The method according to claim 1, wherein
the obtaining said at least one LUT index comprises obtaining multiple LUT indices based on said LUT-specific maximum and minimum values for said selected LUT and said original luminance value; and
the determining said luma value comprises determining said luma value as a linear combination of multiple LUT entries fetched from said selected LUT using said multiple LUT indices.

9. The method according to claim 8, wherein the determining said luma value comprises determining said luma value based on clipping said linear combination to be within an allowed range defined based on which color component of said pixel that will be clipped for said luma value resulting in a luminance value that is closest to said original luminance value.

10. The method according to claim 1, wherein the determining which color component of said pixel that will be clipped comprises:
  calculating a luma value Y'RClip where a red color component will be clipped;
  calculating a luma value Y'GClip where a green color component will be clipped;
  calculating a luma value Y'BClip where a blue color component will be clipped;
  sorting said luma values Y'RClip, Y'GClip, Y'BClip in ascending order to obtain sorted luma values Y'a, Y'b, Y'c;
  calculating luminance values Ya, Yb, Yc for said sorted luma values Y'a, Y'b, Y'c;
  identifying an interval defined by said luminance values Ya, Yb, Yc to which said original luminance value belongs; and
  determining which color component of said pixel that will be clipped based on a comparison of a luma value representative of said identified interval and luma values where said red, green and blue color components will be clipped.

11. The pixel processing device according to claim 10, wherein said pixel processing device is configured to clip said luma value to be within an allowed range defined based on which color component of said pixel that will be clipped for said luma value resulting in a luminance value that is closest to said original luminance value.

12. A pixel processing device, comprising:
a memory; and
a processor coupled to the memory, wherein the pixel processing device is configured to:
  determine which color component of a pixel of an original red, green and blue (RGB) color in a picture that will be clipped for a luma value resulting in a luminance value that is closest to an original luminance value obtained based on said original RGB color;
  select a look-up table (LUT) based on which color component of said pixel that will be clipped for said luma value resulting in a luminance value that is closest to said original luminance value;
  obtain at least one LUT index based on LUT-specific maximum and minimum values for said selected LUT and said original luminance value; and
  determine a luma value for said pixel based on a LUT entry fetched from said selected LUT using said at least one LUT index.

13. The pixel processing device according to claim 12, wherein said pixel processing device is configured to obtain a luminance LUT index tfiYoInt based on a quotient (tfiYo−tfiYoMin)/(tfiYoMax−tfiYoMin), wherein tfiYo represents an inverse transfer function of said original luminance value, tfiYoMax represents an inverse transfer function of said maximum value and tfiYoMin represents an inverse transfer function of said minimum value.

14. The pixel processing device according to claim 13, wherein said pixel processing device is configured to obtain said luminance LUT index based on said quotient and a parameter LUTsizeYo representing a size of said selected LUT in a luminance dimension,
  said pixel processing device is configured to obtain said luminance LUT index based on (LUTsizeYo−1)×f((tfiYo−tfiYoMin)/(tfiYoMax−tfiYoMin)), wherein f(·) is a function, and
  said pixel processing device is configured to:
  determine a low luminance LUT index tfiYoLoInt as the maximum of 0 and tfiYoInt; and
  determine a high luminance LUT index tfiYoHiInt as the minimum of (LUTsizeYo−1) and (tfiYoLoInt+1).

15. The pixel processing device according to claim 12, wherein said pixel processing device is configured to obtain, for each chroma component of a Cb chroma component and a Cr chroma component, a chroma LUT index CInt based on a quotient (C−CMin)/(CMax−Cmin), wherein C represents a chroma value of said pixel, CMax represents said maximum value that depends on said original luminance value and CMin represents said minimum value that depends on said original luminance value.

16. The pixel processing device according to claim 15, wherein
  said pixel processing device is configured to obtain, for each chroma component of said Cb chroma component and said Cr chroma component, said chroma LUT index based on said quotient and a parameter LUTsizeC representing a size of said selected LUT in a chroma dimension,
  said pixel processing device is configured to obtain, for each chroma component of said Cb chroma component and said Cr chroma component, said chroma LUT based on (LUTsizeC−1)×(C−CMin)/(CMax−Cmin), and
  said pixel processing device is configured to:
  determine, for each chroma component of said Cb chroma component and said Cr chroma component, a low chroma LUT index CLoInt as the maximum of 0 and CInt; and
  determine, for each chroma component of said Cb chroma component and said Cr chroma component, a high chroma LUT index CHiInt as the minimum of (LUTsizeC−1) and (CLoInt+1).

17. The pixel processing device according to claim 12, wherein said pixel processing device is configured to:
  obtain multiple LUT indices based on said LUT-specific maximum and minimum values for said selected LUT and said original luminance value; and
  determine said luma value as a linear combination of multiple LUT entries fetched from said selected LUT using said multiple LUT indices.

18. The pixel processing device according to claim 17, wherein said pixel processing device is configured to:
- calculate a first linear combination of a first LUT entry fetched from said selected LUT using said low luminance LUT index, a low Cb chroma LUT index and a low Cr chroma LUT index and a second LUT entry fetched from said selected LUT using said low luminance LUT index, a high chroma Cb LUT index and said low chroma Cr LUT index;
- calculate a second linear combination of said first LUT entry fetched from said selected LUT using said low luminance LUT index, said low Cb chroma LUT index and said low Cr chroma LUT index and a third LUT entry fetched from said selected LUT using said low luminance LUT index, said low chroma Cb LUT index and a high chroma Cr LUT index;
- calculate a third linear combination of said first linear combination and said second linear combination;
- calculate a fourth linear combination of a fourth LUT entry fetched from said selected LUT using said high luminance LUT index, said low Cb chroma LUT index and said low Cr chroma LUT index and a fifth LUT entry fetched from said selected LUT using said high luminance LUT index, said high chroma Cb LUT index and said low chroma Cr LUT index;
- calculate a fifth linear combination of said fourth LUT entry fetched from said selected LUT using said high luminance LUT index, said low Cb chroma LUT index and said low Cr chroma LUT index and a sixth LUT entry fetched from said selected LUT using said high luminance LUT index, said low chroma Cb LUT index and said high chroma Cr LUT index;
- calculate a sixth linear combination of said fourth linear combination and said fifth linear combination; and
- determine said luma value based on a linear combination of said third linear combination and said sixth linear combination.

19. The pixel processing device according to claim 17, wherein said pixel processing device is configured to determine said luma value based on clipping said linear combination to be within an allowed range defined based on which color component of said pixel that will be clipped for said luma value resulting in a luminance value that is closest to said original luminance value.

20. A computer program product comprising a non-transitory computer readable medium storing a computer program comprising instructions, which when executed by at least one processor, cause said at least one processor to
- determine which color component of a pixel of an original red, green and blue (RGB) color in a picture that will be clipped for a luma value resulting in a luminance value that is closest to an original luminance value obtained based on said original RGB color;
- select a look-up table (LUT) based on which color component of said pixel that will be clipped for said luma value resulting in a luminance value that is closest to said original luminance value;
- obtain at least one LUT index based on LUT-specific maximum and minimum values for said selected LUT and said original luminance value; and
- determine a luma value for said pixel based on a LUT entry fetched from said selected LUT using said at least one LUT index.

* * * * *